United States Patent [19]

Ohnishi et al.

[11] Patent Number: 5,655,152

[45] Date of Patent: Aug. 5, 1997

[54] SYSTEM FOR ALLOCATING DATA OUTPUT REQUESTS TO OUTPUT UNITS HAVING DIFFERENT OUTPUT FORMATS IN ACCORDANCE WITH DATA OUTPUT FORMAT COMPATIBILITY AND PRIORITY CHARACTERISTIC

[75] Inventors: Tatsuya Ohnishi, Kawanishi; Hiromi Wada, Neyagawa; Chinatsu Oinuma, Kobe, all of Japan

[73] Assignee: Matsushita Electric Industrial Co., Osaka, Japan

[21] Appl. No.: 164,921

[22] Filed: Dec. 9, 1993

[30] Foreign Application Priority Data

Dec. 10, 1992 [JP] Japan .................................. 4-330573
Apr. 13, 1993 [JP] Japan .................................. 5-086235
Sep. 29, 1993 [JP] Japan .................................. 5-268132
Oct. 26, 1993 [JP] Japan .................................. 5-267450

[51] Int. Cl.⁶ .................................................. A06F 13/00
[52] U.S. Cl. ........................ 395/856; 395/858; 395/860; 395/500
[58] Field of Search ............................. 395/600, 800, 395/856, 858; 364/200, 519

[56] References Cited

U.S. PATENT DOCUMENTS

| | | | |
|---|---|---|---|
| 3,229,260 | 1/1966 | Falkoff | 395/800 |
| 4,403,286 | 9/1983 | Fry et al. | 364/200 |
| 4,852,045 | 7/1989 | Kraul et al. | 395/550 |
| 4,918,589 | 4/1990 | Floro et al. | 364/132 |
| 5,014,221 | 5/1991 | Mogul | 364/519 |
| 5,128,878 | 7/1992 | Gore et al. | 395/162 |
| 5,179,718 | 1/1993 | MacPhail | 395/800 |
| 5,220,674 | 6/1993 | Morgan et al. | 395/800 |
| 5,357,630 | 10/1994 | Oprescu et al. | 395/600 |

FOREIGN PATENT DOCUMENTS

| | | |
|---|---|---|
| 2202146 | 8/1990 | Japan . |
| 2310758 | 12/1990 | Japan . |
| 3117130 | 5/1991 | Japan . |
| 3245633 | 11/1991 | Japan . |
| 8903086 | 4/1989 | WIPO . |

OTHER PUBLICATIONS

Larry L. Peterson, A Yellow–Pages Service for a Local–Area Network, 1988, pp. 235–242.

Primary Examiner—Thomas O. Lee
Assistant Examiner—Le Hien Luu
Attorney, Agent, or Firm—Price, Gess & Ubell

[57] ABSTRACT

The present invention provides a server capable of providing a system in which a client can be reconnected to one server to another to use any output unit in the system without any prior knowledge thereof. The server can select an output unit to which the job request should be sent by referring to correspondence information held therein when the server receives a job request that specifies neither a type of an output unit nor a data format. Also, the server can select an available output unit for data-output in an adequate data format when it receives output data alone, Further, the server can assign a certain output unit to job requests of the same kind sent from the same client, manage the accesses to the output units, distribute output loading according to an output queue to the server, and select the most appropriate server as per condition set by a user. As well, the server can easily provide the information of the output units to a client by managing the information when the client or an output unit is connected to the server.

1 Claim, 53 Drawing Sheets

OUTPUT UNIT INFORMATION

| OUTPUT UNIT TYPE | OUTPUT UNIT |
|---|---|
| Post Script PRINTER | PRINTER 22 |
| TEXT PRINTER | PRINTER 23 |
| FACSIMILE | PRINTER 24 |
| . . . | . . . |

Fig.6
JOB REQUEST RECORD
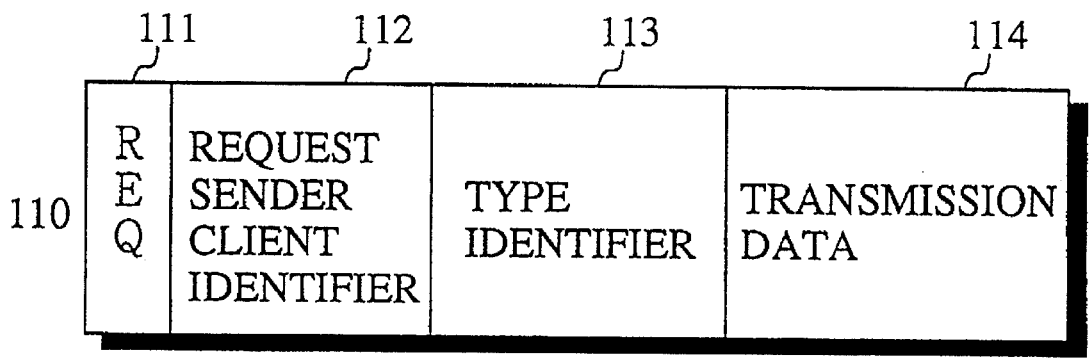
RESPONSE RECORD
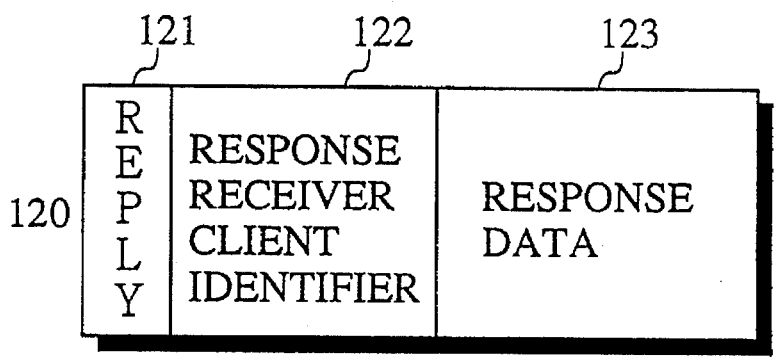
FAILURE NOTICE RECORD
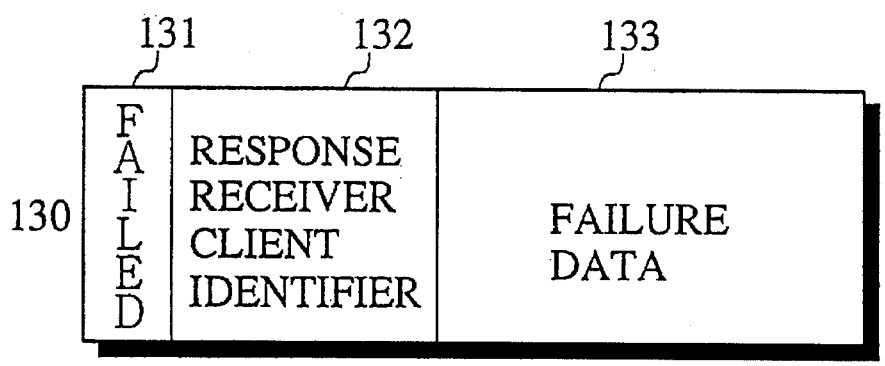

Fig.8

CLIENT INFORMATION

| CLIENT | OUTPUT UNIT TYPE | OUTPUT UNIT |
|---|---|---|
| a | Post Script PRINTER | UNIT $\delta$ |
| a | FACSIMILE | UNIT $\epsilon$ |
| b | TEXT PRINTER | UNIT $\zeta$ |
| c | TEXT PRINTER | UNIT $\zeta$ |
| c | FACSIMILE | UNIT $\eta$ |
| . . . | . . . | . . . |

SUB-ROUTINE OF STEP 36

CLIENT INFORMATION MANAGING UNIT

SUB-ROUTINE OF STEP 42

SUB-ROUTINE OF STEP 44

Fig.19

CLIENT INFORMATION REQUEST RECORD

210

| C R E Q (211) | REQUEST SENDER CLIENT IDENTIFIER (212) | TYPE IDENTIFIER (213) |
|---|---|---|

CLIENT INFORMATION RECORD

220

| C I N F O (221) | REQUEST SENDER CLIENT IDENTIFIER (222) | TYPE IDENTIFIER (223) | OUTPUT UNIT IDENTIFIER (224) |
|---|---|---|---|

OUTPUT-UNIT-SPECIFYING JOB REQUEST RECORD

230

| R E Q 2 (231) | REQUEST SENDER CLIENT IDENTIFIER (232) | OUTPUT UNIT IDENTIFIER (233) | TRANSMISSION DATA (234) |
|---|---|---|---|

Fig.20

CLIENT INFORMATION REQUEST RECORD

310: | CREQ | REQUEST SENDER CLIENT IDENTIFIER (311) | TYPE IDENTIFIER (312) | TYPE IDENTIFIER (313) | ... |

OUTPUT UNIT INFORMATION RECORD

320: | PINFO | REQUEST SENDER CLIENT IDENTIFIER (321) | TYPE IDENTIFIER (322) | OUTPUT UNIT IDENTIFIER (323) | TYPE IDENTIFIER (323) | OUTPUT UNIT IDENTIFIER (324) | ... |

CLIENT INFORMATION RECORD

330: | CINFO | REQUEST SENDER CLIENT IDENTIFIER (331) | TYPE IDENTIFIER (332) | OUTPUT UNIT IDENTIFIER (333) | TYPE IDENTIFIER (333) | OUTPUT UNIT IDENTIFIER (334) | ... |

CLIENT INFORMATION UPDATE REQUEST RECORD

340: | CUPDATE | REQUEST SENDER CLIENT IDENTIFIER (341) | TYPE IDENTIFIER (342) | OUTPUT UNIT IDENTIFIER (343) |

Fig.25
| CLIENT | OUTPUT UNIT | AUTHORIZATION |
|--------|-------------|---------------|
| a | UNIT α | ○ |
| a | UNIT β | ○ |
| a | UNIT γ | × |
| b | UNIT α | × |
| b | UNIT β | ○ |
| ... | ... | ... |
Fig.26
ACCESS AUTHORIZATION REQUEST RECORD
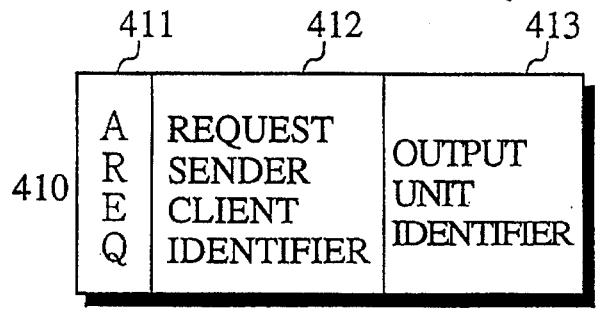
ACCESS AUTHORIZATION INFORMATION RECORD
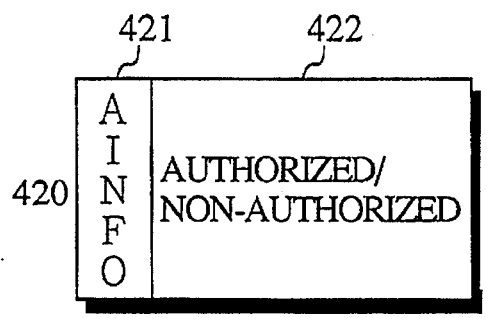

Fig.29

| CLIENT | OUTPUT UNIT TYPE | OUTPUT UNIT |
|---|---|---|
| a | Post Script PRINTER | PRINTER 22 |
| a | FACSIMILE | FACSIMILE 24 |
| b | Post Script PRINTER | PRINTER 23 |
| c | Post Script PRINTER | PRINTER 22 |
| c | FACSIMILE | FACSIMILE 24 |
| . . . | . . . | . . . |

Fig.30

HISTORY INFORMATION REQUEST RECORD

| | 611 | 612 | 613 |
|---|---|---|---|
| 610 | HREQ | REQUEST SENDER CLIENT IDENTIFIER | TYPE IDENTIFIER |

HISTORY INFORMATION RECORD

| | 621 | 622 | 623 | 624 |
|---|---|---|---|---|
| 620 | HINFO | REQUEST SENDER CLIENT IDENTIFIER | TYPE IDENTIFIER | OUTPUT UNIT IDENTIFIER |

HISTORY INFORMATION UPDATE REQUEST RECORD

| | 631 | 632 | 633 | 634 |
|---|---|---|---|---|
| 630 | HUPDATE | REQUEST SENDER CLIENT IDENTIFIER | TYPE IDENTIFIER | OUTPUT UNIT IDENTIFIER |

CORRESPONDENCE TABLE 760

| LOCATION | METHOD | CHARACTER STRING | DATA FORMAT IDENTIFIER 761 |
|---|---|---|---|
| 0 | string | %! | PS |
| ⋮ | ⋮ | ⋮ | ⋮ |

CORRESPONDENCE TABLE 780

| OUTPUT UNIT IDENTIFIER 781 | ACCESS AUTHORIZATION IDENTIFIER 782 PERMITTING DATA-OUTPUT |
|---|---|
| prA | host1,host2,host3 |
| prB | host1,host2,host2 |
| faxA | string1,string2 |
| ⋮ | ⋮ |

Fig.42

| OUTPUT UNIT IDENTIFIER 791 | INSTRUCTION 792 TO OBTAIN OUTPUT STATUS INFORMATION |
|---|---|
| prA | lpq -PprA |
| prB | lpq -PprB |
| faxC | rfaxsq -hfaxC |
| ⋮ | ⋮ |

CORRESPONDENCE TABLE 790

CORRESPONDENCE TABLE 814

| DATA-OUTPUT CONDITION IDENTIFIER811 | OUTPUT UNIT IDENTIFIER812 | DATA-OUTPUT CONDITION IDENTIFIER813 |
|---|---|---|
| resolution | prA | 300 |
| resolution | prB | 600 |
| resolution | faxA | 200 |
| ⋮ | ⋮ | ⋮ |

FIG. 48(a)

INFORMATION REQUEST 910

| REQUEST IDENTIFIER | REQUEST SENDER CLIENT IDENTIFIER |
|---|---|
| INFORMATION REQUEST | host 1 |

INFORMATION REQUEST 920

| REQUEST IDENTIFIER | UPDATE INSTRUCTION | TYPE IDENTIFIER | SERVER IDENTIFIER | OUTPUT UNIT IDENTIFIER |
|---|---|---|---|---|
| UPDATE REQUEST | DELETE | printer | king | prA |

CORRESPONDENCE TABLE 930

| TYPE IDENTIFIER | SERVER IDENTIFIER | OUTPUT UNIT IDENTIFIER |
|---|---|---|
| printer | king | prA |
| printer | queen | prB |
| fax | king | faxC |
| . . . | . . . | . . . |

SETTING REQUEST 940

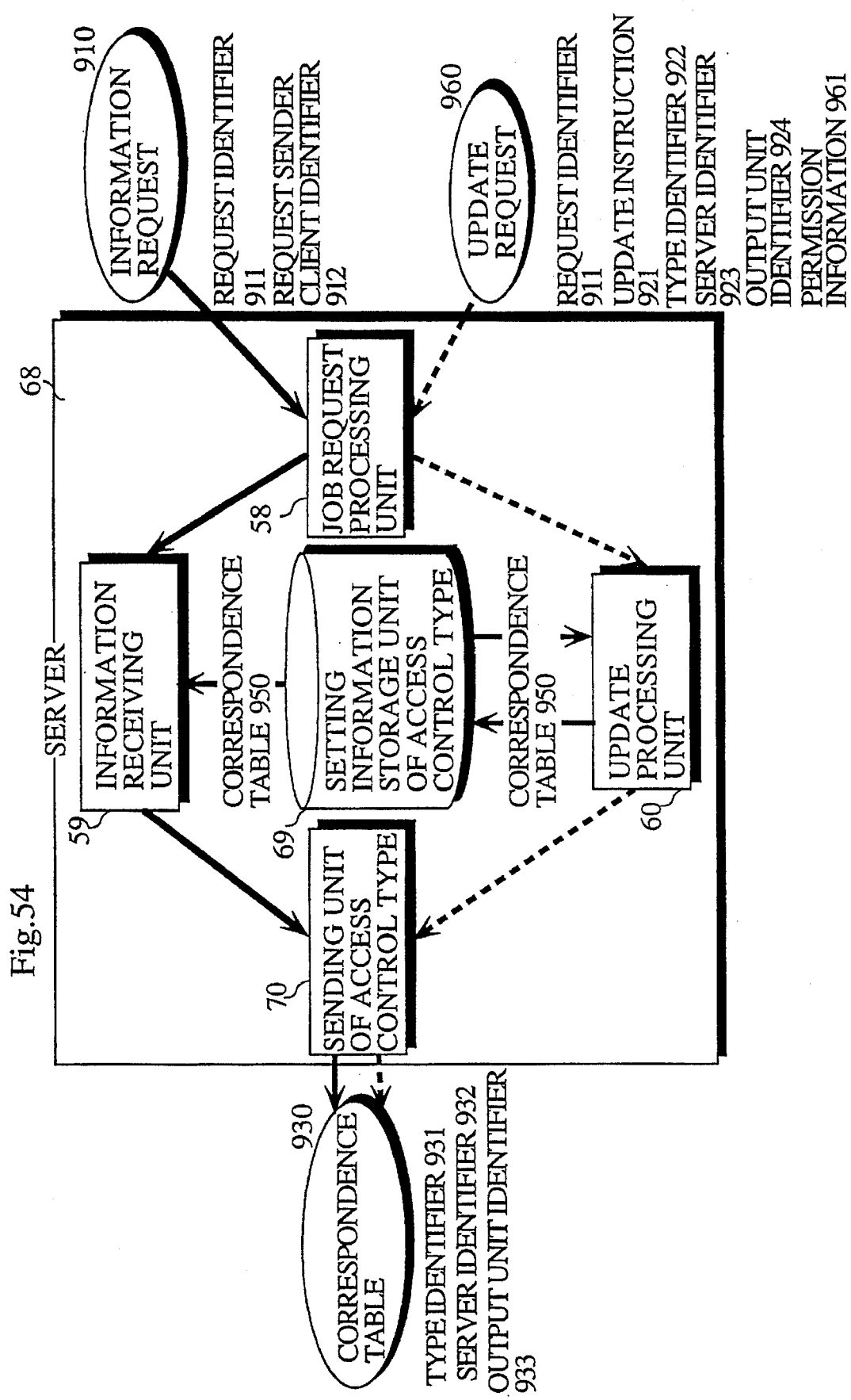

FIG. 55(a)

CORRESPONDENCE TABLE 950

| TYPE IDENTIFIER | SERVER IDENTIFIER | OUTPUT UNIT IDENTIFIER | PERMISSION INFORMATION |
|---|---|---|---|
| printer | king | prA | host1,host2,.... |
| printer | queen | prB | 132.182.13.90,host3,.... |
| fax | king | faxC | group1 |
| . . | . . | . . | . . |

FIG. 55(b)

UPDATE REQUEST 960

| UPDATE REQUEST | UPDATE INSTRUCTION | TYPE IDENTIFIER | SERVER IDENTIFIER | OUTPUT UNIT IDENTIFIER | PERMISSION INFORMATION |
|---|---|---|---|---|---|
| | DELETE | printer | king | prA | host1,host2,.... |

SYSTEM FOR ALLOCATING DATA OUTPUT REQUESTS TO OUTPUT UNITS HAVING DIFFERENT OUTPUT FORMATS IN ACCORDANCE WITH DATA OUTPUT FORMAT COMPATIBILITY AND PRIORITY CHARACTERISTIC

BACKGROUND OF THE INVENTION

1. Field of the Invention

The present invention relates to a server for handling output units by receiving a job request to the output units from a client.

2. Description of the Related Arts

As electronic units such as a computer have become smaller both in size and weight, a configuration in which a plurality of clients share output units connected to a server has become popular. In such a configuration, the output units including a printer, a facsimile, a plotter, and an electronic black board are connected to a server, and a client uses these output units by sending a job request to-the server. Parallel with this configuration, another configuration in which the client uses output units connected to another server when it is reconnected thereto due to a change in its physical location has also become popular.

FIG. 1 depicts the construction of a system for conventional server as an example, and the explanation thereof will be given in the following. In the drawing, the output units, a printer 2 and a facsimile 3, are connected to a server 1 while a printer 5, a facsimile 6, and a plotter 7 to a server 4. A client 8 is initially connected to the server 1. Given these circumstances, the client 8 sends a job request to a printer control process 9 or a facsimile control process 10 installed in the server 1 to use the printer 2 or facsimile 3, respectively. Note that the job request to the printer control process 9 and that to the facsimile control process 10 are formatted differently.

Next, assume that the client 8 has changed its physical location, and is now connected to the server 4 for reasons of convenience such as a distance. Then, the client 8 sends a job request to a printer control process 11, a facsimile control process 12, or a plotter control process 13 installed in the server 4 to use the printer 5, facsimile 6, or plotter 7, respectively. Note that the job requests to the printer control process 11, facsimile control process 12, and plotter control process 13 are all formatted differently.

However, the above described conventional system has the following five problems:

(1) Because different servers require different procedures and data formats for both the same and different types of output units, a user must check the proper procedure and data format of an output unit connected to another server and convert the data format accordingly when the client is reconnected to that server due to a change in physical location or loading limit. For example, in the case shown in FIG. 1, where the client 8 is reconnected to the server 4 from the server 1, the client 8 sends a job request to the printer control process 11 to use the printer 5. However, the printer control process 9 of the server 1 and the printer control process 11 of the server 2 operate on different data formats. Thus, the user must check the procedure and data format of the printer control process 11 and convert the data format at the client 8. Assuming that a UNIX operating system is applied, then, a daemon process called "lpd" is responsible for the printer control processes 9, 11, and a printer and a printout format are specified by an entry written in a file called "printcap"; however, each server uses different entries. Hence, an entry that specifies the printer 2 of the server 1 does not specify the printer 5 of the server 4. Therefore, the user must check the entry for the printer 5 to either specify the entry or convert the data format at the client 8.

2) The user must input information of output units connected to a server each time the client is reconnected; for no technique such that automatically provides the information of the output units has been developed yet. For example, when the client 8 is reconnected to the server 4 from server 1, the client 8 will not have any information of the plotter 7 unless the user inputs it.

3) Different types of output units operate on different procedures and data formats even when they all are connected to one server. For this reason, the user must convert a job request to the printer control process 9 in one data format, and to the facsimile control process 10 in another format at the client 8, which complicates the operation of the client 8.

4) It is time-consuming to operate the conventional system. Because the user must input a data-output command in a specific data format for each output unit; moreover he must collect information as to which output units are currently available as well as print-out formats and identifiers of these available output units each time he inputs a data-output command.

5) The user must update the file in the client each time a network environment changes. More precisely, in the above case, the client 8 files an identifier specifying an output unit in relation with a server in the "printcap". For this reason, the user must update the "printcap" with the most recent information as to server-output unit connection to keep the system in order.

SUMMARY OF THE INVENTION

Accordingly, the present invention has an object to provide a server which can easily select an adequate output unit for a job request from a client, even when the client has no prior knowledge of any output unit connected to that server.

The present invention has another object to provide a serviceable server for the client.

The present invention has another object to provide a server which enables the client to collect information of output units connected thereto.

The present invention has another object to provide a server capable of selecting the most suitable output unit for a job request in relation with the client.

Yet, the present invention has another object to provide a server capable of ensuring the rational use of the output units by judging the current status thereof.

The above objects are fulfilled by a server used in a system where a plurality of clients use at least one output unit connected to the server. The server comprises a job request receiving device for receiving a job request from one of the plurality of clients, an information extracting device for extracting certain information from the job request, an operability judging device for judging whether each output unit connected to the server is operable for processing data included in the job request in accordance with the extracted certain information, and a data output device for sending the data included in the job request to one of the output units judged as being operable by the operability judging device.

The job request may include the certain information in the form of an identifier specifying a type of the operable output unit.

The operability judging device may include a holding unit for holding output unit information that represents a correspondence between an identifier specifying each output unit connected to the server and an identifier specifying a type thereof, and a retrieving unit for retrieving the output-unit-specifying identifier from the output unit information by referring to the type-specifying-identifier extracted from the job request.

The server may further comprise a response receiving device for receiving a response from the operable output unit specified by the output-unit-specifying-identifier retrieved from the output unit information, and a response sending device may include a first sending unit for sending the response to the job-request-sender-client and a second sending unit for sending a first job failure notice to the job-request-sender-client when the operability judging device fails to judge any operability with each output unit connected to the server.

The server may further comprise a data-sending control device for controlling the job request receiving device to send the data included in the job request to the operable output unit by way of the data output device without using the operability judging device when the job request includes an identifier specifying the operable output unit, and to send the job request to the operability judging device when the job request does not include the identifier specifying the operable output unit.

Each output unit may be connected to the server via network, and the data output device may include an address specifying unit for specifying a network address corresponding to the output-unit-specifying-identifier included in the job request.

Each output unit may be connected to the server via serial line, and the data output device may include a specifying unit for specifying a port number connected to the operable output unit by the output-unit-specifying-identifier included in the job request.

The server may further comprise an access authorization table for indicating whether an access is authorized or not in relation with each client and each operable output unit, an authorization judging device for judging whether an access from the job-request-sender-client to the operable output unit is authorized or not by referring to the access authorization table when the operability judging device judges operability of the output unit, and an inhibiting device for inhibiting the data output device from sending the data included in the job request to the operable output unit when the authorization judging device judges the access as being not authorized.

The response sending device may include a third sending unit for sending a second job failure notice to the job-request-sender-client when the inhibiting device inhibits the data output device from sending the data included in the job request to the operable output unit.

The server may further comprise a history information managing device for managing history information that represents a correspondence between an identifier specifying any output unit connected to the server that has received a job request from any of the plurality of clients and an identifier specifying a type thereof, a history information retrieving device for retrieving an identifier that specifies the operable output unit from the history information at the job request, and a control device for controlling the job request receiving device to send the data included in the job request to the operable output unit by way of the data output device without using the operability judging device when the history information retrieving device retrieves the output-unit-specifying-identifier from the history information, and to send the job request to the operability judging device when the history information retrieving device fails to retrieve the output-unit-specifying-identifier from the history information.

The history information managing device may include a unit for updating the history information each time the response receiving device receive a response from any output unit connected to the server.

The first sending unit may include a processing unit for attaching an identifier specifying the operable output unit that has executed the job request to the response being sent therefrom.

The server may further comprise a client information holding device for holding client information including an identifier specifying the client, an identifier specifying a type of each output unit connected to the server and an identifier specifying each output unit connected to the server, and a client information extracting device for extracting an identifier specifying the operable output unit from the client information by referring to the type-specifying-identifier extracted by the information extracting device.

The server may further comprise a first control device for controlling the job request receiving device to send the data included in the job request to the operable output unit by way of the data output device without using the client information extracting device and the operability judging device when the job request includes the output-unit-specifying-identifier and to send the job request to the client information extracting device when the job request does not include the output-unit-specifying identifier, and a second control device for controlling the job request receiving device to send the data included in the job request to the operable output unit by way of the data output device without using the operability judging device when the client information extracting device retrieves the output-unit-specifying-identifier from the client information, and to send the job request to the operability judging device when the client extracting device fails to retrieve the output-unit-specifying-identifier from the client information.

The server may further comprise a job request judging device for judging whether the job request to the operable output unit from the client is a data process request or not, and the first control device and the second control device may activate only when the job request judging device judges the job request as being a data process request.

The server may further comprise an information providing device for requesting the client information holding device and the operability judging device to send the client information and the output unit information respectively, end subsequently sending the client information and the output unit information upon the receipt thereof to the job-request-sender-client when the job request judging device judges the job request as being a request to show information to the job-request-sender-client.

The information providing device may include a priority judging unit for judging that the client information has a higher priority than the output unit information to send the client information antecedently to the output unit information.

The server may further comprise an information updating device for updating the client information when the job request judging device judges the job request as being a client information update request.

The operability judging device may include a first holding unit for holding information representing a correspondence between an identifier specifying each output unit connected to the server and an identifier specifying a type thereof, a second holding unit for holding information representing a correspondence between an identifier specifying another server in the system and an identifier specifying a type of each output unit connected thereto, a first retrieving unit for retrieving an identifier specifying the operable output unit from the first holding unit by referring to the type-specifying-identifier extracted by the information extracting device, a second retrieving unit for retrieving an identifier specifying another server to which an output unit of a same type as specified by the type-specifying-identifier extracted by the information extracting device is connected when the first retrieving unit fails to retrieve the output-unit-specifying-identifier from the first holding unit, and an output unit connecting unit for sending an output unit connecting command to the data output device only when the first retrieving unit retrieves the output-unit-specifying-identifier from the first holding unit.

The server may further comprise a request-to-another-server sending device for sending the job request to the another server by attaching an identifier specifying the server when the second retrieving unit retrieves the another-server-specifying-identifier.

The server may further comprise a response receiving device for receiving a response from one of the operable output unit and the another server, a response judging device for judging whether the response is sent from the operable output unit or the another server, and a response sending device including a first sending unit for sending the response to one of the job-request-sender-client and the another server, and a second sending unit for sending a first job failure notice to one of the job-request-sender-client and the another server when the operability judging device fails to judge any operability with any output unit connected to the server and the another server.

The response judging device may judge the response as being a response from the another server when the response includes both the another-server-specifying-identifier and an identifier specifying another client connected thereto, and as being a response from the operable output unit when the response includes only the identifier specifying the job-request-sender-client.

The first sending unit may include a processing unit for attaching an identifier specifying the operable output unit that has executed the job request to the response being sent therefrom.

The server may further comprise an access authorization table for indicating whether an access is authorized or not in relation with each client, each server, and each output unit in the system, an authorization judging device for judging whether an access is authorized or not for the job request by referring to the access authorization table when the operability judging device judges operability of one of the output unit connected to the server and the another server, and an inhibiting device for inhibiting the data output device from sending the data included the Job request to one of the operable output unit and the another server when the authorization judging device judges the access as being not authorized.

The response sending device may include a third sending unit for sending a second job failure notice to the job-request-sender-client when the inhibiting device inhibits the data output device from sending the data included in the job request to the operable output unit.

The server may further comprise a history information managing device for managing history information that represents a correspondence between an identifier specifying any output unit connected to the server that has received a job request from any of the plurality of clients and an identifier specifying a type thereof, a history information retrieving device for retrieving an identifier that specifies the operable output unit from the history information at the job request, and a control device for controlling the job request receiving device to send the data included in the job request to the operable output unit by way of the data output device without using the operability judging device when the history information retrieving device retrieves the output-unit-specifying-identifier from the history information, and to send the job request to the operability judging device when the history information retrieving device fails to retrieve the output-unit-specifying-identifier from the history information.

The history information managing device may include a unit for updating the history information each time the response receiving device receive a response from any output unit connected to the server.

The server may further comprise a client information holding device for holding client information that represents a correspondence between an identifier specifying each client, an identifier specifying each server, and an identifier specifying a type of each output unit connected to each server, and an identifier specifying each output unit connected to each server in the system, and a client information extracting device for extracting an identifier specifying one of the operable output unit and the another server from the client information by referring to the type-specifying-identifier extracted by the information extracting device.

The server may further comprise a first control device for controlling the job request receiving device to send the data included in the job request to the operable output unit by way of the data output device without using the client information extracting device and the operability judging device when the job request includes the output-unit-specifying-identifier and to send the job request to the client information extracting device when the job request does not include the output-unit-specifying-identifier, and a second control device for controlling the job request receiving device to send the data included in the job request by way of the data output device and the request-to-another-server sending device without using the operability judging device when the information extracting device extracts the output-unit-specifying-identifier from the job request, and to send the job request to the operability judging device when the client information extracting device fails to extract the output-unit-specifying-identifier from the job request.

The server may further comprise a job request judging device for judging whether the job request to the operable output unit from the client is a data process request or not, and the first control device and the second control device may activate only when the job request judging device judges the job request as being a data process request.

The server may further comprise an information providing device for requesting the client information holding device and the operability judging device to send the client information and the output unit information respectively, and subsequently sending the client information and the output unit information upon the receipt thereof to the job-request-sender-client when the job request judging device judges the job request as being a request to show information to the job-request-sender-client.

The information providing device may include a priority judging unit for judging that the client information has a higher priority than the output unit information to send the client information antecedently to the output unit information.

The server may further comprise an information updating device for updating the client information when the job request judging device judges the job request as being a client information update request, and a broadcasting device for broadcasting the client information update request to each server in the system.

The server may further comprise an access authorization table for indicating whether an access is authorized or not in relation with each client, each server, and each output unit in the system, an authorization judging device for judging whether the access to the operable output unit is authorized or not when the operability judging device judges operability with the output unit for the job request by referring to the access authorization table, and an inhibiting device for inhibiting the data output device from sending the data included in the job request to the operable output unit when the authorization judging device judges the access as being not authorized.

The response sending device may include a third sending unit for sending a second job failure notice to the job-request-sender-client when the inhibiting device inhibits the data output device from sending the data included in the job request to the operable output unit.

The job request may include an identifier specifying a data format thereof.

The operability judging device may include a holding unit for holding a plurality of identifiers, each specifying a data format in relation with a data-output control instruction, by which a job request in a corresponding data format is executed, a judging unit for judging whether there is a data-output control instruction corresponding to the data format specified by the data-format-specifying-identifier included in the job request, and a reading unit for reading out the corresponding data-output control instruction when the judging unit judges the existence thereof.

The data output device may include a command sending unit for sending a data-output command to execute the job request to the operable output unit by executing the read out data-output control instruction.

The operability judging device may include an access authorization table for indicating whether an access to each output unit is authorized or not in relation with each client, an access-authorization-identifier extracting unit for extracting an identifier specifying an access authorization from the job request from the job-request-sender-client by judging whether or not the job request from the client includes the access-authorization-specifying-identifier, and an accessible output unit detecting unit for detecting an accessible output unit which is placed under a control of the readout data-output control instruction by referring to the access authorization table with the access-authorization-specifying-identifier included in the job request.

The identifier specifying the access authorization may be selected from a group consisting of a user identifier, a client identifier, and a password, and the access authorization table may be a correspondence table showing a correspondence between the output-unit-specifying-identifier and the access-authorization-specifying-identifier corresponding to the client acquiring the access authorization.

The job request may include information used as a material for a data format judgement.

The operability judging device may include a first holding unit for holding a correspondence table showing a correspondence between the information included in the job request and a data format, an identifier detecting unit for detecting an identifier specifying a data format in the first holding unit corresponding to the information included in the job request from the job-request-sender-client, a second holding unit for holding a plurality of identifiers, each specifying a data format in relation with a data-output control instruction, by which a job request in a corresponding data format is executed, and a reading unit for reading out the corresponding data-output control instruction when the judging unit judges the existence thereof.

The data output device may include a command sending unit for sending a data-output command to execute the job request to the operable output unit by executing the read out data-output control instruction.

The information included in the job request may include a character representing the information and a location of the information in the job request.

The operability judging device may include an access authorization table for indicating whether an access to each output unit is authorized or not in relation with each client, an access-authorization-identifier extracting unit for extracting an identifier specifying an access authorization from the job request from the job-request-sender-client by judging whether or not the job request from the client includes the access-authorization-specifying-identifier, and an accessible output unit detecting unit for detecting an accessible output unit which is placed under a control of the readout data-output control instruction by referring to the access authorization table with the access-authorization-specifying-identifier included in the job request.

The identifier specifying the access authorization may be selected from a group consisting of a user identifier, a client identifier, and a password, and the access authorization table may be a correspondence table showing a correspondence between the output-unit-specifying-identifier and the access-authorization-specifying-identifier corresponding to the client acquiring the access authorization.

The above objects are also fulfilled by a server used in a system where a plurality of clients use output units connected to the server. The server comprises a job request receiving device for receiving a job request from one of the plurality of clients, an information extracting device for extracting certain information from the job request, an operability judging device for judging whether each output unit connected to the server is operable for processing data included in the job request in accordance with the extracted certain information, and a data output device for sending the data included in the job request to one of the output units judged as being operable by the operability judging device.

The operability judging device may include a holding unit for holding a plurality of identifiers, each specifying a file format in relation with a data-output control instruction by which a job request in a corresponding file format is executed, and a readout unit for reading out a data-output control instruction in a file format corresponding to the file-format-specifying-identifier included in the job request from the holding unit.

The data output device may include a command sending unit for sending a data-output command to execute the job request to the operable output unit by executing the read out data-output control instruction.

The operability judging device may include an access authorization table for indicating whether an access to each output unit is authorized or not in relation with each client, an access-authorization-identifier extracting unit for extracting an identifier specifying an access authorization from the job request from the job-request-sender-client by judging whether or not the job request from the client includes the access-authorization-specifying-identifier, and an accessible output unit detecting unit for detecting an accessible output unit which is placed under a control of the readout data-output control instruction by referring to the access authorization table with the access-authorization-specifying-identifier included in the job request.

The identifier specifying the access authorization may be selected from a group consisting of a user identifier, a client identifier, and a password, and the access authorization table may be a correspondence table showing a correspondence between the output-unit-specifying-identifier and the access-authorization-specifying-identifier corresponding to the client acquiring the access authorization.

The above objects are also fulfilled by a server used in a system where a plurality of clients use output units connected to the server. The server comprises a job request receiving device for receiving a job request from one of the plurality of clients, an information extracting device for extracting certain information from the job request, an output unit selecting device for selecting one of the output units in accordance with the extracted certain information, and a data output device for sending data included in the job request to the selected output unit.

The job request may include an identifier specifying a data format thereof.

The output unit selecting device may include a holding unit for holding a plurality of identifiers, each specifying a data format in relation with a data-output control instruction, by which a job request in a corresponding data format is executed, a readout unit for reading out a data-output control instruction corresponding to the data format specified by the data-format-specifying-identifier included in the job request from the holding unit, and a selecting unit for selecting the selected output unit as being an output unit capable of outputting the data included in the job request by referring to the readout data-output control instruction and the job request.

The data output device may include a command sending unit for sending a data-output command to execute the job request to the selected output unit by executing the readout data-output control instruction read out by the readout unit.

The selecting unit in the output unit selecting device may include an access authorization table for indicating whether an access to each output unit is authorized or not in relation with each client, an access-authorization-identifier extracting unit for extracting an identifier specifying an access authorization from the job request from the job-request-sender-client by judging whether or not the job request from the client includes the access-authorization-specifying-identifier, and an accessible output unit detecting unit for detecting an accessible output unit which is placed under a control of the readout data-output control instruction by referring to the access authorization table with the access-authorization-specifying-identifier included in the job request.

The identifier specifying the access authorization may be selected from a group consisting of a user identifier, a client identifier, and a password, and the access authorization table may be a correspondence table showing a correspondence between the output-unit-specifying-identifier and the access-authorization-specifying-identifier corresponding to the client acquiring the access authorization.

The selecting unit may further include a loading status obtaining unit for obtaining a loading status of each output unit detected by the accessible output unit detecting device when the accessible output unit detecting device detects a plurality of accessible output units, and a selection permitting unit for selecting the selected output unit as being an output unit having a smallest loading status by referring to the obtained loading status and subsequently permitting data-output thereto.

Each output unit in the system may be a unit capable of outputting document data including a printer and a facsimile, and the loading status may represent one of the number of bytes stored in the output unit and a time required for each of the output units to be ready for a following document data output.

The selecting unit may further include a capability storage unit for storing a capability of each output unit in the system, a capability identifier extracting unit for extracting an identifier specifying a capability of the selected output unit from the job request, and an optimal output unit detecting unit for detecting all optimal output units whose capabilities coincide with a capability specified by the capability-specifying-identifier when the selecting unit selects a plurality of the output units to be as the selected output unit.

Each output unit in the system may be a unit capable of outputting document data including a printer and a facsimile, and the capability-specifying-identifier included in the job request may represent one of a resolution, a data-output speed, a cost of data-output, a distance from the client to the selected output unit.

The capability storage unit may store superiority and inferiority information of the capability of each output unit in the system, and the optimal output unit detecting unit may include a choosing unit for choosing one optimal output unit by referring to the superiority and inferiority information when the optimal output unit detecting unit detects a plurality of the output units as being the optimal output unit.

The selecting unit in the output unit selecting device may include a loading managing unit for storing and managing a loading status of each output unit in the system, a choice allowing unit for allowing the one chosen optimal output unit as being the selected output unit on the condition that the one chosen optimal output unit is placed under a control of the data-output control instruction read out by the readout unit and that it has a smaller loading status than a certain value, and an output unit for outputting the allowed optimal output unit as information from the selecting unit.

The loading managing unit may include an instruction sending unit for issuing an instruction to notify a loading status each time the command sending unit receives a data-output control instruction from the readout unit to each output unit in the system and placed under the data-output control instruction, and a loading status storage unit for storing each loading status sent from each output unit in the system.

The choice allowing unit may include a detecting unit for detecting an output unit having a smallest loading status when a plurality of the output units are placed under a control of the data-output control instruction read out by the readout unit.

Each output unit in the system may be a unit capable of outputting document data including a printer and a facsimile, and the loading status may represent one of the number of bytes stored in the output unit and a time required for each of the output units to be ready for a following document data output.

The selecting unit may further include a capability storage unit for storing a capability of each output unit in the system, a capability identifier extracting unit for extracting an identifier specifying a capability of the selected output unit from the job request, and an optimal output unit detecting unit for detecting all optimal output units whose capabilities coincide with a capability specified by the capability-specifying-identifier when the selecting unit selects a plurality of the output units to be as the selected output unit.

Each output unit in the system may be a unit capable of outputting document data including a printer and a facsimile, and the capability-specifying-identifier included in the job request may represent one of a resolution, a data-output speed, a cost of data-output, a distance from the client to the selected output unit.

The capability storage unit may store superiority and inferiority information of the capability of each output unit in the system, and the optimal output unit detecting unit may include a choosing unit for choosing one optimal output unit by referring to the superiority and inferiority information when the optimal output unit detecting unit detects a plurality of the output units as being the optimal output unit.

The selecting unit may further include a capability storage unit for storing a capability of each output unit in the system, a capability identifier extracting unit for extracting an identifier specifying a capability of the selected output unit from the job request, and an optimal output unit detecting unit for detecting all optimal output units whose capabilities coincide with a capability specified by the capability-specifying-identifier when the selecting unit selects a plurality of the output units to be as the selected output unit.

Each output unit in the system may be a unit capable of outputting document data including a printer and a facsimile, and the capability-specifying-identifier included in the job request may represent one of a resolution, a data-output speed, a cost of data-output, a distance from the client to the selected output unit.

The capability storage unit may store superiority and inferiority information of the capability of each output unit in the system, and the optimal output unit detecting unit may include a choosing unit for choosing one optimal output unit by referring to the superiority and inferiority information when the optimal output unit detecting unit detects a plurality of the output units as being the optimal output unit.

The job request may include information used as a material for a data format judgement.

The output unit selecting device may include a first holding unit for holding a correspondence table showing a correspondence between the information included in the job request and a data format, an identifier detecting unit for detecting an identifier specifying a data format in the first holding unit corresponding to the information included in the job request from the job-request-sender-client, a second holding unit for holding a plurality of identifiers, each specifying a data format in relation with a data-output control instruction, by which a job request in a corresponding data format is executed, a readout unit for reading out a data-output control instruction corresponding to the data format specified by the data-format-specifying-identifier included in the job request from the first holding unit, and a selecting unit for selecting the selected output unit as being an output unit capable of outputting the data included in the job request by referring to the readout data-output control instruction and the job request.

The operability judging device may include an access authorization table for indicating whether an access to each output unit is authorized or not in relation with each client, an access-authorization-identifier extracting unit for extracting an identifier specifying an access authorization from the job request from the job-request-sender-client by judging whether or not the job request from the client includes the access-authorization-specifying-identifier, and an accessible output unit detecting unit for detecting an accessible output unit which is placed under a control of the readout data-output control instruction by referring to the access authorization table with the access-authorization-specifying-identifier included in the job request.

The information included in the job request may include a character representing the information and a location of the information in the job request.

The selecting unit in the output unit selecting device may include an access authorization table for indicating whether an access to each output unit is authorized or not in relation with each client, an access-authorization-identifier extracting unit for extracting an identifier specifying an access authorization from the job request from the job-request-sender-client by judging whether or not the job request from the client includes the access-authorization-specifying-identifier, and an accessible output unit detecting unit for detecting an accessible output unit which is placed under a control of the readout data-output control instruction by referring to the access authorization table with the access-authorization-specifying-identifier included in the job request.

The identifier specifying the access authorization may be selected from a group consisting of a user identifier, a client identifier, and a password, and the access authorization table may be a correspondence table showing a correspondence between the output-unit-specifying-identifier and the access-authorization-specifying-identifier corresponding to the client acquiring the access authorization.

The selecting unit may further include a loading status obtaining unit for obtaining a loading status of each output unit detected by the accessible output unit detecting device when the accessible output unit detecting device detects a plurality of accessible output units, and a selection permitting unit for selecting the selected output unit as being an output unit having a smallest loading status by referring to the obtained loading status and subsequently permitting data-output thereto.

Each output unit in the system may be a unit capable of outputting document data including a printer and a facsimile, and the loading status may represent one of the number of bytes stored in the output unit and a time required for each of the output units to be ready for a following document data output.

The selecting unit may further include a capability storage unit for storing a capability of each output unit in the system, a capability identifier extracting unit for extracting an identifier specifying a capability of the selected output unit from the job request, and an optimal output unit detecting unit for detecting all optimal output units whose capabilities coincide with a capability specified by the capability-specifying-identifier when the selecting unit selects a plurality of the output units to be as the selected output unit.

Each output unit in the system may be a unit capable of outputting document data including a printer and a facsimile, and the capability-specifying-identifier included in the job request may represent one of a resolution, a data-output speed, a cost of data-output, a distance from the client to the selected output unit.

The capability storage unit may store superiority and inferiority information of the capability of each output unit in the system, and the optimal output unit detecting unit may include a choosing unit for choosing one optimal output unit by referring to the superiority and inferiority information when the optimal output unit detecting unit detects a plurality of the output units as being the optimal output unit.

The selecting unit in the output unit selecting device may include a loading managing unit for storing and managing a loading status of each output unit in the system, a choice allowing unit for allowing the one chosen optimal output unit as being the selected output unit on the condition that the one chosen optimal output unit is placed under a control of the data-output control instruction read out by the readout unit and that it has a smaller loading status than a certain value, and an output unit for outputting the allowed optimal output unit as information from the selecting unit.

The loading managing unit may include an instruction sending unit for issuing an instruction to notify a loading status each time the command sending unit receives a data-output control instruction from the readout unit to each output unit in the system and placed under the data-output control instruction, and a loading status storage unit for storing each loading status sent from each output unit in the system.

The choice allowing unit may include a detecting unit for detecting an output unit having a smallest loading status when a plurality of the output units are placed under a control of the data-output control instruction read out by the readout unit.

Each output unit in the system may be a unit capable of outputting document data including a printer and a facsimile, and the loading status may represent one of the number of bytes stored in the output unit and a time required for each of the output units to be ready for a following document data output.

The selecting unit may further include a capability storage unit for storing a capability of each output unit in the system, a capability identifier extracting unit for extracting an identifier specifying a capability of the selected output unit from the job request, and an optimal output unit detecting unit for detecting all optimal output units whose capabilities coincide with a capability specified by the capability-specifying-identifier when the selecting unit selects a plurality of the output units to be as the selected output unit.

Each output unit in the system may be a unit capable of outputting document data including a printer and a facsimile, and the capability-specifying-identifier included in the job request may represent one of a resolution, a data-output speed, a cost of data-output, a distance from the client to the selected output unit.

The capability storage unit may store superiority and inferiority information of the capability of each output unit in the system, and the optimal output unit detecting unit may include a choosing unit for choosing one optimal output unit by referring to the superiority and inferiority information when the optimal output unit detecting unit detects a plurality of the output units as being the optimal output unit.

The selecting unit may further include a capability storage unit for storing a capability of each output unit in the system, a capability identifier extracting unit for extracting an identifier specifying a capability of the selected output unit from the job request, and an optimal output unit detecting unit for detecting all optimal output units whose capabilities coincide with a capability specified by the capability-specifying-identifier when the selecting unit selects a plurality of the output units to be as the selected output unit.

Each output unit in the system may be a unit capable of outputting document data including a printer and a facsimile, and the capability-specifying-identifier included in the job request may represent one of a resolution, a data-output speed, a cost of data-output, a distance from the client to the selected output unit.

The capability storage unit may store superiority and inferiority information of the capability of each output unit in the system, and the optimal output unit detecting unit may include a choosing unit for choosing one optimal output unit by referring to the superiority and inferiority information when the optimal output unit detecting unit detects a plurality of the output units as being the optimal output unit.

The above objects are also fulfilled by a server used in a system where a plurality of clients use output units connected to the server. The server comprises a job request receiving device for receiving a job request from one of the plurality of clients, a file format judging device for judging a file format of data included in the job request, an output unit selecting device for selecting the one output unit in accordance with the extracted certain information, and a data output device for sending data included in the job request to the selected output unit.

The output unit selecting device may include a holding unit for holding a plurality of identifiers, each specifying a file format in relation with a data-output control instruction, by which a job request in a corresponding file format is executed, a readout unit for reading out a data-output control instruction in a file format corresponding to the file-format-specifying-identifier included in the job request from the holding unit, and a selecting unit for selecting the one output unit as being an output unit capable of outputting the data included in the job request by referring to the readout data-output control instruction and the identifier specifying the file format.

The data output device may include a command sending unit for sending a data-output command to execute the job request to the selected output unit by executing the readout data-output control instruction read out by the readout unit.

The selecting unit in the output unit selecting device may include an access authorization table for indicating whether an access to each output unit is authorized or not in relation with each client, an access-authorization-identifier extracting unit for extracting an identifier specifying an access authorization from the job request from the job-request-sender-client by judging whether or not the job request from the client includes the access-authorization-specifying-identifier, and an accessible output unit detecting unit for detecting an accessible output unit which is placed under a control of the readout data-output control instruction by referring to the access authorization table with the access-authorization-specifying-identifier included in the job request.

The identifier specifying the access authorization may be selected from a group consisting of a user identifier, a client identifier, and a password, and the access authorization table may be is a correspondence table showing a correspondence between the output-unit-specifying-identifier and the access-authorization-specifying-identifier corresponding to the client acquiring the access authorization.

The selecting unit may further include a loading status obtaining unit for obtaining a loading status of each output unit detected by the accessible output unit detecting device when the accessible output unit detecting device detects a plurality of accessible output units, and a selection permitting unit for selecting the selected output unit as being an output unit having a smallest loading status by referring to the obtained loading status and subsequently permitting data-output thereto.

Each output unit in the system may be a unit capable of outputting document data including a printer and a facsimile, and the loading status may represent one of the number of bytes stored in the output unit and a time required for each of the output units to be ready for a following document data output.

The selecting unit may further include a capability storage unit for storing a capability of each output unit in the system, a capability identifier extracting unit for extracting an identifier specifying a capability of the selected output unit from the job request, and an optimal output unit detecting unit for detecting all optimal output units whose capabilities coincide with a capability specified by the capability-specifying-identifier when the selecting unit selects a plurality of the output units to be as the selected output unit.

Each output unit in the system may be a unit capable of outputting document data including a printer and a facsimile, and the capability-specifying-identifier included in the job request may represent one of a resolution, a data-output speed, a cost of data-output, a distance from the client to the selected output unit.

The capability storage unit may store superiority and inferiority information of the capability of each output unit in the system, and the optimal output unit detecting unit may include a choosing unit for choosing one optimal output unit by referring to the superiority and inferiority information when the optimal output unit detecting unit detects a plurality of the output units as being the optimal output unit.

The selecting unit in the output unit selecting device may include a loading managing unit for storing and managing a loading status of each output unit in the system, a choice allowing unit for allowing the one chosen optimal output unit as being the selected output unit on the condition that the one chosen optimal output unit is placed under a control of the data-output control instruction read out by the readout unit and that it has a smaller loading status than a certain value, and an output unit for outputting the allowed optimal output unit as information from the selecting unit.

The loading managing unit may include an instruction sending unit for issuing an instruction to notify a loading status each time the command sending unit receives a data-output control instruction from the readout unit to each output unit in the system and placed under the data-output control instruction, and a loading status storage unit for storing each loading status sent from each output unit in the system.

The choice allowing unit may include a detecting unit for detecting an output unit having a smallest loading status when a plurality of the output units are placed under a control of the data-output control instruction read out by the readout unit.

Each output unit in the system may be a unit capable of outputting document data including a printer and a facsimile, and the loading status may represent one of the number of bytes stored in the output unit and a time required for each of the output units to be ready for a following document data output.

The selecting unit may further include a capability storage unit for storing a capability of each output unit in the system, a capability identifier extracting unit for extracting an identifier specifying a capability of the selected output unit from the job request, and an optimal output unit detecting unit for detecting all optimal output units whose capabilities coincide with a capability specified by the capability-specifying-identifier when the selecting unit selects a plurality of the output units to be as the selected output unit.

Each output unit in the system may be a unit capable of outputting document data including a printer and a facsimile, and the capability-specifying-identifier included in the job request may represent one of a resolution, a data-output speed, a cost of data-output, a distance from the client to the selected output unit.

The capability storage unit may store superiority and inferiority information of the capability of each output unit in the system, and the optimal output unit detecting unit may include a choosing unit for choosing one optimal output unit by referring to the superiority and inferiority information when the optimal output unit detecting unit detects a plurality of the output units as being the optimal output unit.

The selecting unit may further include a capability storage unit for storing a capability of each output unit in the system, a capability identifier extracting unit for extracting an identifier specifying a capability of the selected output unit from the job request, and an optimal output unit detecting unit for detecting all optimal output units whose capabilities coincide with a capability specified by the capability-specifying-identifier when the selecting unit selects a plurality of the output units to be as the selected output unit.

Each output unit in the system may be a unit capable of outputting document data including a printer and a facsimile, and the capability-specifying-identifier included in the job request may represent one of a resolution, a data-output speed, a cost of data-output, a distance from the client to the selected output unit.

The capability storage unit may store superiority and inferiority information of the capability of each output unit in the system, and the optimal output unit detecting unit may include a choosing unit for choosing one optimal output unit by referring to the superiority and inferiority information when the optimal output unit detecting unit detects a plurality of the output units as being the optimal output unit.

The above objects are also fulfilled by a server and a client used in a network system including a plurality of servers, a plurality of clients, and a plurality of output units, where each client sends output-data to one of the plurality of output units via at least one of the servers.

One of the servers comprises a receiving device for receiving a request, a correspondence table holding device for holding a correspondence table showing a correspondence between each of the plurality of servers and each of the plurality of output units, and an information-to-client sending device for sending information held in the correspondence table to a client that has sent the request. Each of the plurality of clients comprises a requesting device for requesting information held in the corresponding table, and a storage control device including a storage unit for receiving to store the information held in the corresponding table.

The receiving device may include a first request processing unit for judging whether the request sent from one of the plurality of clients is an information request or not, and subsequently sending the request to the information-to-client sending device when it judges the request as being an information request, and the information-to-client sending device may include a retrieving unit for retrieving information requested by the information request from the correspondence table, and a sending unit for sending the selected information to the request-sender-client.

The server may further comprise an updated correspondence table transmitting device for updating the correspondence table held in the correspondence table holding device at a request to update information in the correspondence table sent from an operator, and subsequently sending the updated correspondence table to each of the plurality of clients, and the receiving device may include a second request processing unit for judging whether the request is the update request from the operator or not, and subsequently sending the update request to the updated correspondence table transmitting device when it judges the request as being an update request the updated correspondence table transmitting device.

The updated information transmitting device may include a readout unit for reading out the correspondence table held in the correspondence table holding device, a judging unit for judging whether or not the information in the readout correspondence table is changeable as per. the update request, an information updating unit for updating the information in the read out correspondence table when the judging unit judges the read out correspondence table as being changeable, a storing control unit for storing the correspondence table updated by the information updating unit into the correspondence table holding device, a first transmitting unit for transmitting the updated correspondence table to each of the plurality of clients, and a second transmitting unit for transmitting an update failure notice to the operator when the judging unit judges the read out correspondence table as being unchangeable.

The server may further comprise an access authorization information holding device for holding access authorization information as to whether an access authorization for each of the plurality of clients to each of the plurality of output units specified by an identifier, and an information-to-authorized client sending device for reading out the access authorization information from the access authorization information holding device at the information request, and subsequently sending the read out access authorization information to the request-sender-client who acquires an access authorization to the output unit by referring to the readout access authorization information with an identifier specifying the output unit.

The information-to-authorized-client sending device may include a selecting unit for reading out the correspondence table from the correspondence table holding device and subsequently selecting the information requested by the information request sent therefrom, a judging unit for reading out the access authorization information from the access authorization information holding device and subsequently judging whether or not the selected information indicates that the request-sender-client acquires the access authorization to the output unit, a first sending unit for sending the selected information to the request-sender-client when the judging unit judges the access to the output unit from the request-sender-client as being authorized, and a second sending unit for sending a failure notice to the client that has sent the information request when the judging device judges the access to the output unit from the request-sender-client as being not authorized.

The server may further comprise an access authorization information holding device for holding access authorization information as to whether an access authorization for each of the plurality of clients to each of the plurality of output units specified by an identifier, and an information-to-authorized client sending device for reading out the access authorization information from the access authorization information holding device at the information request, and subsequently sending the read out access authorization information to the request-sender-client who acquires an access authorization to the output unit by referring to the readout access authorization information with an identifier specifying the output unit.

The information-to-authorized-client sending device may include a selecting unit for reading out the correspondence table from the correspondence table holding device and subsequently selecting the information requested by the information request sent therefrom, a judging unit for reading out the access authorization information from the access authorization information holding device and subsequently judging whether or not the selected information indicates that the request-sender-client acquires the access authorization to the output unit, a first sending unit for sending the selected information to the request-sender-client when the judging unit judges the access to the output unit from the request-sender-client as being authorized, and a second sending unit for sending a failure notice to the client that has sent the information request when the judging device judges the access to the output unit from the request-sender-client as being not authorized.

The server may further include a first update authorization correspondence table transmitting device comprising a readout unit for reading out the corresponding table from the correspondence table holding device upon the receipt of a request to update information in the corresponding table from an operator, a judging unit for judging whether the readout correspondence table is changeable or not as per the update request, a storing control unit for reading out the access authorization information from the access authorization information holding device when the judging unit judges the readout correspondence table as being changeable, and subsequently selecting the client as being a client which acquires the access authorization to the output unit to update the correspondence table held in the correspondence table holding device, and a sending unit for sending the updated correspondence table to the client which acquires the access authorization to the output unit in accordance with the access authorization information, and the receiving device may include a third request processing unit for judging whether or not the request is the update request, and subsequently sending the update request to the first update authorization correspondence table transmitting device when it judges the request as being a request to update the correspondence table.

The server may further include a second update authorization correspondence table transmitting device for updating the access authorization information in accordance with a request to update the access authorization information from an operator upon the receipt thereof, and subsequently storing the updated access authorization information into the access authorization information holding device to send the updated access authorization information to the plurality of clients, and the receiving device may include a fourth request processing unit for judging whether or not the request from the operator is the authorization-update request, and subsequently sending the authorization-update request to the second update authorization correspondence table transmitting device when it judges the request as being an authorization-update request.

The server may further include a third update authorization correspondence table transmitting device for updating the access authorization information in accordance with a request to update the access authorization information from an operator upon the receipt thereof, and subsequently storing the updated access authorization information into the access authorization information holding device to send the updated access authorization information to the plurality of clients, and the receiving device may include a fifth request processing unit for judging whether or not the request from the operator is the authorization-update request, and subsequently sending the authorization-update request to the third update authorization correspondence table transmitting device when it judges the request as being an authorization-update request.

According to the above construction, even when the client sends a job request that specifies either the data format or type of the output unit or a job request that specifies neither the data format nor the type of the output unit, the server can select a corresponding output unit. Therefore, when the client is reconnected to another server due to a change its physical location or a loading limit, the client can use any output unit connected to the new server in the same as the previously connected server.

Also, the client can collect information as to which output units are currently available by sending the information request, and if necessary, update the information by sending the update request, making it possible to use an output unit other than a default output unit.

Also, the operation of the client can be simplified by enabling the client to send the job request without converting the data format or changing procedure for each output unit.

Moreover, the server can manage the access authorization to each output unit collectively.

Furthermore, the job requests specifying the same type of output unit from the same client will always be sent to a single output unit even when several output units of the same type are connected to one server.

In addition, the job request specifying the same type of output unit from the same client will always be sent as output-unit-specifying job request from the second occurrence, making it unnecessary for the server to refer to the output unit information, which results in reducing loading thereof.

Also, according to the above construction, the server can select an appropriate output unit for data-output without any prior knowledge of the identifier and data format of the output unit, so that the client does not have to hold information as to identifier of each output unit.

Further, the server can select an appropriate output unit that satisfies data-output condition such as an access authorization, loading, and resolution without any prior knowledge of the identifier and data format of the output unit.

As well, without any input from the operator, the client can collect the setting information of the output units by sending the information request to the server, and the client can automatically receive the most recent information when any setting information in the server changes.

Moreover, the server can manage the access authorization to each output unit collectively by sending the setting information only to the clients which acquire the access authorization shown in the correspondence table.

BRIEF DESCRIPTION OF THE DRAWINGS

These and other objects, advantages and features of the invention will become apparent from the following description thereof taken in conjugation with the accompanying drawings which illustrate specific embodiments of the invention. In the drawings:

FIG. 6 is a view showing three record formats used in the first embodiment;

FIG. 8 is a view showing the contents of client information in the second embodiment;

FIG. 19 is a view showing three record formats used in the second embodiment;

FIG. 20 is another view showing three record formats used in the second embodiment;

FIG. 25 is a view showing the contents held in a correspondence table used in the fourth embodiment;

FIG. 26 is a view showing two record formats used in the fourth embodiment;

FIG. 29 is a view showing the contents of history information used in the sixth embodiment;

FIG. 30 is a view showing three record formats used in the sixth embodiment;

FIG. 42 is a view of the contents held in a correspondence table used in the tenth embodiment;

FIG. 48(a) is a data format of an information request inputted into a request processing unit in the twelfth embodiment;

FIG. 48(b) is a data format of an information request inputted int a request processing unit in the twelfth embodiment;

FIG. 49 is a view showing the contents of a correspondence table used in the twelfth embodiment;

FIG. 54 is a view showing the construction of a server in accordance with a thirteenth embodiment of the present invention;

FIG. 55 (a) is a view showing the contents of a correspondence table used in the thirteenth embodiment;

FIG. 55(b) is a view showing a data format of an update request inputted into a request processing unit in the thirteenth embodiment.

DESCRIPTION OF THE PREFERRED EMBODIMENTS

Figure 56:
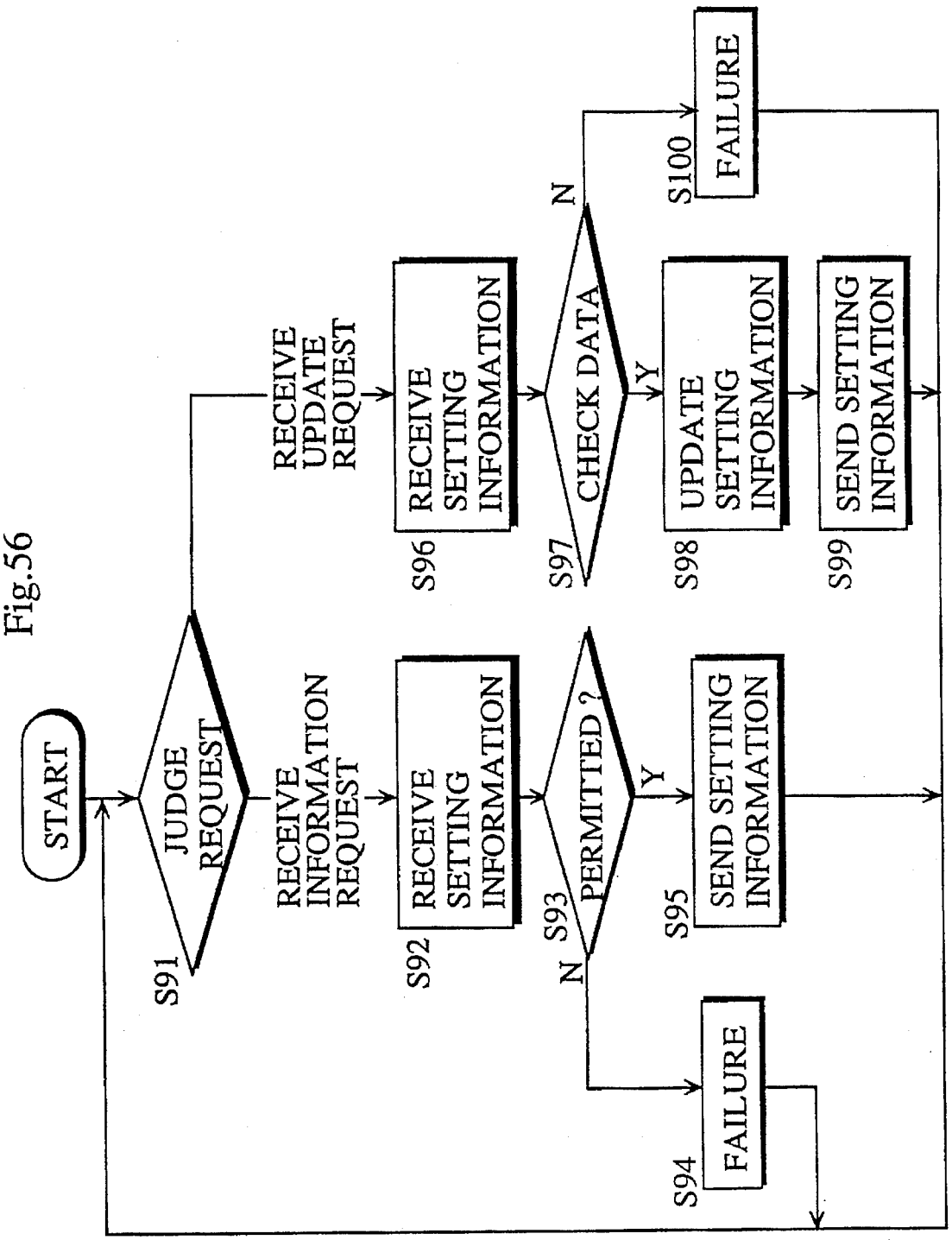
FIG. 56 is a flowchart detailing the operation of the a server in the thirteenth embodiment.

In the followings, thirteen embodiments of a server of the present invention will be explained with referring to FIG. 2 through FIG. 56.

First Embodiment

Figure 1:
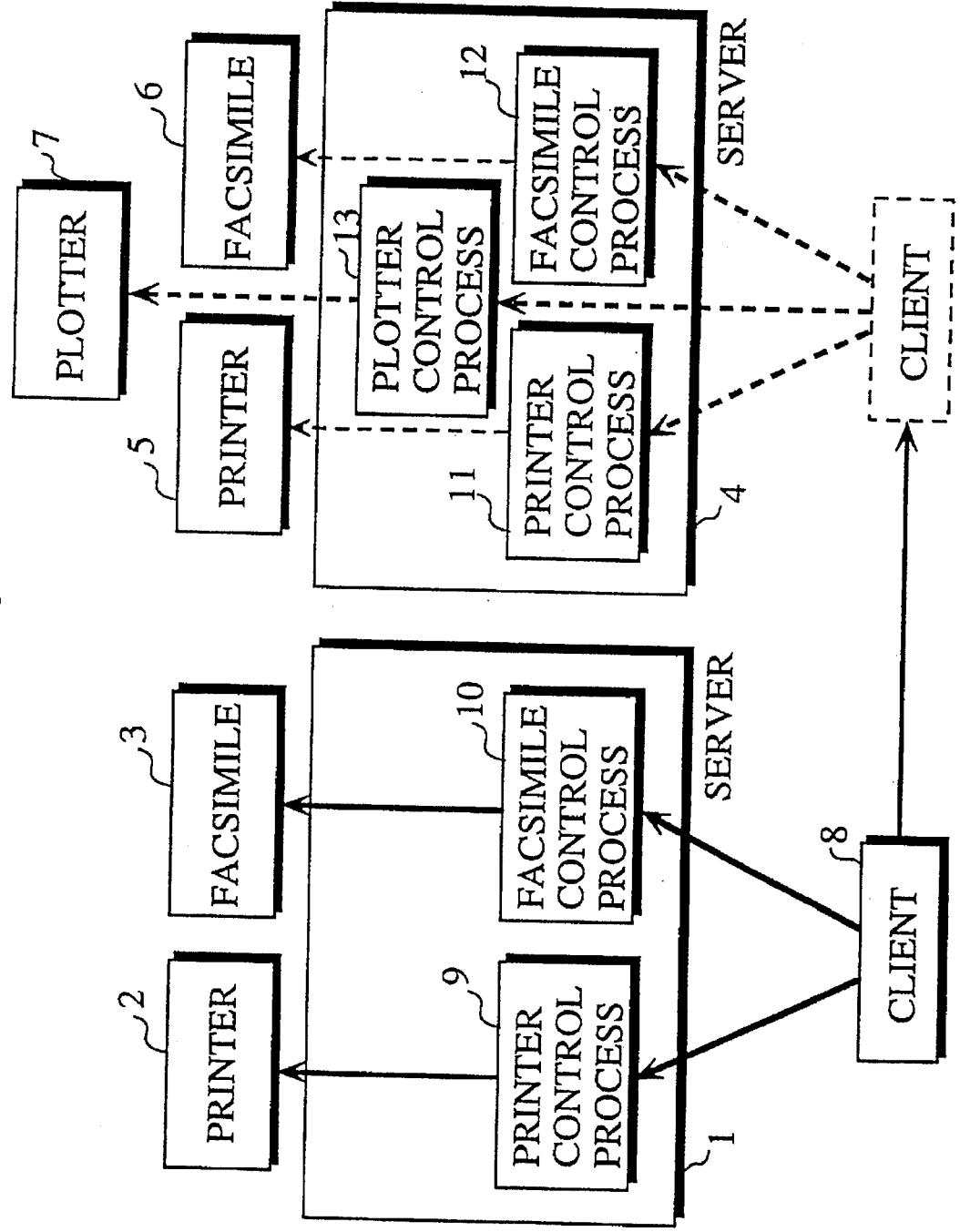
FIG. 1 is a block diagram showing the construction of a conventional server.
Figures 2, 3:
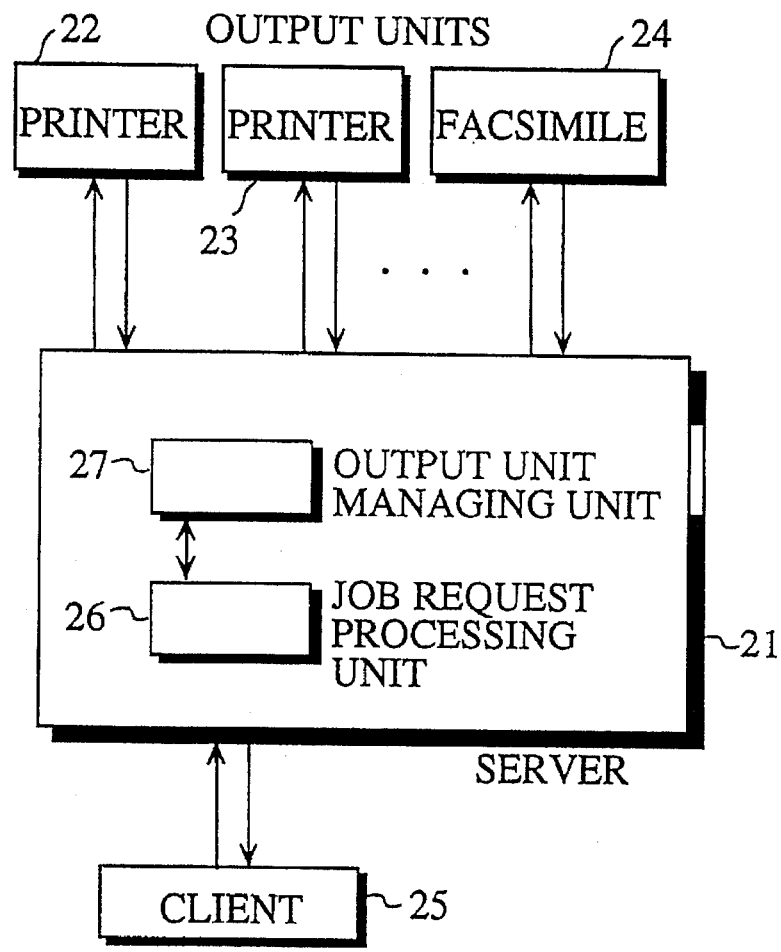
FIG. 2 is a block diagram showing the construction of a server in accordance with a first embodiment of the present invention.
FIG. 3 is a view showing the contents of output unit information used in the first embodiment.

The construction of a server in accordance with the first embodiment is depicted in FIG. 2. In the drawing, output units including a PostScript(a registered trademark of Adobe Systems Incorporated) printer 22, a text printer 23, a facsimile 24 are connected to a server 21, and a client 25 is also connected to the server 21 to use these output units. The server 21 has installed a job request processing unit 26 and an output unit managing unit 27.

The job request processing unit 26 handles a variety of job requests to the output units from the client 25.

The output unit managing unit 27 holds and manages a correspondence table showing a correspondence between identifiers specifying a type of an output unit and the output unit as is shown in FIG. 3. The correspondence table is hereinafter referred to as output unit information. The output unit managing unit 27 also forwards the job request from the job request processing unit 26 to one of the output units, and also returns a response therefrom to the job request processing unit 26 and further to the client 25.

The output unit identifier in the output unit information specifies one particular output unit and is, in practice, an entry, with which the server 21 can access to that particular output unit. For example, when the output units are connected to the server 21 via network, the identifier is a network address, whereas when the output units are connected to the server via serial line, it is a port number connected to that particular output unit.

Figure 4:
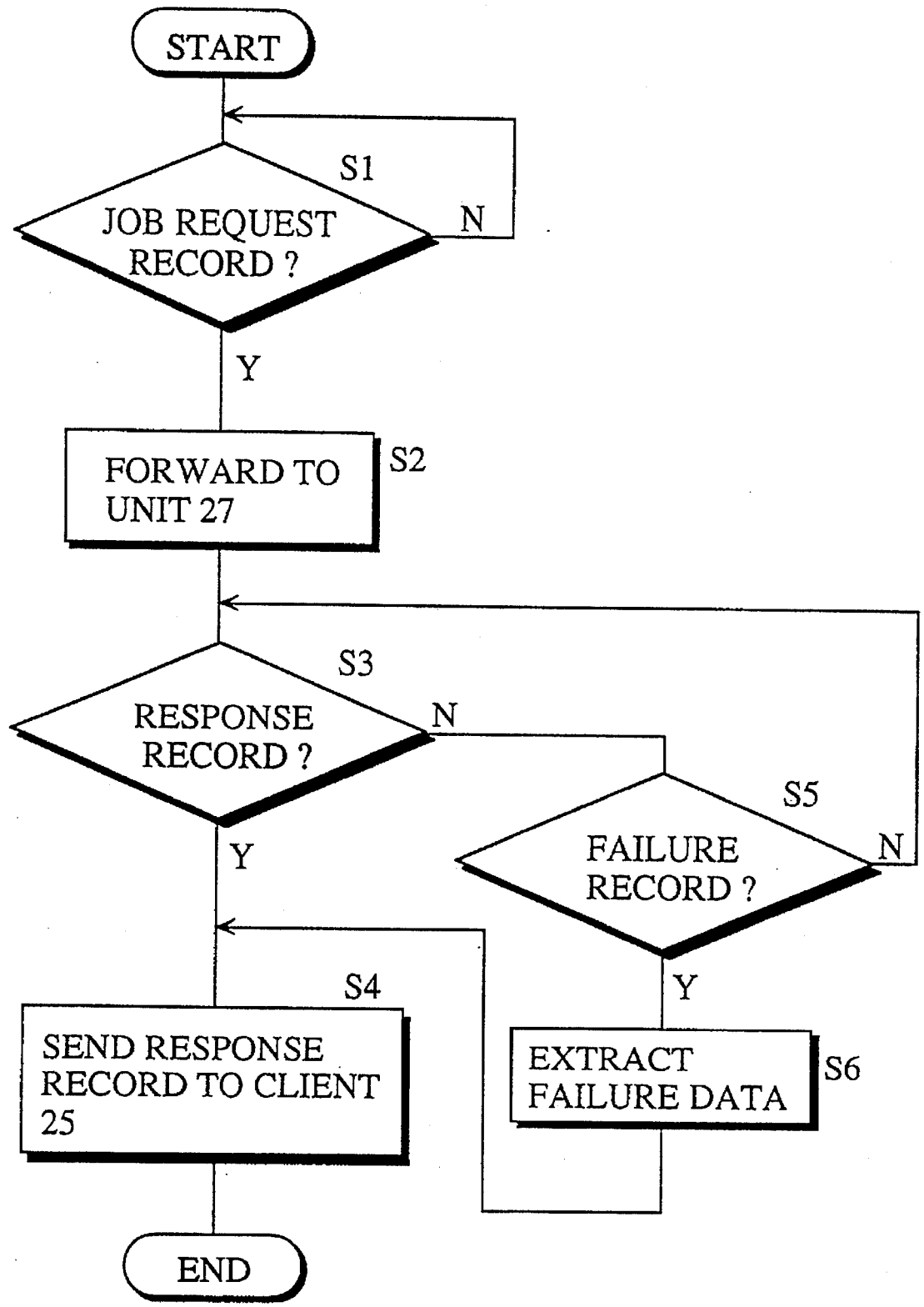
FIG. 4 is a flowchart detailing the operation of a job request processing unit in the first embodiment.

The operation of the server 21 constructed as above will be explained with referring to FIGS. 4 and 5, which detail the operations of the job request processing unit 26 and output unit managing unit 27, respectively.

Prior to the explanation, it should be understood that each job request and response is sent in the form of a data format called a record. Thus, the client 25 sends a job request record 110 to the job request processing unit 26 in the server 21 to use one of the output units. The job request record 110 is formatted as is shown FIG. 6, and it includes information 111 identifying itself as being a job request, a request sender client identifier 112, an output unit type identifier 113 (hereinafter, simply referred to as type identifier 113), and transmission data 114. The type identifier 113 specifies a type of the output unit such as the printer, facsimile, plotter and electronic black board, and a model thereof such as a print-out format of the printer.

Once the job request processing unit 26 receives the job request record 110(Step 1), it forwards the job request record 110 to the output unit managing unit 27(Step 2). Upon the receipt of the job request record 110(Step 11), the output unit managing unit 27 extracts the type identifier 113 therefrom (Step 12), and retrieves the output unit information(Step 13)

to obtain a corresponding output unit identifier from an entry for the same type of the output units (Step 14). Accordingly, the output unit managing unit 27 secures a communication with the output unit specified by the output unit identifier in that entry(Step 15); it specifies either a network address or a port number of the specified output unit to establish a connection or to acquire an access authorization.

Subsequently, the output unit managing unit 27 extracts and sends the transmission data 114 from the job request record 110 to the specified output unit(Step 16).

Accordingly, the specified output unit processes the transmission data 114 as per job request, and returns a certain response to the output unit managing unit 27(Step 17). The output unit managing unit 27 in turn generates a response record 120 with the response, and sends the response record 120 to the job request processing unit 26(Step 18). The response record 120 is formatted as is shown in FIG. 6, and it includes information 112 identifying itself as being a response, a response receiver client identifier 122, and response data 123. Note that the response receiver client identifier 122 stores the same value as the request sender client identifier 112 in the job request record 110, and the response data 123 are the data related to the response from the output unit.

Once the job request processing unit 26 receives the response record 120(Step 3), it extracts and sends the response data 123 alone to the client 25 specified by the response receiver client identifier 122(Step 4).

When the output unit information includes no entry for the type identifier 113 in Step 14, the output unit managing unit 27 generates and sends a failure notice record 130 to the job request processing unit 26 instead of securing a communication with any output unit(Step 19). The failure notice record 130 is formatted as is shown in FIG. 6, and it includes information 131 identifying itself as being a failure notice, a response receiver client identifier 132, and data 133 exhibiting a failure. Note that the response receiver client identifier 132 stores the same value as the request sender client identifier 112 in the job request record 110.

Once the job request processing unit 26 receives the failure notice record 130(Step 5), it extracts and sends the data 133 alone(Step 6) to the client 25 specified by the response receiver client identifier 132(Step 4).

As has been described, by managing the output unit information at the output unit managing unit 27, the server 21 can automatically select an adequate output unit and send the data for a job execution when it receives a job request that specifies the type of the output unit alone.

SECOND EMBODIMENT

Figure 7:
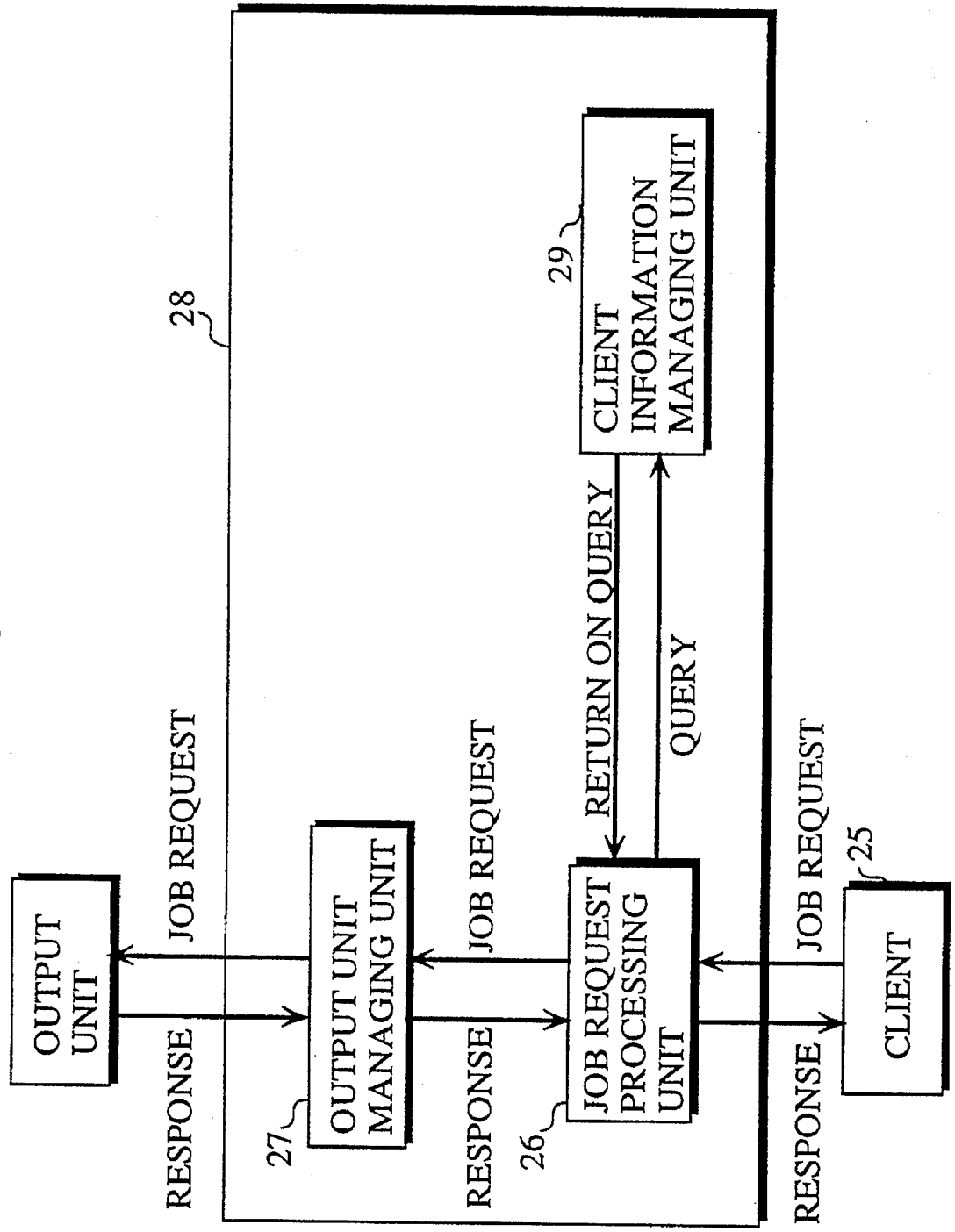
FIG. 7 is a block diagram showing the construction of a server in accordance with a second embodiment of the present invention.

The construction of a server in accordance with the second embodiment is depicted in FIG. 7. Compared with the first embodiment, a server 28 of the second embodiment additionally includes a client information managing unit 29 to enable to provide information of the output units to the client 25 or update the information stored therein. As is shown in FIG. 8, the client information managing unit 29 holds a plurality of entries, and each entry includes client information composed of a client identifier, an output unit type identifier, and an output unit identifier. Thus, the client information managing unit 29 extracts an adequate entry in accordance with a client information request record from the job request processing unit 26. The client information request record will be described later. Hereinafter, like components are labeled with like reference numerals with respect to the first embodiment, and the description of these components is not repeated.

The operation of the server 28 is detailed by the flowcharts in FIGS. 9 through 18, and an explanation thereof will be given in the following.

First, how the server 28 handles a job request will be explained.

The client 25 sends the job request record 110 to the job request processing unit 26 in the server 28 to use one of the output units connected thereto. Upon the receipt of the job request record 110(Step 31 in FIG. 9), the job request processing unit 26 calls out a sub-routine detailed by the flowchart in FIG. 10(Step 32). Then, the job request processing unit 26 confirms that the job request record 110 does not specifies the output unit(Step 321), and generates and sends a client information request record 210 to the client information managing unit 29(Step 322). The job request processing unit 26 requests client information to ensure whether or not the client 25 that has sent the job request specifies any particular output unit for the specified type. The client information request record 210 is formatted as is shown in FIG. 19, and it includes information 211 identifying itself as being a client information request, a request sender client identifier 212, and an output unit type identifier 213.

Figure 14:
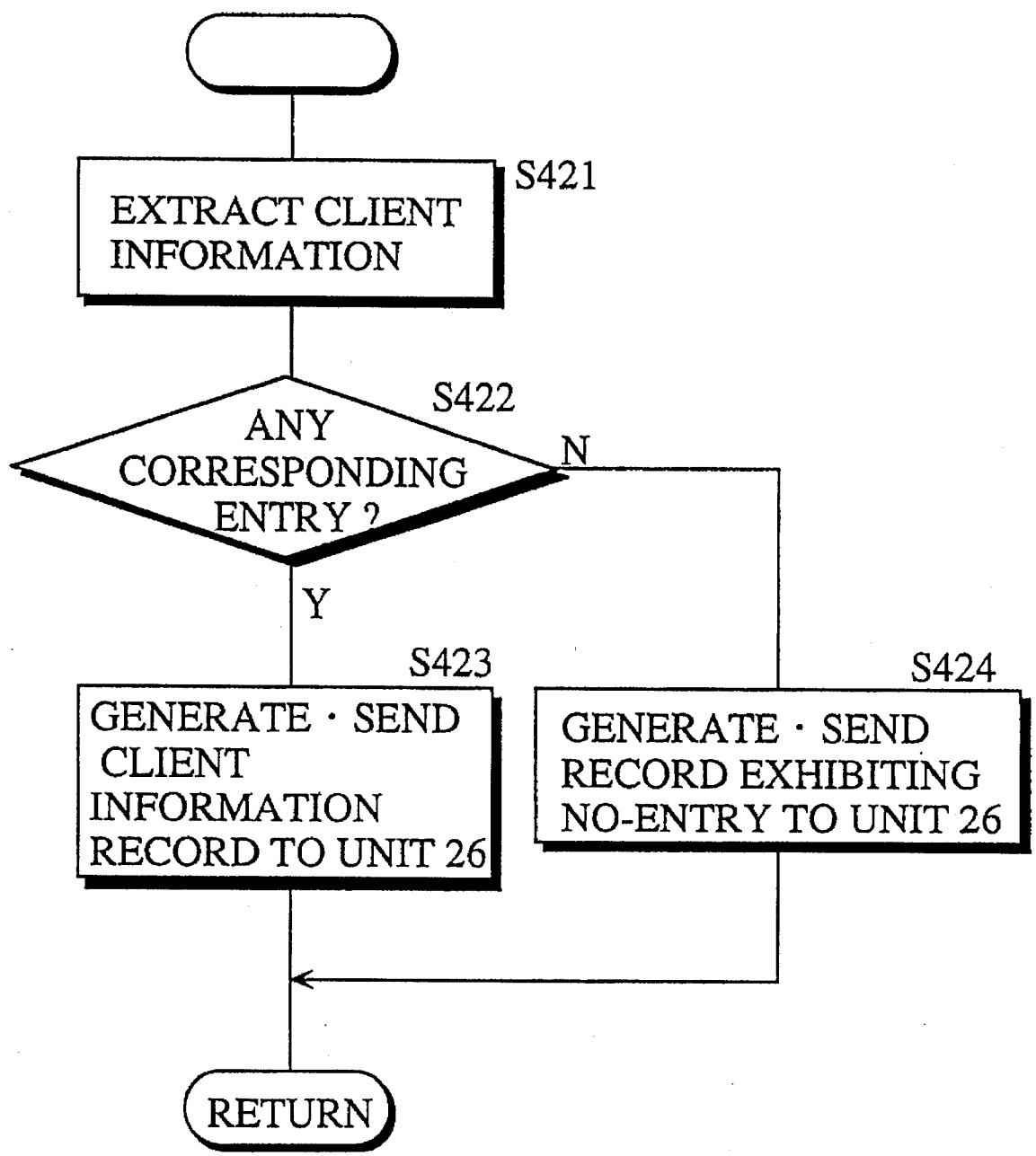
FIG. 14 is a flowchart detailing a first sub-routine of the flowchart in FIG. 13.

When the client information managing unit 29 receives the client information request record 210(Step 41 in FIG. 13), it calls out a sub-routine detailed by the flowchart in FIG. 14(Step 42). Then, the client information managing unit 29 retrieves an entry whose client identifier and output unit type identifier respectively coincide with the request sender client identifiers 212 and type identifier 213(Step 421, Step 422). Accordingly, the client information managing unit 29 generates and sends a client information record 220 to the job request processing unit 26(Step 423, Step 424). The client information record 220 is formatted as is shown in FIG. 19, and it includes information 221 identifying itself as being a client information, a request sender client identifier 222, an output unit type identifier 223, and an output unit identifier 224. Note that the request sender client identifier 222 and type identifier 223 store the same value as the request sender client identifier 212 and type identifier 213 in the client information request record 210, respectively. When the client information includes an entry such that satisfies the above identifier-coincidence condition, the output unit identifier 224 stores the same value as the output unit identifier in that entry; otherwise, the output unit identifier 224 stores a unique value exhibiting "no-entry". For example, the unique value may have 0 and the value for the output unit identifier may have a positive integer.

When the job request processing unit 26 receives the client information record 220, it sends either the job request record 110 or another type of job request, i.e., an output-unit-specifying job request 230, to the output unit managing unit 27 depending on what the output unit identifier 224 stores: when the output unit identifier 224 stores the unique value exhibiting "no-entry" (Step 323 in FIG. 10), the job request processing unit 26 only forwards the job request record 110 from the client 25(Step 326) to the output unit managing unit 27 because no particular output unit can be specified here; when the output unit identifier 224 stores a value of the output unit identifier(Step 323), the job request processing unit 26 generates and sends the output-unit-specifying job request record 230(Step 324). The output-unit-specifying job request record 230 is formatted as is shown in FIG. 19, and it includes information 231 identifying itself as being an output-unit-specifying job request, a request sender client identifier 232, an output unit identifier 233, and transmission data 234. Note that the request sender client identifier 232 and transmission data 234 respectively store the same value as the request sender client identifier 112 and the transmission data 114 in the job request record 110, while the output unit identifier 233 stores the same value as the output unit identifier 224 in the client information record 220.

Figure 16:
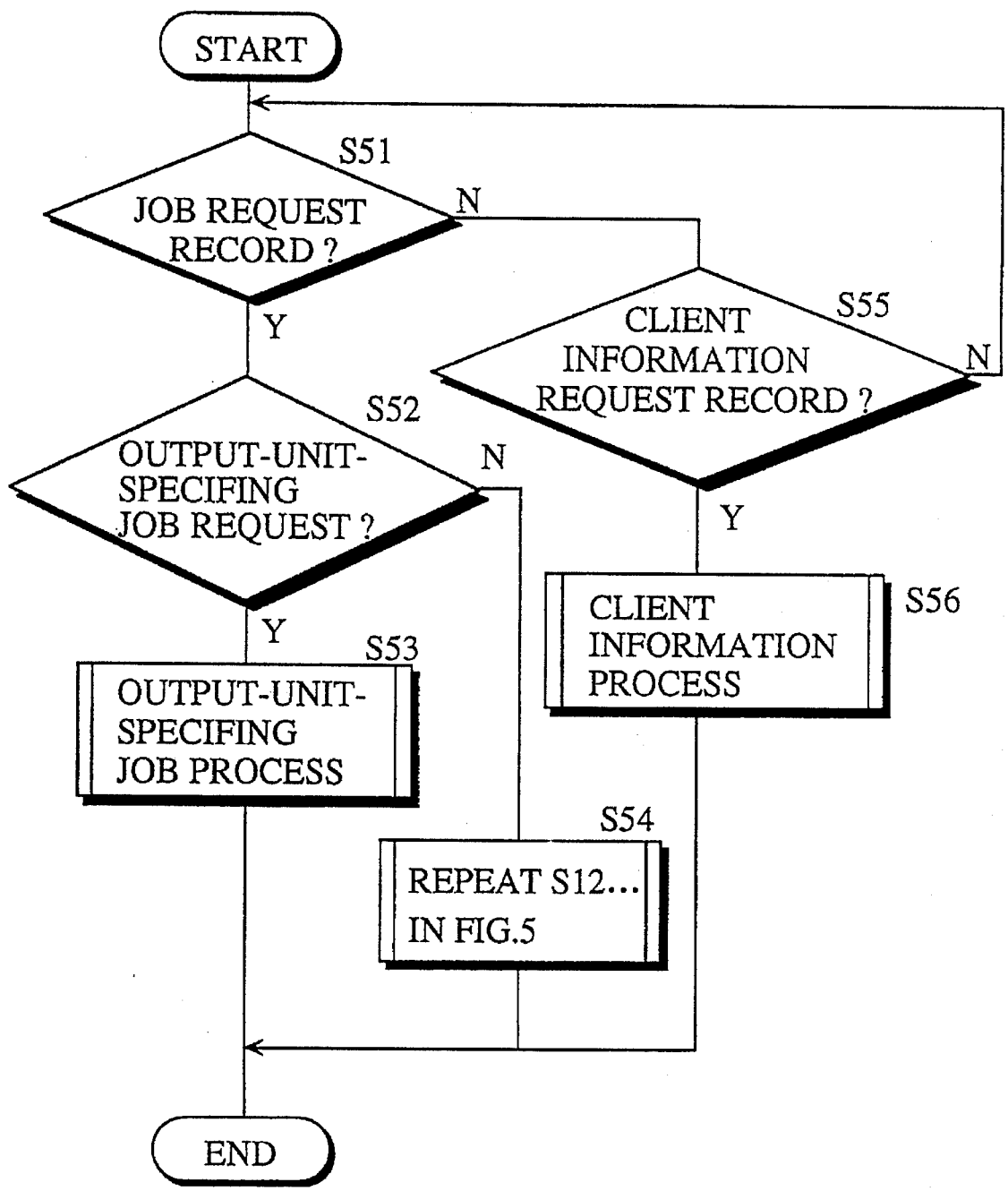
FIG. 16 is a flowchart detailing the operation of an output unit managing unit in the second embodiment.
Figure 17:
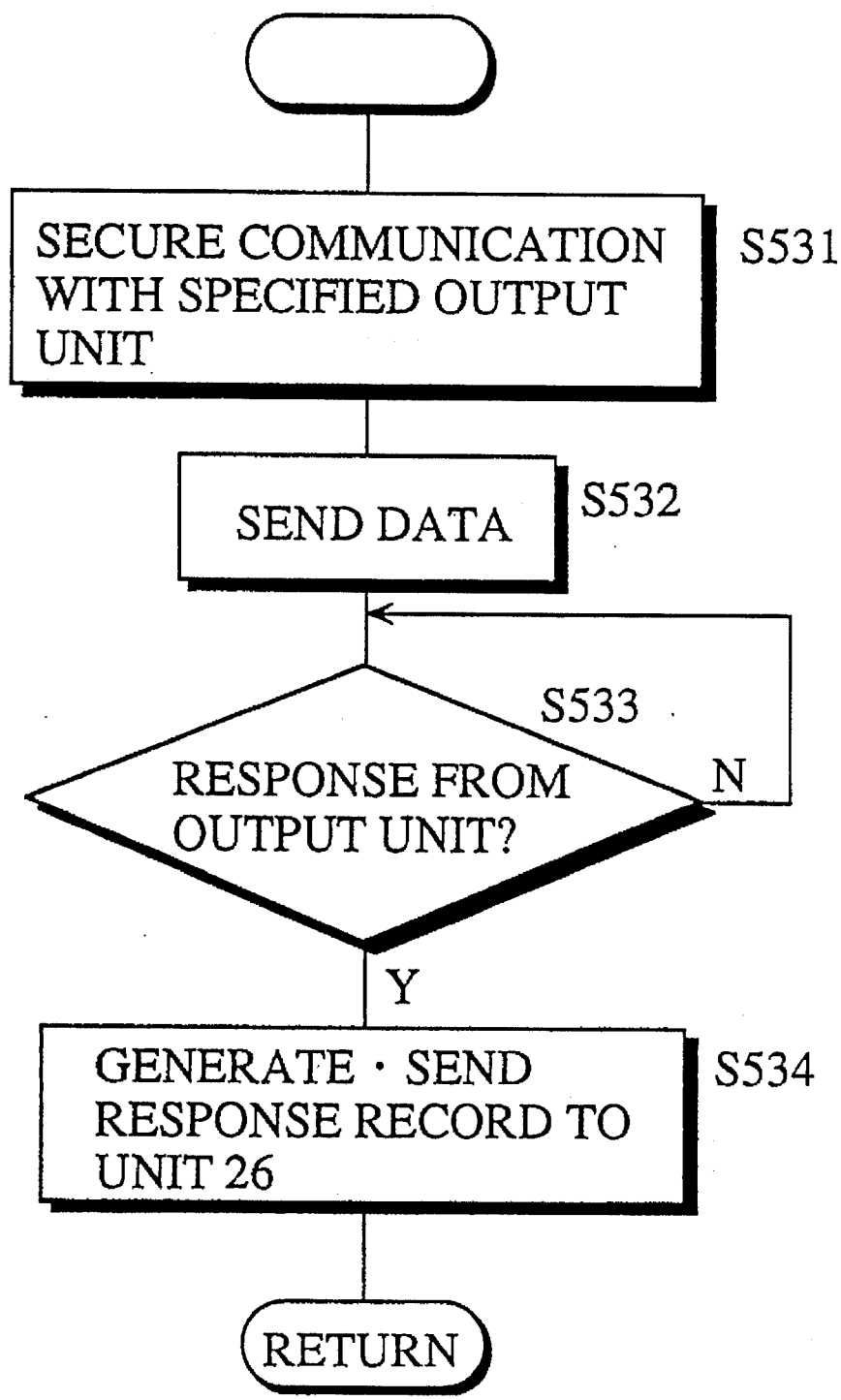
FIG. 17 is a flowchart detailing a first sub-routine of the flowchart in FIG. 16.

In this way, the output unit managing unit 27 receives either the job request record 110 or output-unit-specifying job request record 230 from the job request processing unit 26(Step 51 in FIG. 16). Thus, it judges whether it received the output-unit-specifying job request record 230 or not(Step 52). In case of NO, the output unit managing unit 27 operates in the same way as the first embodiment by repeating Steps 12 and the following Steps in FIG. 5(Step 54). Otherwise, the output unit managing unit 27 calls out a sub-routine detailed by the flowchart in FIG. 17(Step 53). Then, the output unit managing unit 27 immediately secures a communication with the output unit specified by the output unit identifier 233 in the output-unit-specifying job request record 230 without retrieving the output unit information (Step 531), as well as sending the transmission data 234 to the specified output unit(Step 532). Having sent the transmission data 234, the output unit managing unit 27 awaits for a response from the specified output unit(Step 533), and generates and sends the response record 120 upon the receipt of the response to the job request processing unit 26(Step 534).

When the client 25 prefers to send a job request with directly specifying a particular output unit, the client 25 may generate the output-unit-specifying job request record 230. In this case, the client 25 specifies the output unit identifier 233 of the desired output unit, so that the job request processing unit 26 forwards the output-unit-specifying job request record 230 directly to the output unit managing unit 27(Step 321 to Step 324, skipping Step 322, Step 323 in FIG. 10). The output unit managing unit 27 accordingly sends the transmission data 234 to the output unit specified by the output unit identifier 233 without referring to the output unit information. The specified output unit returns a response to the client 25 in the same way as described above. Therefore, the job request processing unit 26 has no communication with the client information managing unit 29 in this case. It should be noted that the client 25 may send the output-unit-specifying job request record 230 in the first embodiment as well.

Next, how the server 28 provides the client information to the client 25 will be explained.

Figure 9:
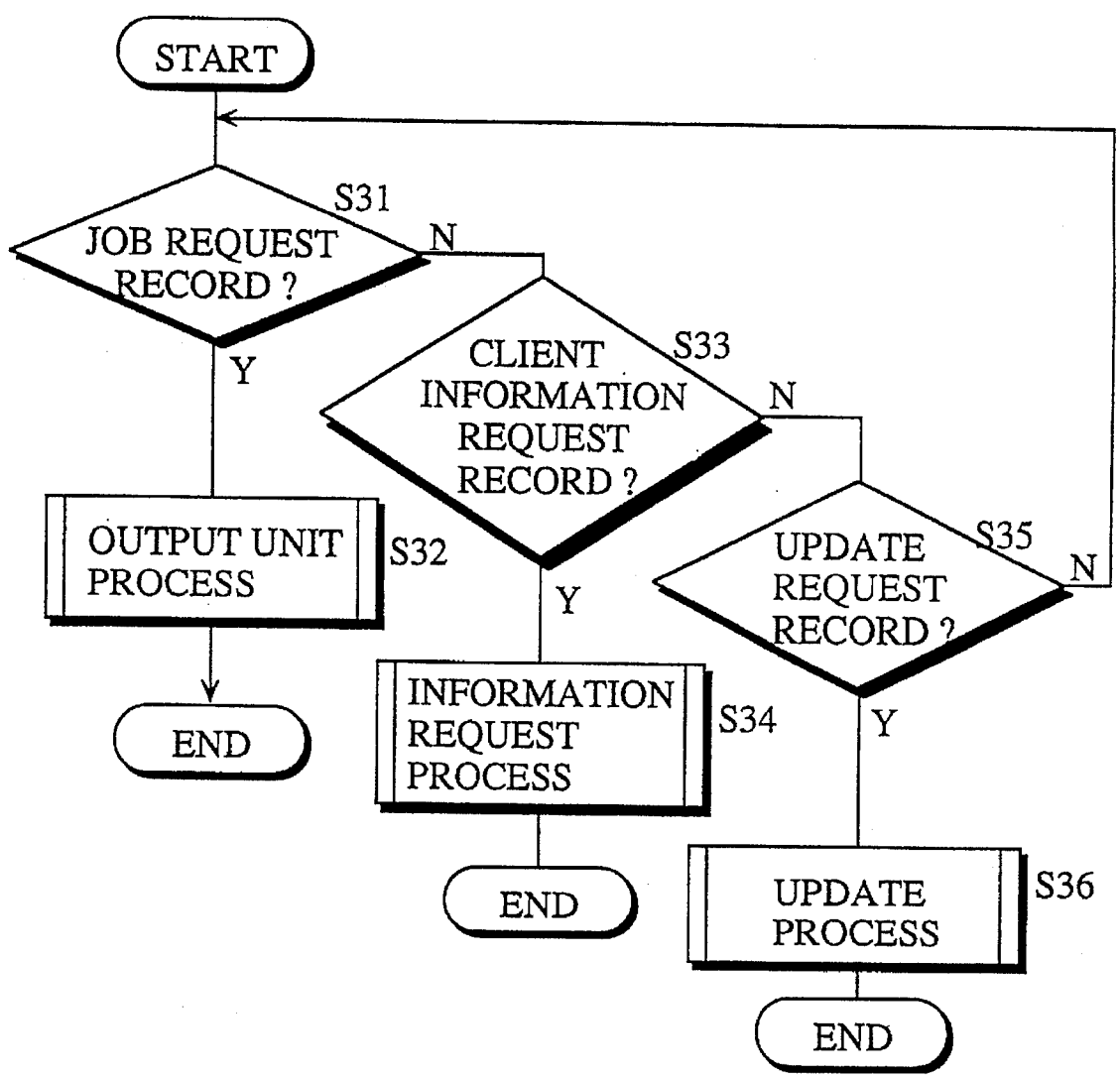
FIG. 9 is a flowchart detailing a request processing unit in the second embodiment.
Figure 10:
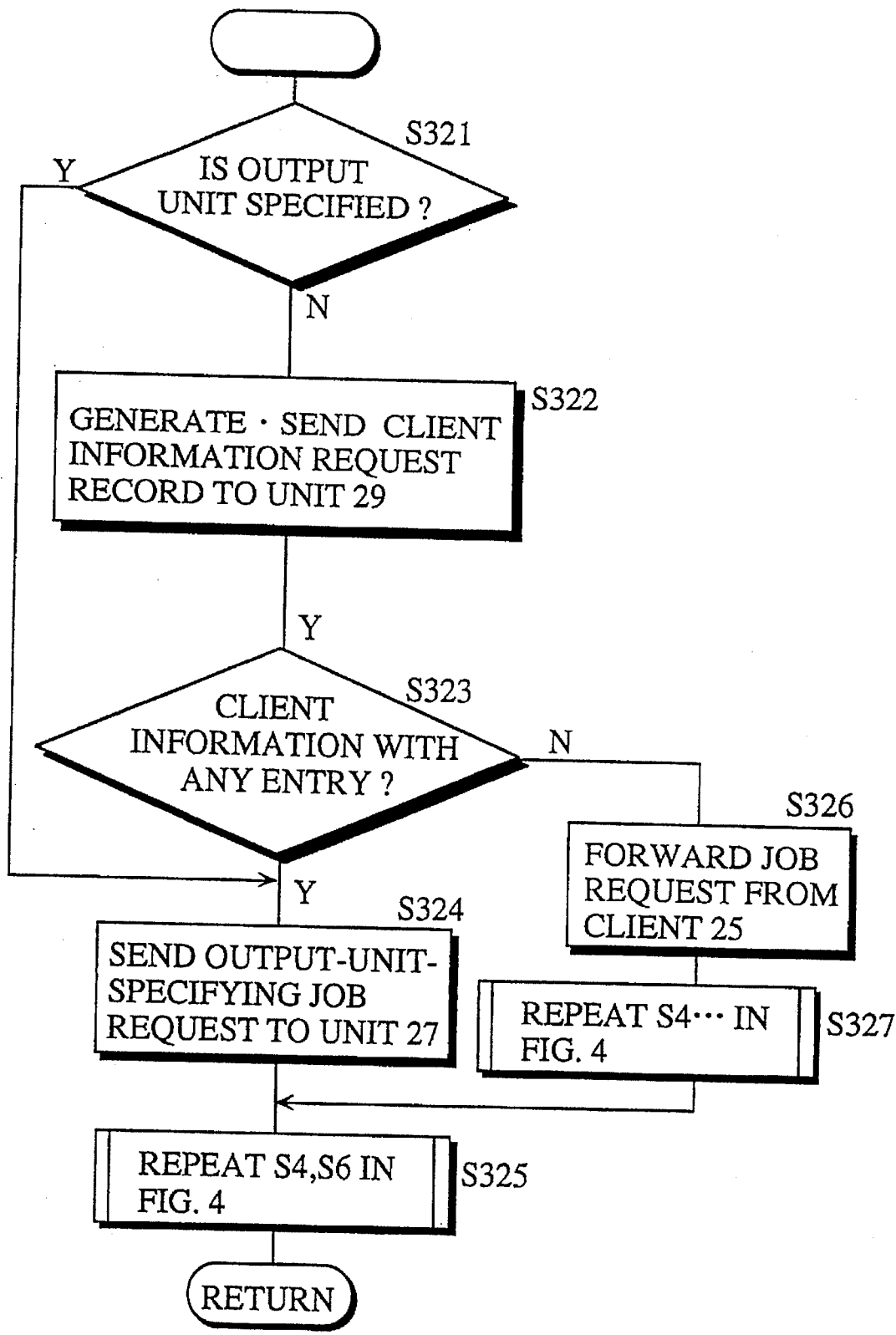
FIG. 10 is a flowchart of a first sub-routine of the flowchart in FIG. 9.

The client 25 sends a client information request record 310 to the job request processing unit 26 in the server 28(Step 33 in FIG. 9). The client information request record 310 is formatted as is shown in FIG. 20, and it includes information 311 identifying itself as being a client information request, a request sender client identifier 312, and an output unit type identifier 313. Note that the client information request record 310 may include a plurality of the type identifiers 313 to specify a plurality of types of the output units or store a unique value that specifies all types of the output units. For example, the unique value may have 0, and the value for the type identifier 313 may have a positive integer.

Upon the receipt of the client information request record 310(Step 33), the job request processing unit 26 calls out a sub-routine detailed by the flowchart in FIG. 11(Step 34), and subsequently sends the client information request record 310 to both the output unit managing unit 27 and client information managing unit 29(Step 341).

Upon the receipt of the client information request record 310(Step 41), the client information managing unit 29 extracts an adequate entry from the client information in the same way when the client 25 sends the job request record 110 (Step 421 in FIG. 14). More precisely, the client information managing unit 29 extracts an entry whose client identifier coincides with the request sender client identifier 312, and whose output unit type identifier coincides with one of the values stored of the type identifier 313; the entry must include output unit type identifiers specifying all the types when the type identifier 313 has stored the unique value. Accordingly, the client information managing unit 29 generates and sends a client information record 330 from the extracted entry to the job request processing unit 26(Step 423). The client information record 330 is formatted as is shown in FIG. 20, and it includes information 331 identifying itself as being a client information, a request sender client identifier 332, an output unit type identifier 333, and an output unit identifier 334. Note that the client information record 330 may include a plurality of pairs of the type identifier 333 and output unit identifier 334 to sequentially store all of the corresponding identifiers in the extracted entry.

Figure 18:
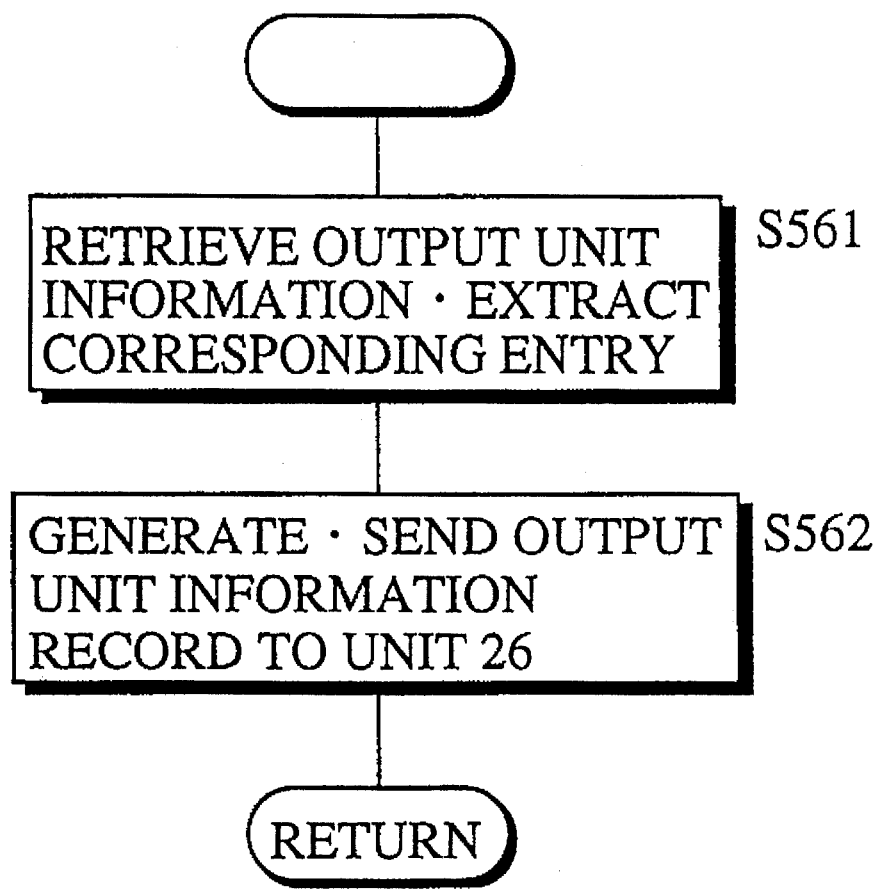
FIG. 18 is a flowchart detailing a second sub-routine of the flowchart in FIG. 16.

On the other hand, when the output unit managing unit 27 receives the client information request record 310 from the job request processing unit 26(Step 55 in FIG. 16), it calls out a sub-routine detailed by the flowchart in FIG. 18(Step 56). Then, the output unit managing unit 27 extracts an adequate entry from the output unit information shown in FIG. 3(Step 561). More precisely, the output unit managing unit 27 extracts an entry whose output unit type identifier coincides with one of the values of the type identifiers 313; the entry must include output unit type identifiers specifying all the types when the type identifier 313 has stored the unique value. Accordingly, the output unit managing unit 27 generates and sends an output unit information record 320 to the job request processing unit 26(Step 562). The output unit information record 320 is formatted as is shown in FIG. 20, and it includes information 321 identifying itself as being an output unit information, a request sender client identifier 322, an output unit type identifier 323, and an output unit identifier 324. Note that the output unit information record 320 may include a plurality of pairs of the type identifier 323 and output unit identifier 324 to sequentially store all of the corresponding identifiers included in the extracted entry.

Figure 11:
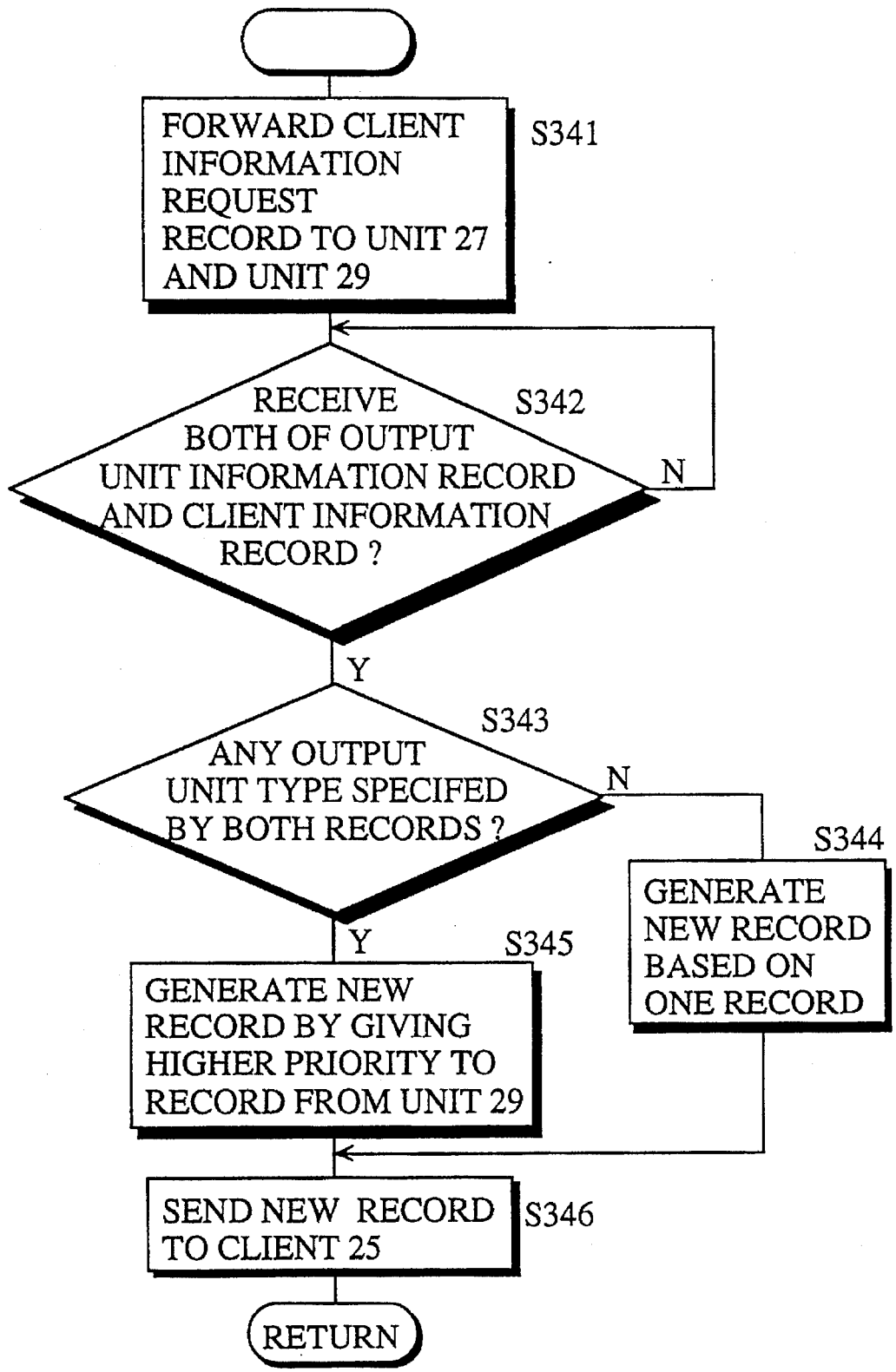
FIG. 11 is a flowchart of a second sub-routine of the flowchart in FIG. 9.

In this way, the job request processing unit 26 receives the client information record 330 and output unit information record 320 respectively from the client information managing unit 29 and output unit managing unit 27(Step 342 in FIG. 11). The job request processing unit 26 accordingly updates the client information record 330 already stored therein by generating a new client information record 330 with the client information record 330 and output unit information record 320 it has just received. With respect to an output unit type specified by only one of the two records, the job request processing unit 26 adds the type and output unit thereof as the type identifiers 323 and output unit identifier 324 of the new client information record 330, respectively(Step 344). Whereas with respect to an output unit type specified by both the two records, the job request processing unit 26 adds each type and output unit specified by the client information record 330 as the type identifier 323 and output unit identifier 324 of the new client information record 330, respectively(Step 345). By so doing, the job request processing unit 26 gives a higher priority to the entries included in the original client information 330. Note that the request sender client identifier 332 in the new client information record 330 stores the same value as the identifier 332 in the previous one. Once the job request processing unit 26 generates the new client information record 330, it sends the new client information record 330 to the client 25 that has sent the client information request record 310 (Step 346).

Next, how the server 28 updates the client information record 330 will be explained.

The client 25 sends a client information update request record 340 to the job request processing unit 26(Step 35 in FIG. 9). The client information update request record 340 is formatted as is shown in FIG. 20, and it includes information 341 identifying itself as being a client information update request, a request sender client identifier 342, an output unit type identifier 343, and an output unit identifier 344.

Figure 12:
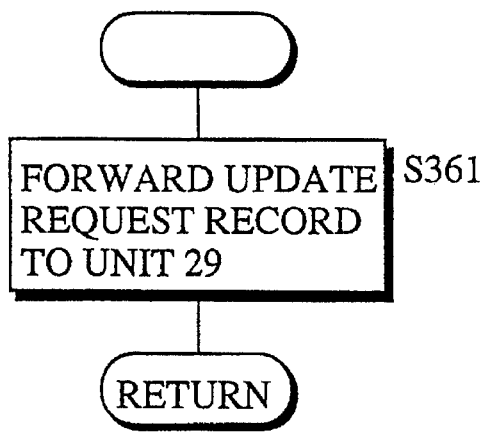
FIG. 12 is a flowchart of a third sub-routine of the flowchart in FIG. 9.
Figure 13:
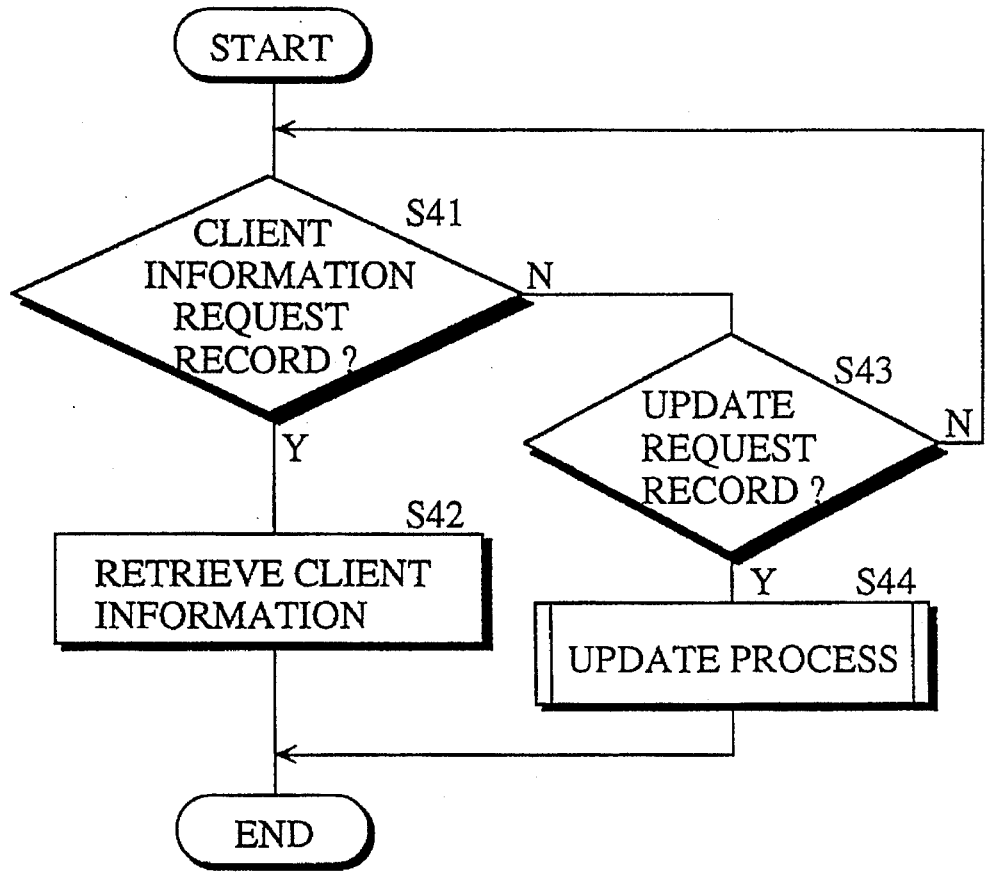
FIG. 13 is a flowchart detailing the operation of a client information managing unit in the second embodiment.

Upon the receipt of the client information update request 340, the job request processing unit 26 calls out the sub-routine detailed by the flowchart in FIG. 12(Step 36). Then, the job request processing unit 26 forwards the client information update request record 340 to the client information managing unit 29(Step 361 in FIG. 12).

Figure 15:
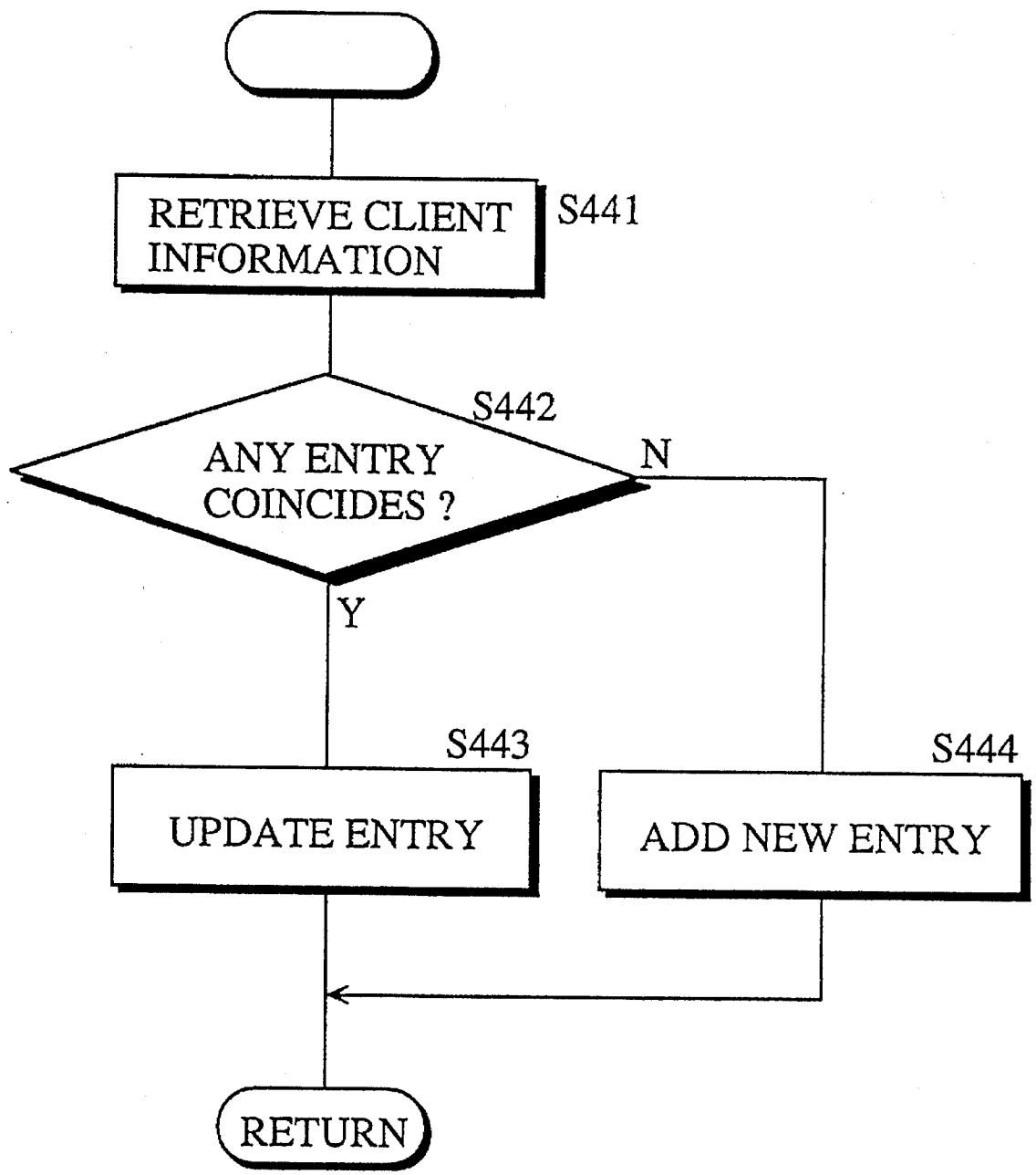
FIG. 15 is a flowchart detailing a second sub-routine of the flowchart in FIG. 13.

Upon the receipt of the client information update request record 340(Step 43 in FIG. 13), the client information managing unit 29 calls out the sub-routine detailed by the flowchart in FIG. 15(Step 44), and retrieves from the client information an entry whose client identifier and output unit type identifier coincide with the request sender client identifier 342 and type identifier 343, respectively(Step 441). If the client information managing unit 29 retrieves such an entry(Step 442), it updates the value of the output unit identifier in the entry by replacing it with that of the output unit identifier 344(Step 443). If the client information managing unit 29 fails to retrieve such an entry, it adds an entry composed of the identifiers having the same values as the request sender client identifier 342, type identifier 343, and output unit identifier 344 in client information update request record 340 to the client information(Step 444).

As has been described, by holding the client information managing unit 29, the server 28 can provide the information of the output units into the client 25 and update the client information by means of the client 25.

THIRD EMBODIMENT

Figure 21:
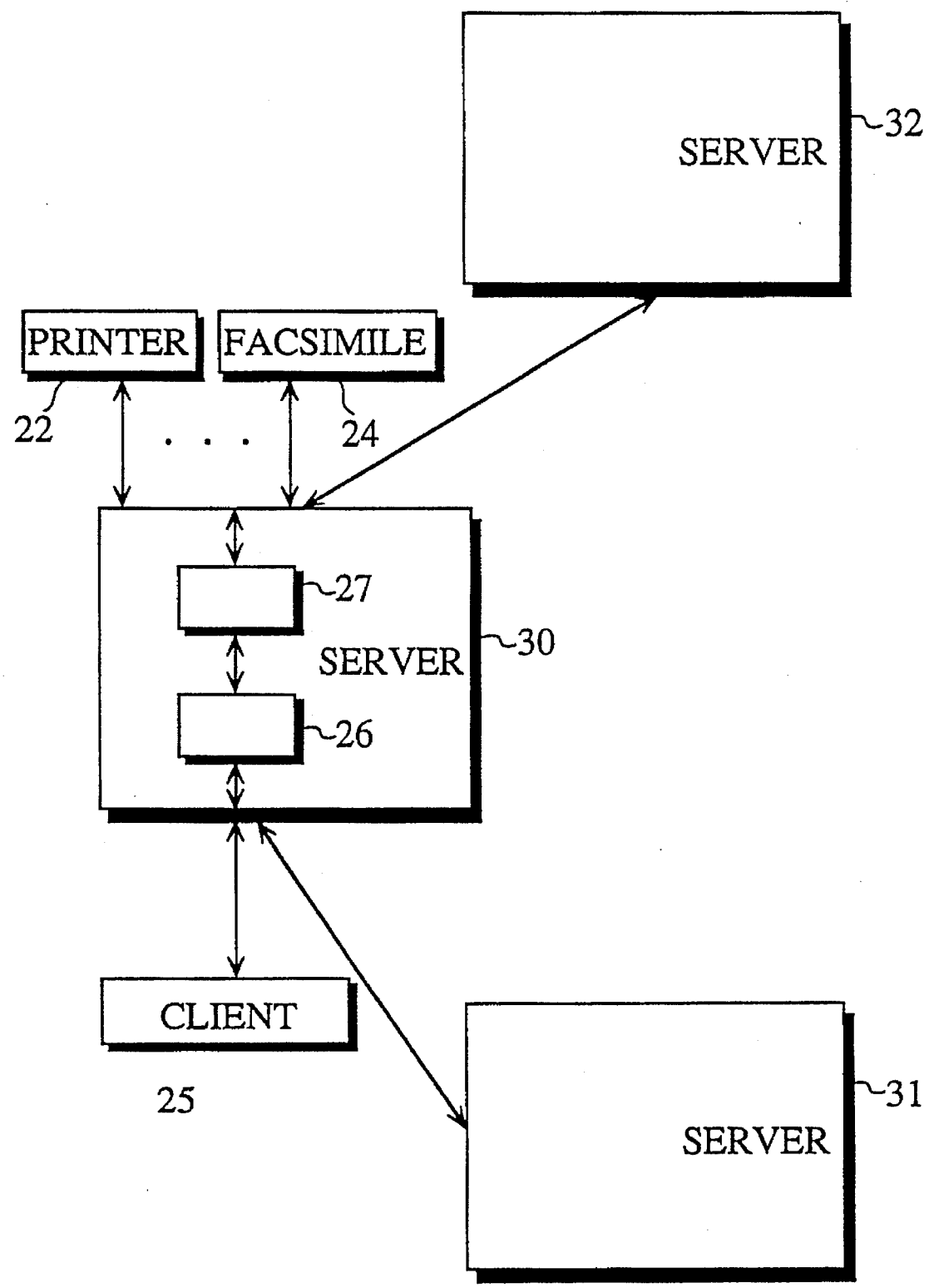
FIG. 21 is a block diagram showing the construction of a server in accordance with a third embodiment of the present invention.
Figure 22:
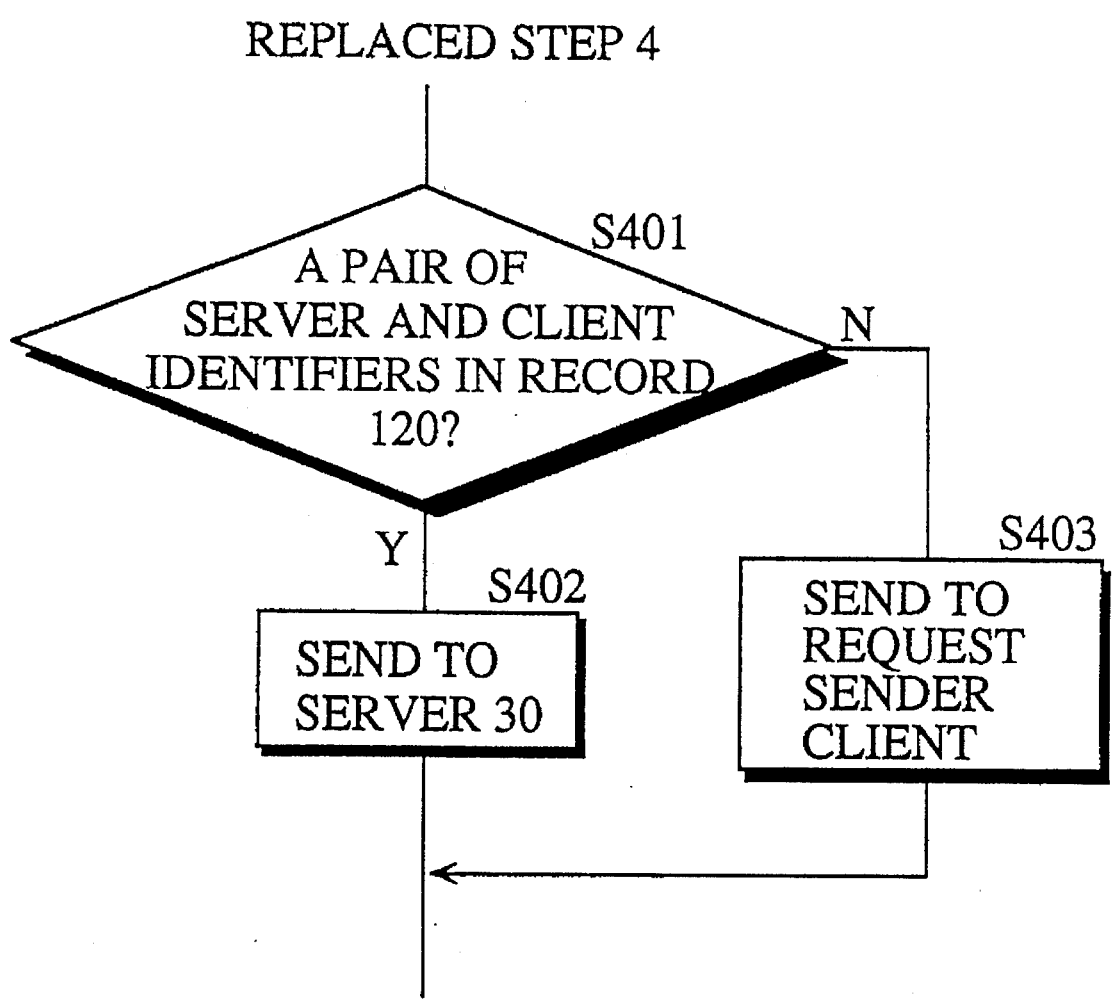
FIG. 22 is a part of a flowchart detailing the operation of a request processing unit in the third embodiment.
Figure 23:
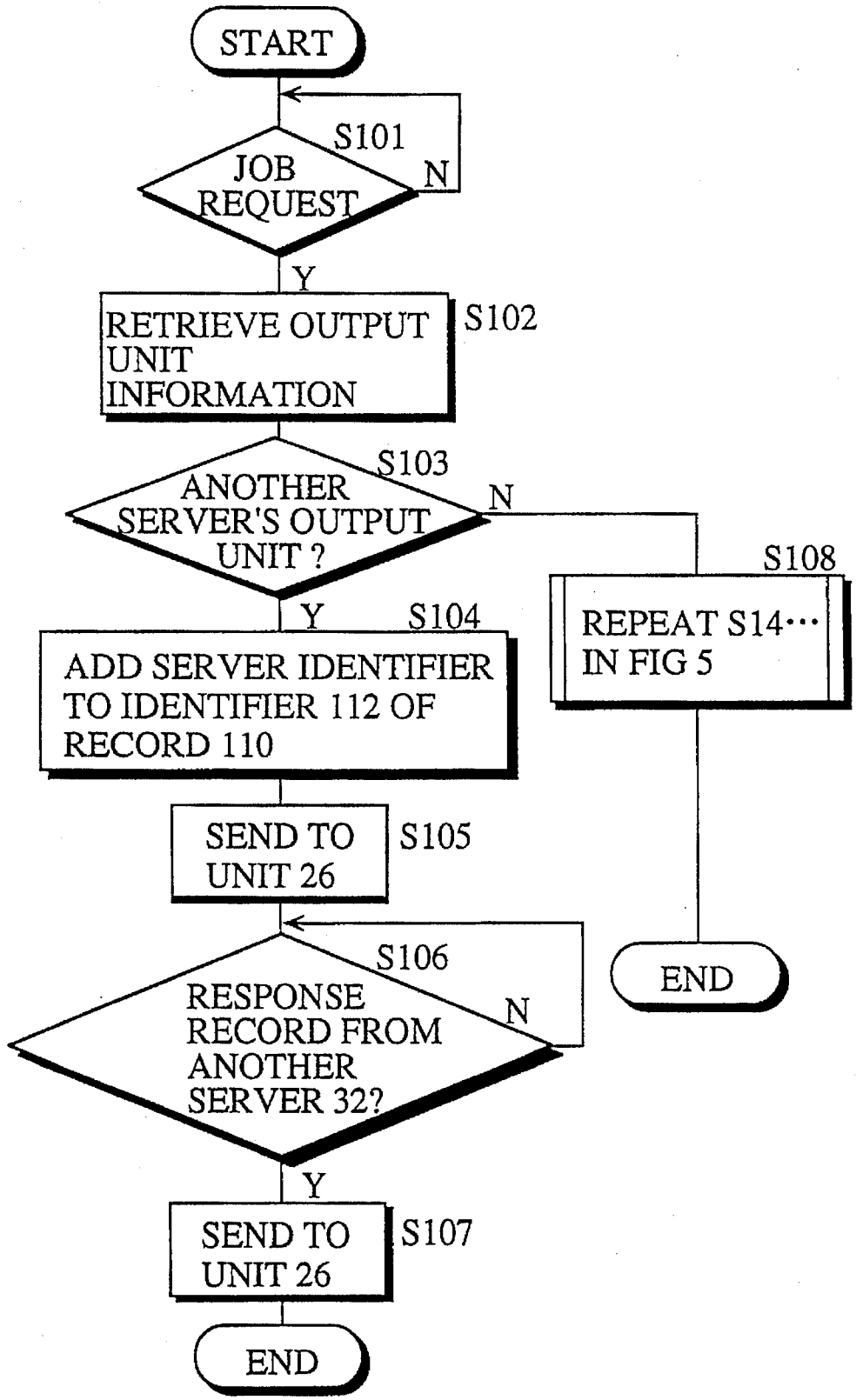
FIG. 23 is a flowchart detailing the operation of an output unit managing unit in the third embodiment.

The construction of a server in accordance with the third embodiment is depicted in FIG. 21. Compared with the first embodiment, a server 30 of the third embodiment is connected to a server 31 and a server 32, so that the servers 31, 32 can send job requests to the printer 22 and/or facsimile 24, or the client 25 can send a job request to the server 31 or 32 to use unillustrated output units connected thereto. For this reason, the flowchart in FIG. 4 detailing the operation of the request managing unit 26 is partly replaced with the one in FIG. 22. Also, the flowchart in FIG. 5 detailing the operation of the output unit managing unit 27 is replaced with the one in FIG. 23. Further, the output unit information held in the output unit managing unit 27 includes the information of the unillustrated output units connected to the servers 31, 32 besides that of the output units connected to the server 30(the printer 22 and facsimile 24). Note that, however, the output unit information includes information showing to which server the output unit is connected and a server identifier. Hereinafter, like components are labeled with like reference numerals with respect to the first embodiment, and the description of these components is not repeated.

First, the explanation of the operation of the server 30 when the job request processing unit 26 receives a job request record 110 from another server(herein the server 31) will be given.

The job request record 110 is formatted as is shown in FIG. 6; however, the request sender client identifier 112 additionally includes the server identifier(herein the server 31). The job request processing unit 26 operates in the same way as was explained by the flowchart in FIG. 4 except for Step 4, where the response record 120 is generated and sent, and the output unit managing unit 27 operates in the same way as the first embodiment by proceeding to Step 101, Step 102, Step 103 and Step 108. In other words, the job request processing unit 26 receives the job request record 110, selects an adequate output unit by referring to the type identifier 113 therein, sends the transmission data 114 to the specified output unit for the job execution as if the job request processing unit 26 received the job request record 110 from the client 25. Note that, however, the output unit managing unit 27 stores a pair of the server identifier and request sender client identifier 112 into the response receiver client identifier 122 in the response record 120 in this case. Thus the job request processing unit 26 judges whether it should send the response record 120 to the client 25 or server 31(Step 401 in FIG. 22). When the job request processing unit 26 detect such a pair, it sends the response record 120 to the server 31(Step 402), and the server 31 sends the response record 120 to an unillustrated client specified by the response receiver client identifier 122 accordingly.

Next, the explanation of the operation of the server 30 when the client 25 sends a job request to one of the unillustrated output units connected to another server (herein the server 32) will be given.

In this case, when the job request processing unit 26 receives the job request record 110 from the client 25, it forwards the job request record 110 to the output unit managing unit 27. Accordingly, the output unit managing unit 27 retrieves the output unit information by referring to the type identifier 113 in the job request record 110(Step 102 in FIG. 23), and it judges the specified output unit is the one connected to the server 32(Step 103). Subsequently, the output unit managing unit 27 generates a new job request record 110 by adding its server identifier to the request sender client identifier 112, and sends the new job request record 110 to the server 32. In case that the server 32 is constructed in the same way as the server 30, the specified output unit connected to the server 32 duly runs the job upon the receipt of the new job request record 110 and return a response to the output unit managing unit 27 in the server 30(Step 106). Accordingly, the output unit managing unit 27 generates and sends the response record 120 to the job request processing unit 26(Step 107), which extracts and sends the response data 123 from the response record 120 to the client 25.

As a result, the server 30 can send a job request sent from the client connected to another server to the output units connected to itself and vice versa.

Note that this embodiment may be combined with the second embodiment enclosing the client information managing unit 29. In this case, the client identifier in each record must store a pair of the identifiers specifying the server and request sender client, so that the client information can also store such pairs. As well, the server 30 may communicate with the other servers to provide or update the output unit information and client information.

FOURTH EMBODIMENT

Figure 24:
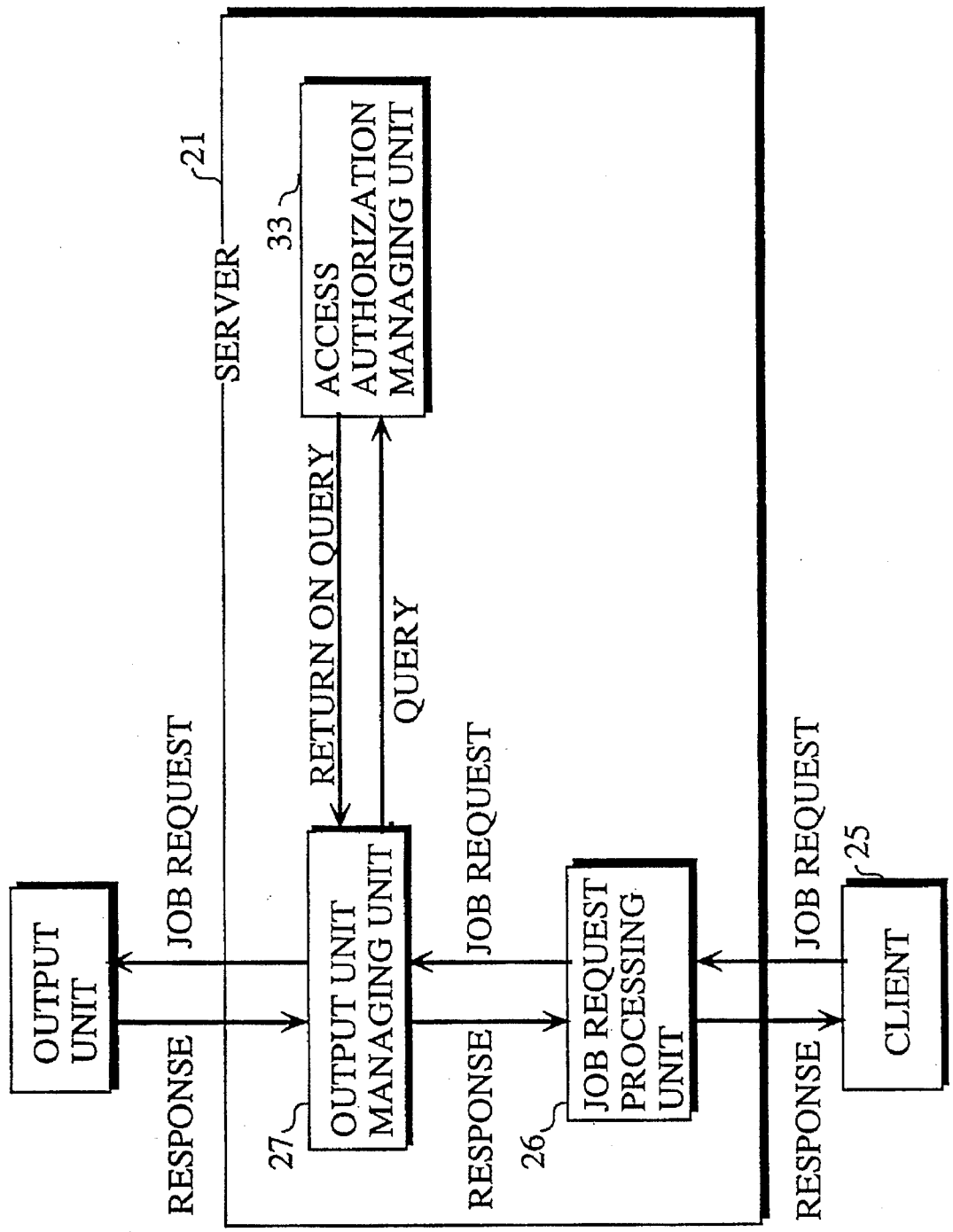
FIG. 24 is a block diagram showing the construction of a server in accordance with a fourth embodiment of the present invention.

The construction of a server in accordance with the fourth embodiment is depicted in FIG. 24. Compared with the first embodiment, the server 21 additionally includes an access authorization managing unit 33. The access authorization managing unit 33 holds a correspondence table shown in FIG. 25 as to whether a job request is permitted or not in relation with the client and output unit. The output unit managing unit 27 accesses to this correspondence table by sending an access authorization request 410, and it does so only when the output unit information stored therein includes an entry whose output unit type identifier coincide with the type identifier 113 in the job request record 110. The access authorization request 410 is formatted as is shown in FIG. 26, and it includes information 411 identifying itself as being an access authorization request, a request sender client identifier 412, and an output unit identifier 413. Hereinafter, like components are labeled with like reference numerals with respect to the first embodiment, and the description of these components is not repeated.

When the access authorization managing unit 33 receives the access authorization request record 410 from the output unit managing unit 27, it judges whether an access to the specified output unit is authorized or not by referring to the correspondence table. Note that the correspondence table has been prepared by an operator in advance. More precisely, the access authorization managing unit 33 retrieves an entry whose client identifier and output unit identifier respectively coincide with the request sender client identifier 412 and output unit identifier 413 in the access authorization request record 410 from the correspondence table, and sends an access authorization information record 420 to the output unit managing unit 27. The access authorization information record 420 is formatted as is shown in FIG. 26, and it includes information 421 identifying itself as being an access authorization information, authorized/non-authorized information 422. The information 422 stores the data exhibiting an access authorization or an access non-authorization by the retrieved entry. When the access authorization managing unit 33 retrieves no entry, the information 422 may store data exhibiting either the accesses authorization or non-authorization.

Figure 5:
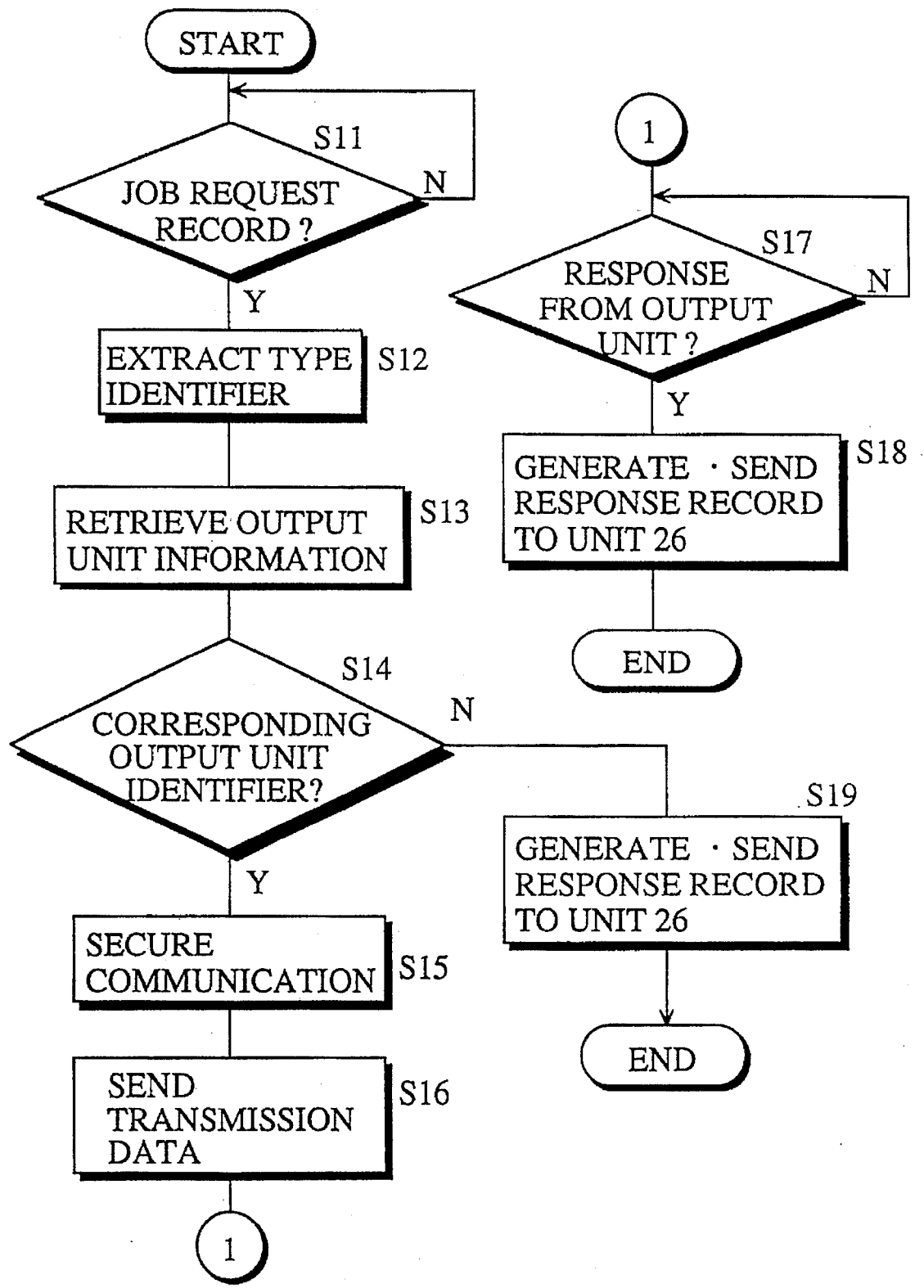
FIG. 5 is a flowchart detailing the operation of an output unit managing unit in the first embodiment.

When the output unit managing unit 27 receives the access authorization information record 420, it proceeds to the Step 15 and the following steps in FIG. 5 if the information 422 exhibits authorization. If otherwise, the output unit managing unit 27 sends the failure notice record 130 to the job request processing unit 26 by proceeding to Step 14 in FIG. 5. The job request processing unit 26 accordingly sends the data 133 exhibiting the access failure to the client 25 by proceeding to the Step 3 and the following steps in FIG. 4.

By managing the access authorization information at the access authorization management unit 33, the server 21 can manage the access authorizations to the output units collectively. Although the detailed explanation is omitted, this embodiment can be combined with second or third embodiment. When combined with the second embodiment, the procedure of the fourth embodiment is simply added to that of the second embodiment; the server 21 can manage the access authorization in addition to the output unit information and client information. When combined with the third embodiment, the access authorization request record 410 and the client identifier in the access authorization correspondence table must additionally store the identifiers specifying the server, so that the server 21 can manage the access authorization to the output units connected to other servers.

FIFTH EMBODIMENT

A server in accordance with the fifth embodiment has the same construction as the first embodiment. However, the job request processing unit 26 and the output unit managing unit 27 have additional capabilities. The job request unit 26 in this embodiment receives the job request record 110 that specifies an output unit from the client 25, and the output unit managing unit 27 adds the output unit identifier of the output unit that has run the job to the response data 123. Herein after, like components are labeled with like reference numerals with respect to the first embodiment, and the description of these components is not repeated.

Like in the first embodiment, the client 25 sends the job request record 110 to the job request processing unit 26 in the server 21, and the job request processing unit 26 forwards the job request record 110 to the output unit managing unit 27.

The output unit managing unit 27 operates as in the same way as the first embodiment by proceeding to Step 11 through Step 16 in FIG. 5.

Figure 27:
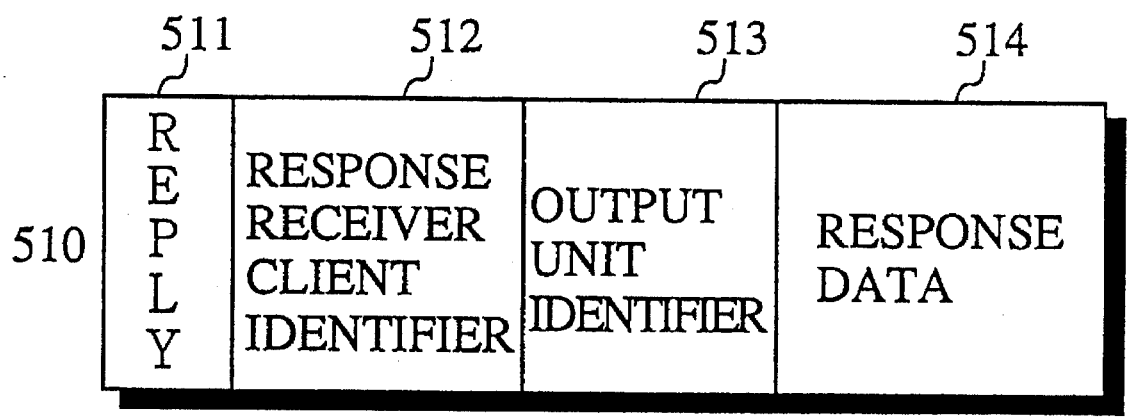
FIG. 27 is a view showing a record format used in the fifth embodiment.
Figure 28:
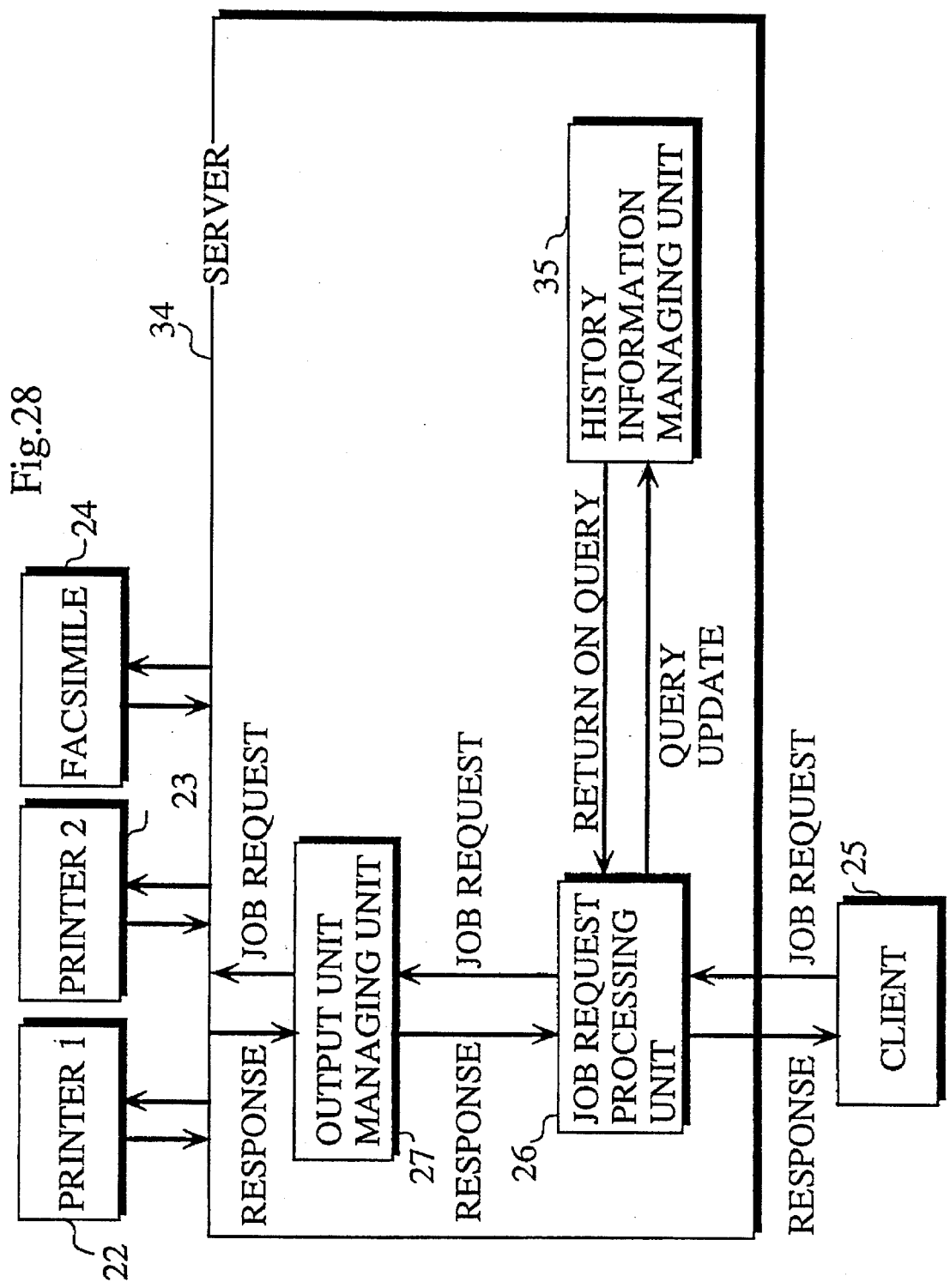
FIG. 28 is a block diagram showing the construction of a server in accordance with a sixth embodiment of the present invention.

The output unit duly runs the job(Step 17), and returns a response to the output unit managing unit 27. Then, the output unit managing unit 27 generates and sends a response record 510 from the response data to the job request processing unit 26. The response record 510 is formatted as is shown in FIG. 27. To distinguish from the response data 120, numerals used therewith are given in the bracket in the following. The response record 510 includes information 511(121) identifying itself as being a response (121), a response receiver client identifier 512(122), response data 514(123), and it additionally includes an output unit identifier 513. The identifier 513 specifies the output unit that has run the job. The other identifiers store the information as the response data 120 used in the first embodiment.

Once the job request processing unit 26 receives the response data 510, it extracts and sends the output unit identifier 513 and response data 514 to the client 25 specified by the response receiver client identifier 512.

In case that the output unit information includes no entry whose output unit type identifier coincides with the type identifier 113 in the job request record 110, the output unit managing unit 27 sends the failure notice record 130 to the job request processing unit 26 in the same way as the first embodiment by proceeding Step 19 in FIG. 5. The job request processing unit 26 in turn sends the response data 133 to the client 25 specified by the response receiver client identifier 512 by proceeding to Step 6 and Step 4 in FIG. 4.

In the following, the operation of the server 21 when the client 25 sends a job request to the output unit of the same type after it has received the response record 510. The server 21 operates almost in the same way as the case where the client 25 generates the output-unit-specifying job request record 230 in the second embodiment: the client 25 stores the same value as the output unit identifier 513 in the response record 510 into the output unit identifier 233.

Like in the first embodiment, the job request processing unit 26 forwards the output-unit-specifying job request record 230 directly to the output unit managing unit 27(Step 321 to Step 324 in FIG. 10), then, the output unit managing unit 27 sends the transmission data 234 to the output unit specified by the output unit identifier 233 without referring to the output unit information. Having duly run the job, the output unit returns a response to the output unit managing unit 27, which generates the response record 510 including the output unit identifier 513, and sends the response record 510 to the client 25 as was explained in the above.

By adding the output unit identifier 513 to the response record 510, the server 21 can select the same output unit for the job request records 110 specifying the same type from the second occurrence. For example, the conventional server may divide the data of a single file and send the divided data to several printers. However, the server 21 can send the data of the single file to a single printer, for example, the printer 22, without fail.

Further, by sending the output-unit-specifying job request 230 instead of the job request records 110 specifying the same type from the second occurrence, the loading of the server 21 can be reduced; for the output unit managing unit 27 does not have to refer to the output unit information.

Although the detailed explanation is omitted, the fifth embodiment can be combined with the second, third, or fourth embodiment.

SIXTH EMBODIMENT

A server in accordance with the sixth embodiment has the same construction as the first embodiment except that the server 21 is replaced with a server 34 which additionally includes a history managing unit 35. The history managing unit 35 holds and manages a correspondence table showing the correspondence between the identifiers specifying client sender, a type of an output unit, and an output unit. The correspondence table is shown in FIG. 29, and it is hereinafter referred to as history information. Hereinafter, like components are labeled with like reference numerals with respect to the first embodiment, and the description of these components is not repeated.

Like in the first embodiment, the client 25 sends the job request record 110 to the job request processing unit 26 in the server 34.

The job request processing unit 26 accordingly generates and sends a history information request record 610 to the history managing unit 35. The history information request record 610 is formatted as is shown in FIG. 30, and it includes information 611 identifying itself as being a history information request, a request sender client identifier 612, and an output unit type identifier 613. Note that the client identifier 612 and the type identifier 613 respectively store the same value as the client identifier 112 and the type identifier 113 in the job request record 110.

The history information managing unit 35 initially holds blank history information. However, each time the client 25 sends a job request and the specified output unit returns a response, the history managing unit 35 records a set of identifiers specifying the request sender client and the type of the specified output unit, and output unit that has run the job into the history information.

Having received the history information request record 610, the history information managing unit 35 retrieves an entry whose client identifier and output unit type identifier respectively coincide with the request sender client identifier 612 and type identifier 613 in the history information request record 610 from the history information, and further sends a history information record 620 to the job request processing unit 26. The history information record is formatted as is shown in FIG. 30, and it includes information 621 identifying itself as being history information, a request sender client identifier 622, an output unit type identifier 623, and an output unit identifier 624. Note that the request sender client identifier 622 and type identifier 623 stores the same values as the request sender client identifier 612 and type identifier 613 of the history information request record 610, respectively. The output unit identifier 624 stores either the output unit identifier of the entry retrieved by the history information managing unit 35 or a unique value exhibiting "no-entry". For example, the unique value may have 0, and the value of the output unit identifier 624 may have a positive integer.

Having received the history information record 620, the job request processing unit 26 examines the output unit identifier 624 therein. The step after this examination subdivides into two steps depending on whether the history managing unit 35 fails to retrieve an entry or not.

In case that the history information managing unit 35 fails, in other words, the output unit identifier 624 in the history information record 620 stores the unique value exhibiting "no-entry", the job request processing unit 26 forwards the job request record 110 from the client 25 to the output unit managing unit 27. The output unit managing unit 27 thereafter proceeds to Step 11 through Step 18 like in the first embodiment. Note that, however, the job request processing unit 26 receives the response record 510 used in the fifth embodiment in Step 3. Thus, it extracts and sends response data 514 alone to the client 25 specified by the identifier 512 in Step 4.

The job request processing unit 26 also sends a history information update request record 630 to the history managing unit 35. The history information update request record 630 is formatted as is shown in FIG. 30, and it includes information 631 identifying itself as being a history information update request, a request sender client identifier 632, an output unit type identifier 633, and an output unit identifier 634. Note that the request sender client identifier 632, type identifier 633, and output unit identifier 634 store the same value as the request sender client identifier 512 in the response record 510, type identifier 113 in the job request record 110, and output unit identifier 513 in the response record 510, respectively. Accordingly, the history managing unit 35 adds an entry composed of the request sender client identifiers 632, type identifier 633, and output unit 634 in the history information update request record 630 to the history information.

On the other hand, when the request sender client identifier 632 in the history information record 620 does not store the unique value(a corresponding entry was retrieved), the job request processing unit 26 sends the output-unit-specifying job request record 230 used in the second embodiment to the output unit managing unit 27. However, unlike the second embodiment, the output identifier 233 in the output-unit-specifying job request record 230 stores the same value as the output unit identifier 624 in the history information 620. The request sender client identifier 232 and transmission data 234 respectively store the same values as the request sender client identifier 112 and transmission data 114 in the job request record 110 like in the second embodiment.

Having received the output-unit-specifying job request record 230, the output unit managing unit 27 extracts and sends the transmission data 234 to the output unit specified by the output unit identifier 233 without referring to the output unit information.

Thereafter, the output unit managing unit 27 operates in the same way as the first embodiment by proceeding to Step 17, Step 18, and the specified output unit returns a response to the output unit managing unit 27, which sends the response record 120 to the job request processing unit 26.

The job request processing unit 26 accordingly sends the response data 124 in the response record 120 to the client 25 in Step 3 and Step 4 in the same way as the first embodiment.

By keeping the history of the job request that specifies the type of the output unit, the server 34 can invariably send the job request record 110 specifying the same type of the output units from the client 25 to the specified output unit alone, making it possible for a single output unit to execute a plurality of job requests intended to one type of the output units.

Figure 31:
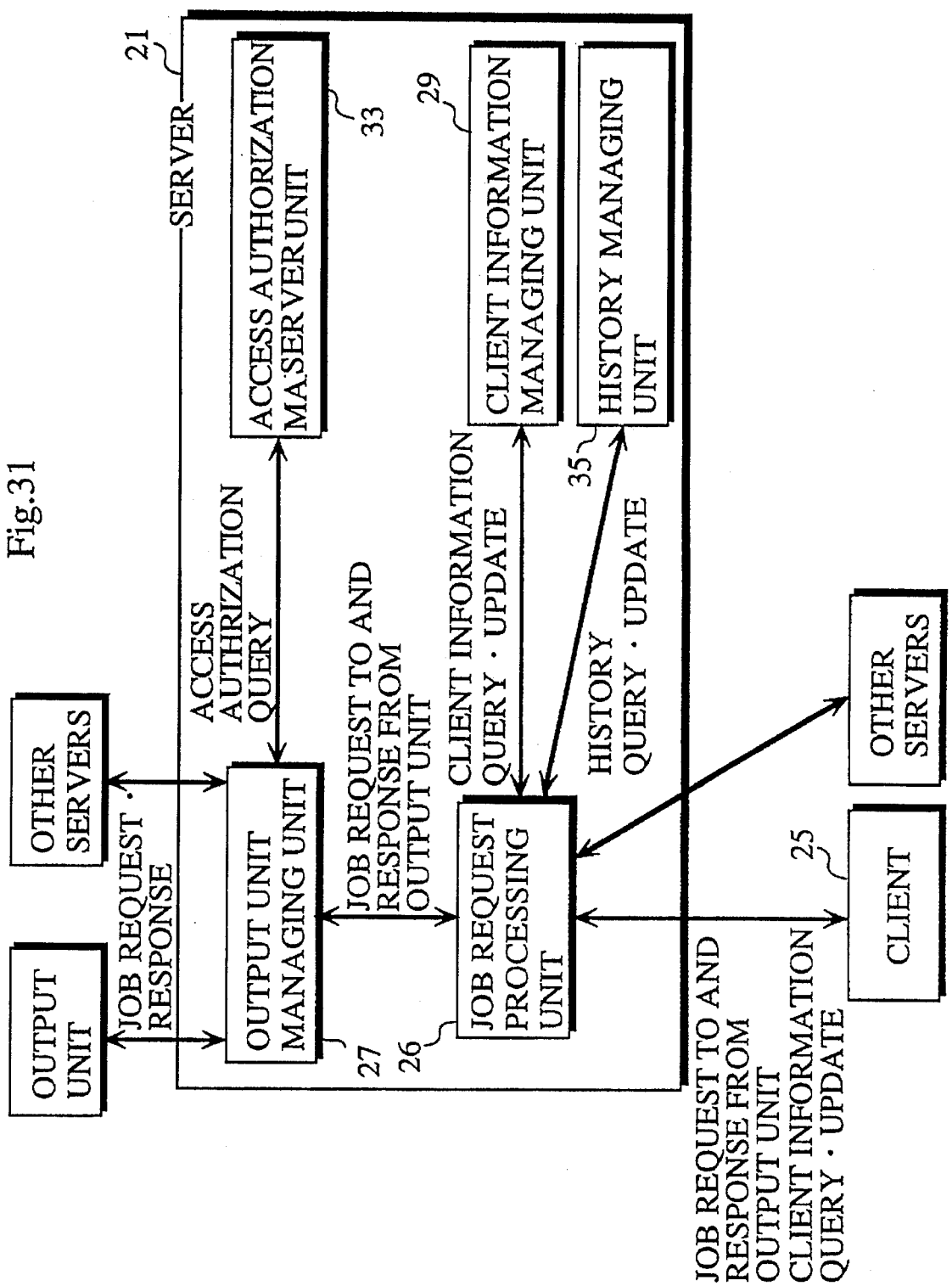
FIG. 31 is a block diagram showing a construction of a server at combining the first through fourth and sixth embodiments.

Although the detail explanation is omitted, the sixth embodiment can be combined with the second, third, or fourth embodiment. When combined with the second embodiment, the procedure of the sixth embodiment is simply added to that of the second embodiment; the server 34 manage the history information in addition to the output unit information and client information. When combined with third embodiment, the request sender client identifiers in history information request record 610 and history information record 620 must additionally include the server identifier. An example of the combination of the first through fourth and sixth embodiments is depicted in FIG. 31. Although the detail explanation is omitted, this combination enables all the effects realized by the first through sixth embodiments.

SEVENTH EMBODIMENT

Figure 32:
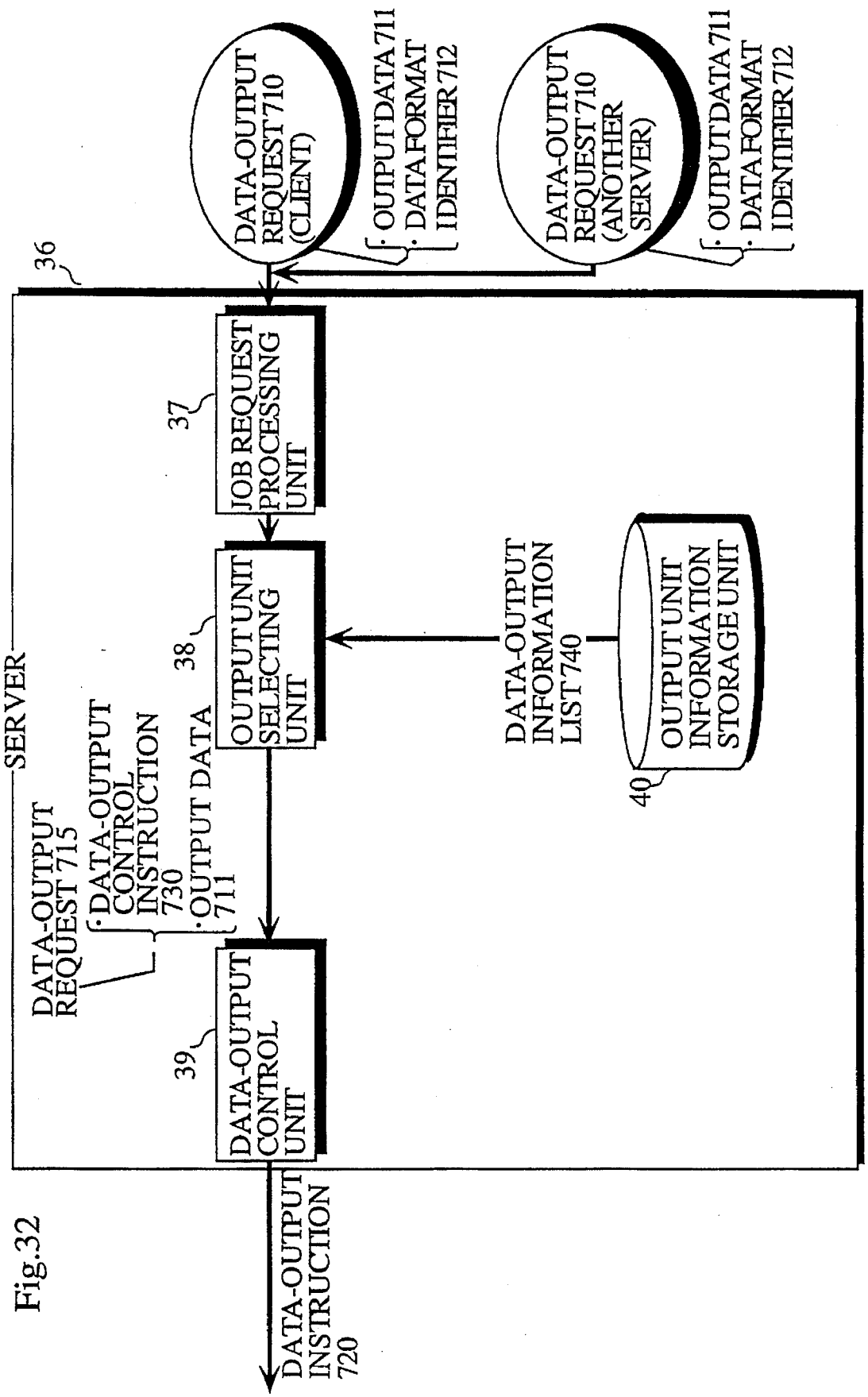
FIG. 32 is a view showing a construction of a server in accordance with a seventh embodiment of the present invention.

A server in accordance with the seventh embodiment is depicted in FIG. 32. A server 36 is connected to clients that send data-output requests 710 and output units that receive data-output instructions 720 from the server 36, as well as to the other servers.

The server 36 includes a job request processing unit 37, an output unit selecting unit 38, a data-output control unit 39 and an output unit information storage unit 40.

Figure 33A:
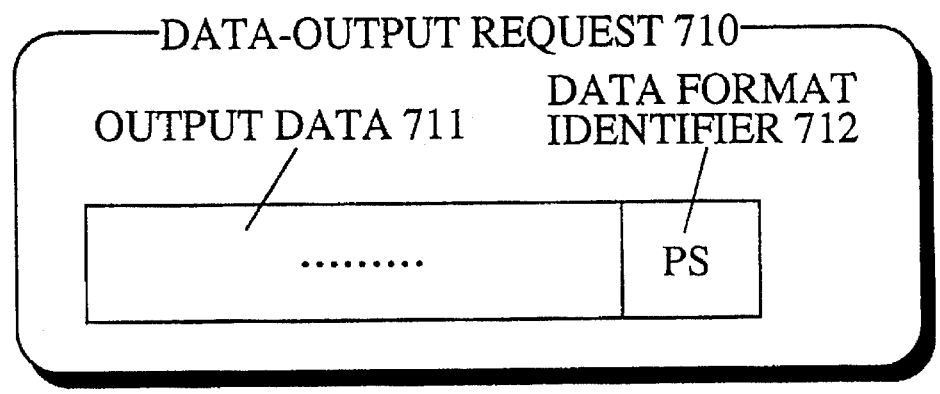
FIG. 33(a) is a view showing data format of a data-output request inputted into a request processing unit.

The job request processing unit 37 receives the data-output request 710 from one of the clients and the other servers. The data output request 710 is formatted as is shown in FIG. 33(a), and it includes output data 711 and a data format identifier 712. The data-output request 710 does not necessarily include an output unit identifier, and the reason why will be described later. In the drawing, "PS" in the identifier 712 shows that the output data 711 is formatted according to "PostScript" language.

The output unit information storage unit 40 stores a data-output information list 740. The data-output information list 740 shows a correspondence between the data format identifier 712 and an data-output control instruction 730. The data-output control instruction 730 includes an identifier for an output unit, to which an output of data in the data format specified by the data format identifier 712 is permitted. From the drawing, it is understood that the output control instruction 730 for an output unit capable of outputting PostScript data is "lpr -Plw", "lpr -Ptext", "rfax -hfaxA", "lpr -PprA", or "lpr -PprB".

The data-output control instruction 730 may be used for a plurality of sequential commands. For example, the output control instruction 730 "tiff2ps|lpr -Plw" for the identifier 712 "TIFF" may be converted into a command "tiff2ps" by the output control unit 39, so that the output unit can run a command "lpr -Plw", which is an actual transmission instruction. Converting the data format prior to the data transmission to the output unit increases a variety of data formats for the data-output request 710.

The output unit selecting unit 38 selects an available output unit for the data-output data 711 by referring to the data-output request 710 sent from the job request processing unit 37 the data-output information list 740, and subsequently sends the data-output control instruction 730 and the output data 711 converted into the data-output request 715 in the adequate data format. For example, a standard data format such as "cat filename|lpr -Plw" may be used for the conversion, or the output data 711 may be stored temporarily into an unillustrated storage unit and readout by the data-output request 710 that specifies the name of the file "lpr -Plw filename".

The output control unit 39 runs the data-output request 715 from the output unit selecting unit 38, and sends an output instruction 720 to the selected output unit or the selected server.

Other components for sending a response from the selected output unit or the selected server to the request sender client or server should be included; however, the explanation of these components is omitted as they are not the gist of the present invention.

Figure 34:
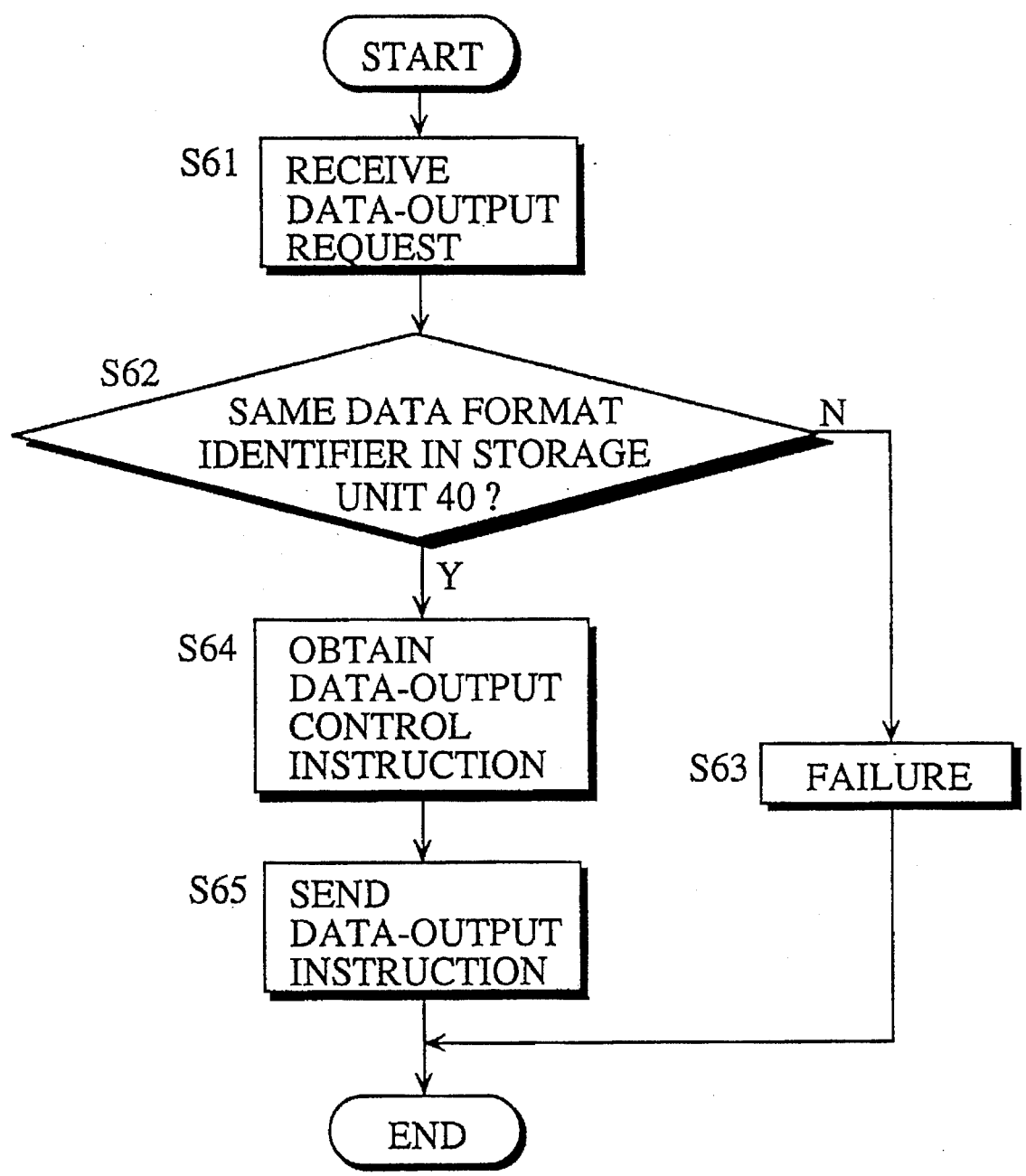
FIG. 34 is a flowchart detailing the operation of an output unit selecting unit in the seventh embodiment.

The operation of the server 36 constructed as above is detailed by the flowchart in FIG. 34, and the explanation thereof will be given in the following.

Assuming that the data-output request 710 is sent by the client, then the operator inputs the "PostScript" output data 711 and specifies the data format identifier 712 "PS", and the client 25 subsequently sends the output request 710 to the job request processing unit 37. The job request processing unit 37 accordingly transfers the output request 710 to the output unit selecting unit 38(Step 61), which subsequently judges whether the output unit information storage unit 40 stores the data format identifier 712 "PS"(Step 62).

In case of NO, the output unit selecting unit 38 sends an output failure notice to the client and ends the operation (Step 63).

Figure 33B:
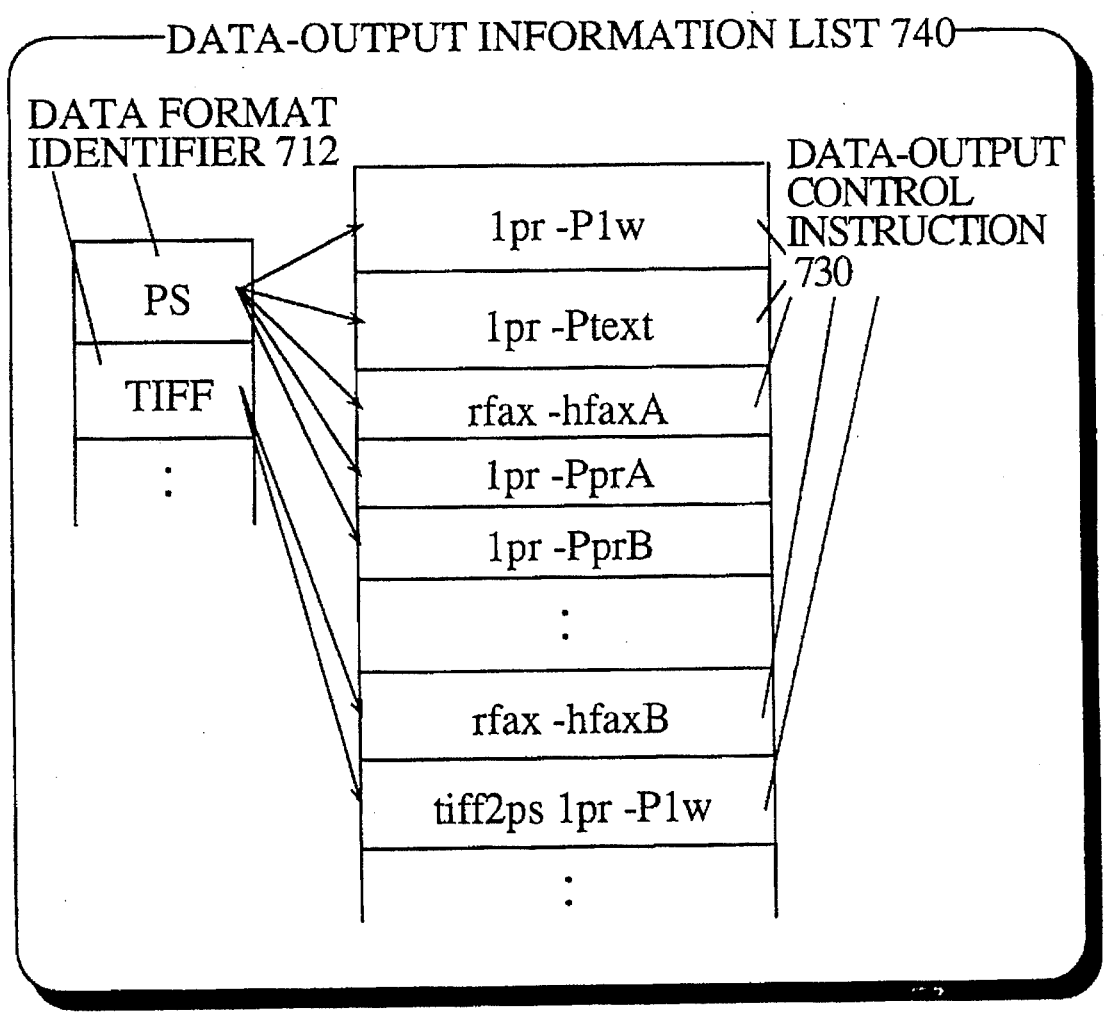
FIG. 33(b) is a view showing the data held in an output unit information storage unit in the seventh embodiment.

Otherwise, like the case shown in FIG. 33(b), the output unit selecting unit 38 obtains "lpr -Plw", the corresponding output control instruction 730 listed at the top in the data-output list information list 740(Step 64). Thus, the output unit selecting unit 38 generates the output request 715 "lpr -Plw" with the output data 711, and sends the output request 715 to the output control unit 39. In other words, the output unit selecting unit 38 can select an adequate output unit for the output data 711 when the operator does not specify the output unit, and sends the data-output control instruction 730 in the adequate data format to the selected output unit or the selected server.

Accordingly, the output control unit 39 executes the data-output control instruction 730 "lpr -Plw", so that it can send the data-output instruction 720 to the selected output unit in the data format and address according to the output control instruction 730(Step 65).

When the output control unit 39 sends the data-output instruction 720 to another server, an adequate output unit connected to that server duly runs the data-output job.

As has been described, by holding the data format identifier in the storage unit, the server 37 can send the data-output request to an adequate output unit without any prior knowledge of the available output units or their instruction formats.

EIGHTH EMBODIMENT

Figure 35:
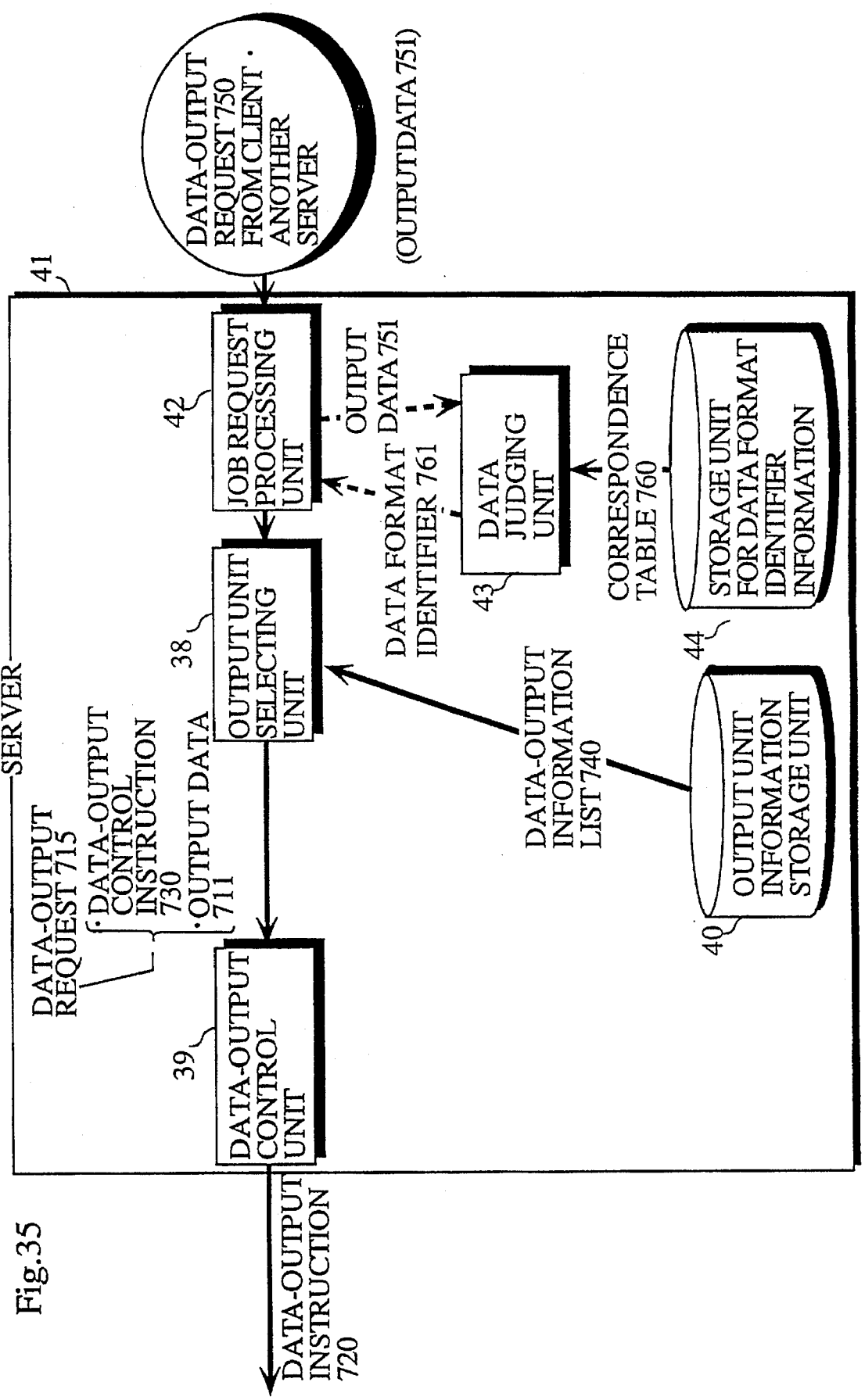
FIG. 35 is a view showing the construction of a server in accordance with an eighth embodiment of the present embodiment.

A server in accordance with the eight embodiment is depicted in FIG. 35. Compared with the seventh embodiment, a server 41 of the eighth embodiment replaces the job request processing unit 37 with a job request processing unit 42, and additionally includes a data judging unit 43 and a storage unit 44 for data format identifier information. Hereinafter, like components are labeled with like reference numerals with respect to the seventh embodiment, and the description of these components is not repeated.

Figures 36A, 36B:
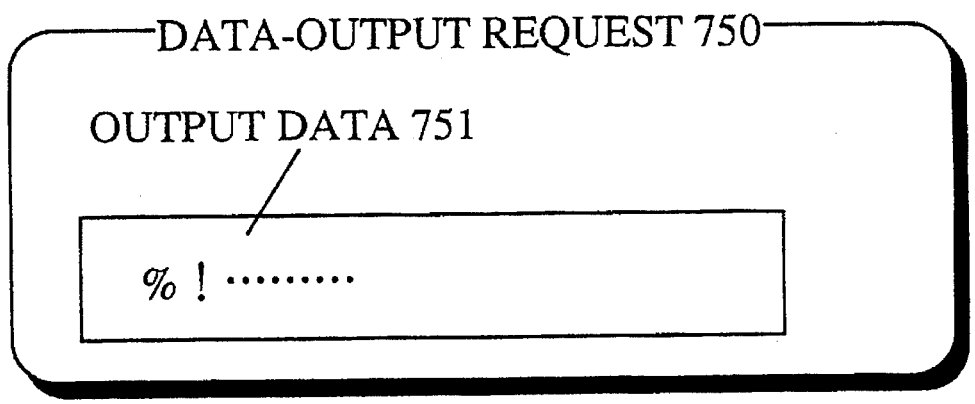
FIG. 36(a) is a view showing a data format of a data-output request inputted into a request processing unit.
FIG. 36(b) is a view showing the contents held in a correspondence table used in the eight embodiment.

The job request processing unit 42 receives a data-output request 750 from one of the clients and the other servers. The output request 750 is formatted as is shown in FIG. 36(a), and it includes output data 751 alone and excludes the data format identifier unlike the seventh embodiment. Thus, the job request processing unit 43 adds a data format identifier 761 for the output data 751 and sends the output data 751 and the corresponding data format identifier 761 to the output unit selecting unit 38.

The data judging unit 43 sends the data format identifier 761 to the job request processing unit 42 by judging the data format of the output data 751.

The storage unit 44 for data format identifier has stores data format identifier in the form of a correspondence table 760 shown in FIG. 36(b). The correspondence table 760 shows a correspondence between the data format identifier 761 and the information used to judge the data format such as a location, a method, and a character string.

Figure 37:
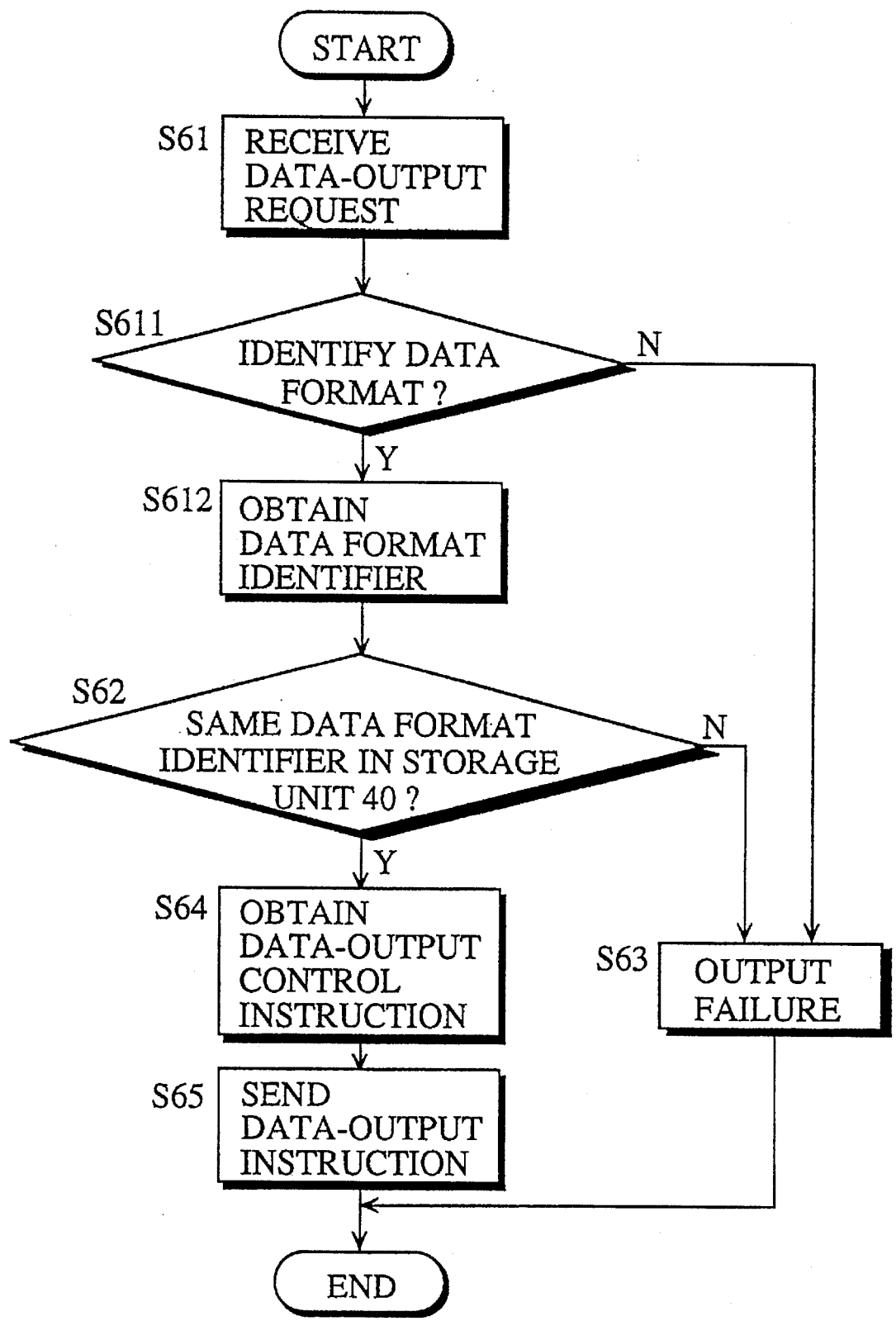
FIG. 37 is a flowchart detailing the operation of an output unit selecting unit in the eighth embodiment.

The operation of the server 41 constructed as above is detailed by the flowchart in FIG. 37, and the explanation thereof will be given in the following.

Assuming that the client sends the data-output request 750 including the "PostScript" output data 751 to the job request processing unit 42(Step 61), then the data judging unit 43 judges the data format of the output data 751 by referring to the correspondence table 760 stored in the storage unit 44(Step 611). In practice, when the output data 751 begins with a character string "%!", the data judging unit 43 judges the output data 751 as being "PostScript".

When the data judging unit 43 fails to identify the data format of the output data 751, it sends a judging failure notice to the client and ends the operation(Step 63).

On the other hand, upon identifying the data format, the data judging unit 43 sends the data format identifier 761 "PS" to the job request processing unit 42(Step 612). Accordingly, the job request processing unit 42 sends the data format identifier 761 together with the output data 751 to the output unit selecting unit 38.

The output unit selecting unit 38 operates in the same way as the seventh embodiment by proceeding to Step 62 through Step 65, and sends the output instruction 720 to the selected output unit or the selected server.

As has been described, by storing the correspondence between the output data and data format identifier, the server 41 can select an adequate output unit or an adequate server for the data-output request that specifies no data format.

The data judging unit 43 examines the output data 751 to judge the data format in this embodiment. However, the storage unit 44 may store a data format recognizing command to each data format identifier 761. In this case, the data judging unit 43 executes the data format recognizing command and sends the corresponding data format identifier 761 to the job request processing unit 42 only when it receives TRUE as result of command execution.

The storage unit 44 may store the data format identifier 761 with an extension of a data file name, for example, the extension ".ps" and the file format identifier "PS", which means the PostScript data format, so that the data judging unit 43 can identify the data format by examining the data file name only. Note that the data format can be identified more accurately when the above additionally described methods are combined.

NINTH EMBODIMENT

Figure 38:
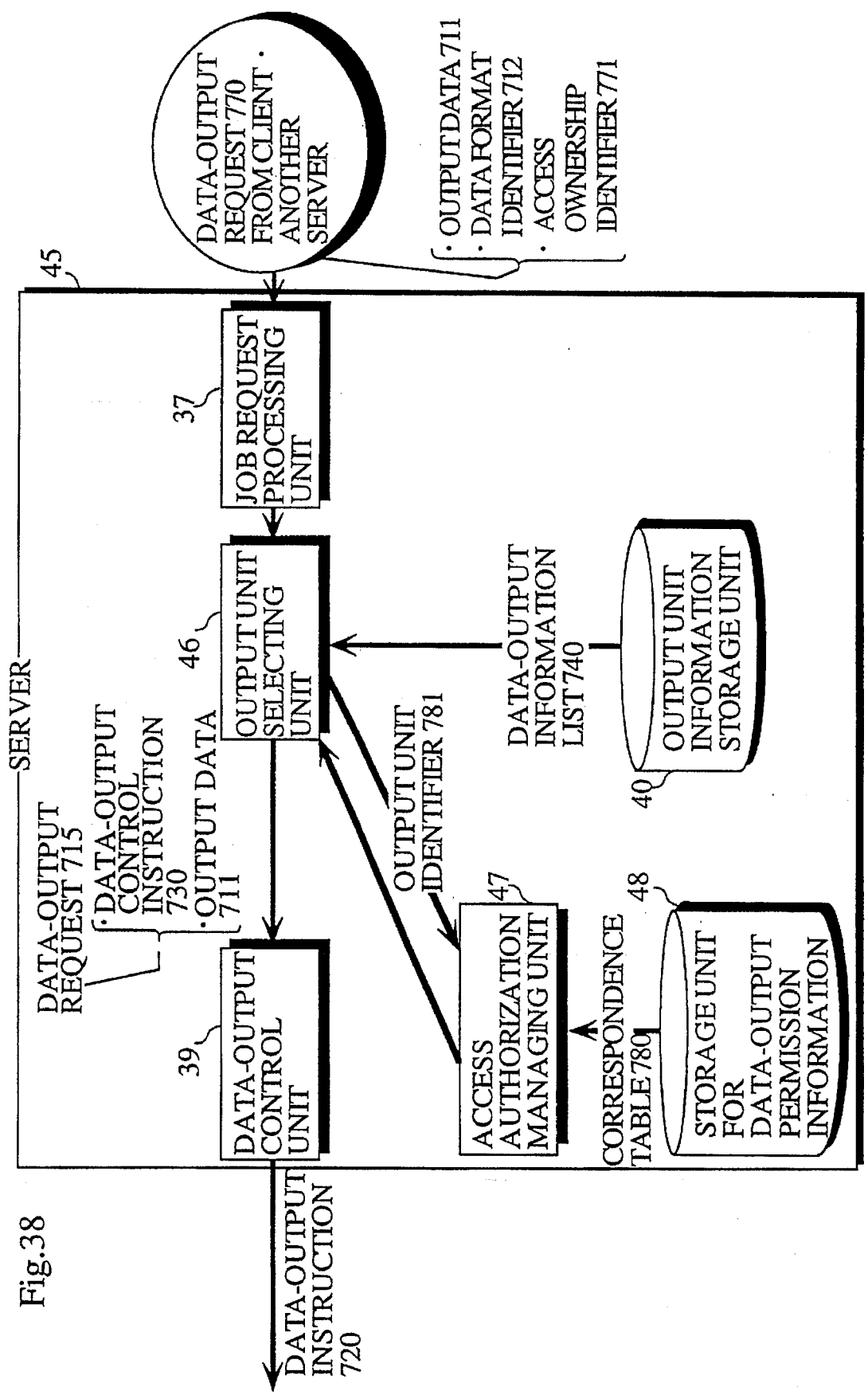
FIG. 38 is a view showing the construction of a server in accordance with a ninth embodiment of the present invention.

A server in accordance with the ninth embodiment is depicted in FIG. 38. Compared with the seventh embodiment, a server 45 of the ninth embodiment replaces the output unit selecting unit 38 with an output unit selecting unit 46, and additionally includes an access authorization managing unit 47 and a storage unit 48 for data-output permission information. Hereinafter, like components are labeled with like reference numerals with respect to the seventh embodiment, and the description of these components is not repeated.

The job request processing unit 37 receives an output request 770 from one of the clients and the other servers in the same way as the seventh embodiment. However, the output request 770 includes an access authorization identifier 771 in addition to the output data 711 and data format identifier 712. The access authorization identifier 771 is, for example, a user identifier, a client identifier, or a password.

The output unit selecting unit 46 judges whether an access to the output unit specified by the output control instruction 730 is authorized or not after it generated the output control instruction 730 by referring to the data format identifier 712.

The access authorization managing unit 47 manages an data-output permission to each output unit.

Figures 39A, 39B:
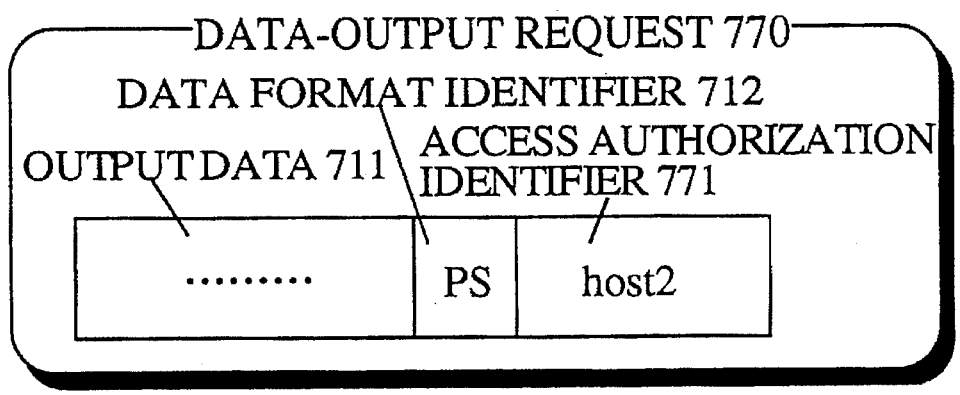
FIG. 39(a) is a view showing a data format of a data-output request inputted into a request processing unit.
FIG. 39(b) is a view showing the contents held in a correspondence table used in the ninth embodiment.

The storage unit 48 for data-output permission information stores a correspondence table 780 shown in FIG. 39(b). The correspondence table 780 shows the correspondence between an output unit identifier 781 and an access authorization identifier 782. The access authorization identifier 782 is an identifier, by which the data-output to the output unit specified by the output unit identifier 781 is permitted.

Figure 40:
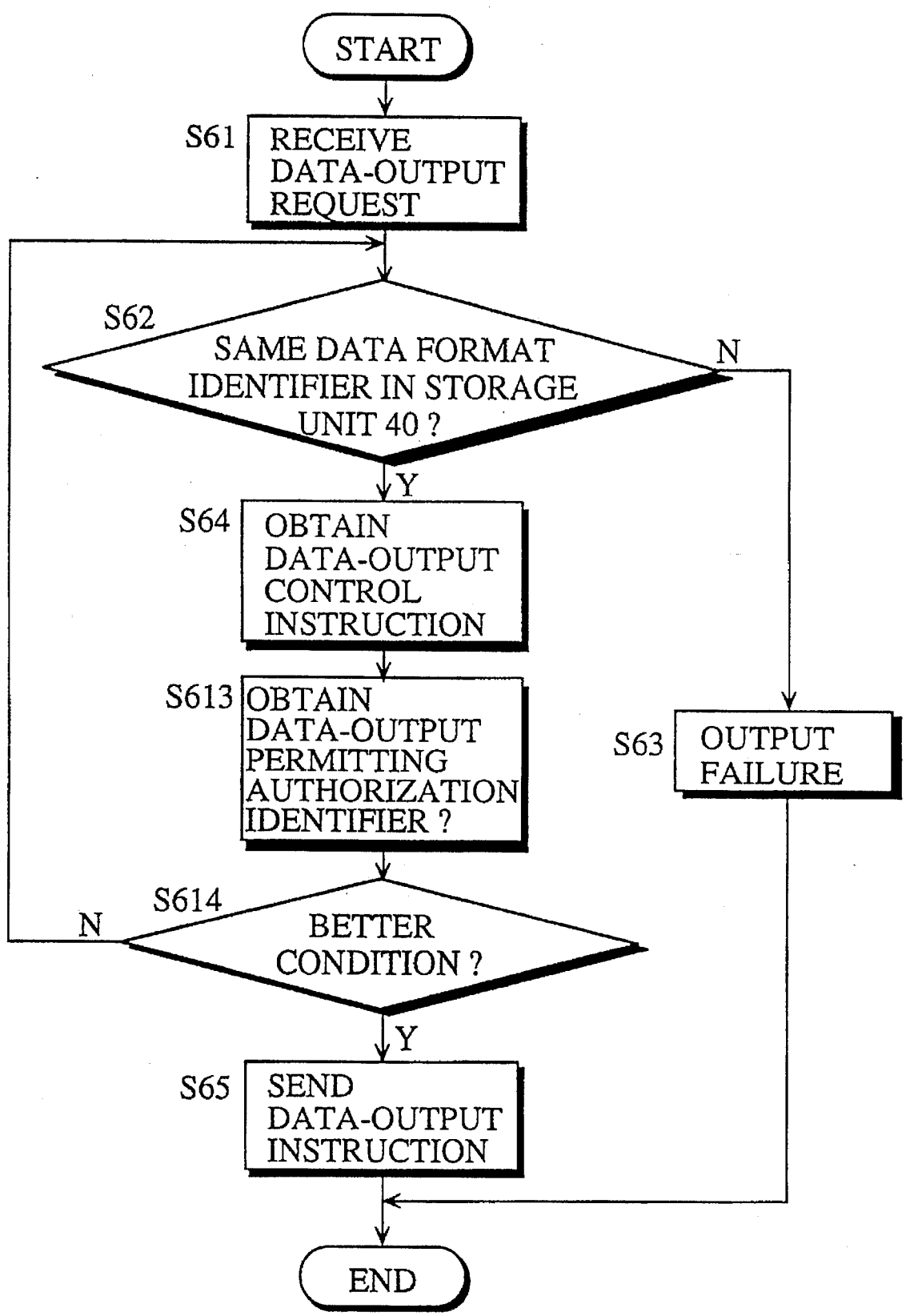
FIG. 40 is a flowchart detailing the operation of an output unit selecting unit in the ninth embodiment.

The operation of the server 45 constructed as above is detailed by the flowchart in FIG. 40, and the explanation thereof will be given in the following.

Assuming that a client has an access authorization "host2", then the operator inputs the "PostScript" output data 711, data format identifier 712 "PS", an access authorization identifier 771 "host2". Accordingly, the client sends the output request 770 to the job request processing unit 37, which forwards the output request 770 to the output unit selecting unit 46(Step 61).

Then, the output unit selecting unit 46 judges whether the storage unit 40 stores the data format identifier 712 "PS" (Step 62). In case of NO, it sends an output failure notice to the client and ends the operation(Step 63).

Otherwise, the output unit selecting unit 46 obtains the corresponding output control instruction 730, for example, "lpr -PprA"(Step 64), and outputs the output unit identifier 781 "prA" included therein to the access authorization managing unit 47.

Thus, the access authorization managing unit 47 obtains the corresponding access authorization identifiers 782 "host1", "host2", "host3" by referring to the correspondence table 780 in the storage unit 48. Subsequently, the access authorization managing unit 47 sends these access authorization identifiers 782 to the output unit selecting unit 46(Step 613). The access authorization managing unit 47 may obtain the output unit identifier 781 by referring to a correspondent table showing the correspondence between the data format identifier 712 and the output unit identifier 781 instead of receiving the output control instruction 730.

Accordingly, the output unit selecting unit 46 judges whether any of these access authorization identifiers 782 coincides with the access authorization identifier 771 "host2"(Step 614). In case of NO, the output unit selecting unit 46 repeats Step 62 through Step 641 to handle other output control instructions 730 corresponding to the data format identifier 712 "PS". Otherwise, it generates and sends the data-output request 715 including the output data 711 and data-output control instruction 730 to the output control unit 39.

Like in the seventh embodiment, the output control unit 39 executes the output control 730 "lpr -Ppra" to send the output instruction 720 to the output unit or one of the other servers(Step 65).

In case that the client sends the output request 770 including the access authorization identifier 771 "user2", the output control unit 39 returns to Step 62 from Step 614; for any of the access authorization identifiers 782 corresponding to the output unit identifier 781 "prA" does not coincide with the access authorization identifier 771 "user2". Thus, the output control unit 39 sends the output instruction 720 to the output unit specified by the output unit identifier 781 "prB" included in the following output control instruction 730 corresponding to the data format identifier 712 "PS".

As has been described, by holding the correspondence between the output unit and access authorization at the access authorization managing unit 47, the server 45 can select an appropriate output unit while managing the access authorization to the output units collectively.

The job request processing unit 37 may be replaced with a set of the job request processing unit 42, data judging unit 43, and storage unit 44 like in the eighth embodiment; the operator do not have to specify the data format identifier in this case.

A unit such that enables the operator to request to the server 45 to indicate the access authorization 771 may be additionally included; the client can choose one of the indicated output units even when the output request 770 does not include the access authorization identifier 771.

Further, a unit such that judges the access authorization from the data-output request 770 may be additionally included. The unit, for example, uses an IP address for judgment which is obtained by analyzing an output request protocol; the operator do not have to specify the access authorization identifier 771 in this case.

A list of available output units may be prepared in advance, so that the output unit selecting unit 46 retrieves the output control instruction 730 that includes the output unit identifier 781 and that also corresponds to the data format identifier 712.

TENTH EMBODIMENT

Figure 41:
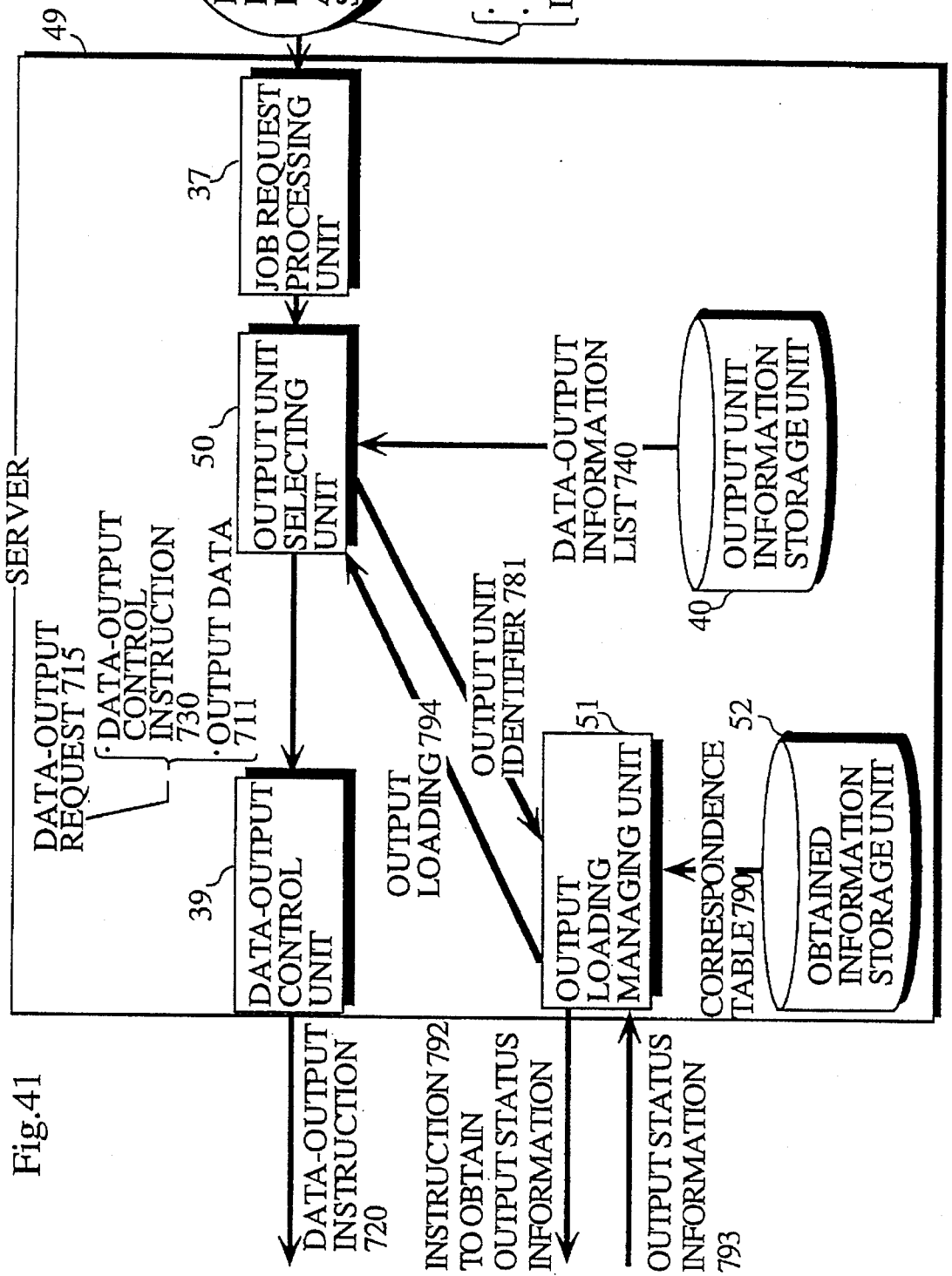
FIG. 41 is a view showing the construction of a server in accordance with a tenth embodiment of the present invention.

A server in accordance with the tenth embodiment is depicted in FIG. 41. Compared with the seventh embodiment, a server 49 of this embodiment replaces the output unit selecting unit 38 to an output unit selecting unit 50, and additionally includes an output loading managing unit 51 and an obtained information storage unit 52. Hereinafter, like components are labeled with like reference numerals with respect to the seventh embodiment, and the description of these components is not repeated.

The output unit selecting unit 50 selects the output unit capable of outputting the output data 711, and outputs the data-output request 715 in the same way as the seventh embodiment. However, the output unit selecting unit 50 selects an appropriate output unit by judging the loading of each output unit.

The output loading managing unit 51 outputs an instruction 792 to obtain output status information to the specified output unit, and accordingly obtains the output status information 793, on which it computes and sends an output loading 794 to the output unit selecting unit 50.

The storage unit 52 for obtained information holds a correspondent table 790 shown in FIG. 42. The correspondence table 790 shows the correspondence between the output unit identifier 791 and the instruction 792. As previously mentioned, the instruction 792 is an instruction to collect information as to the output loading to compute the output loading 794.

Figure 43:
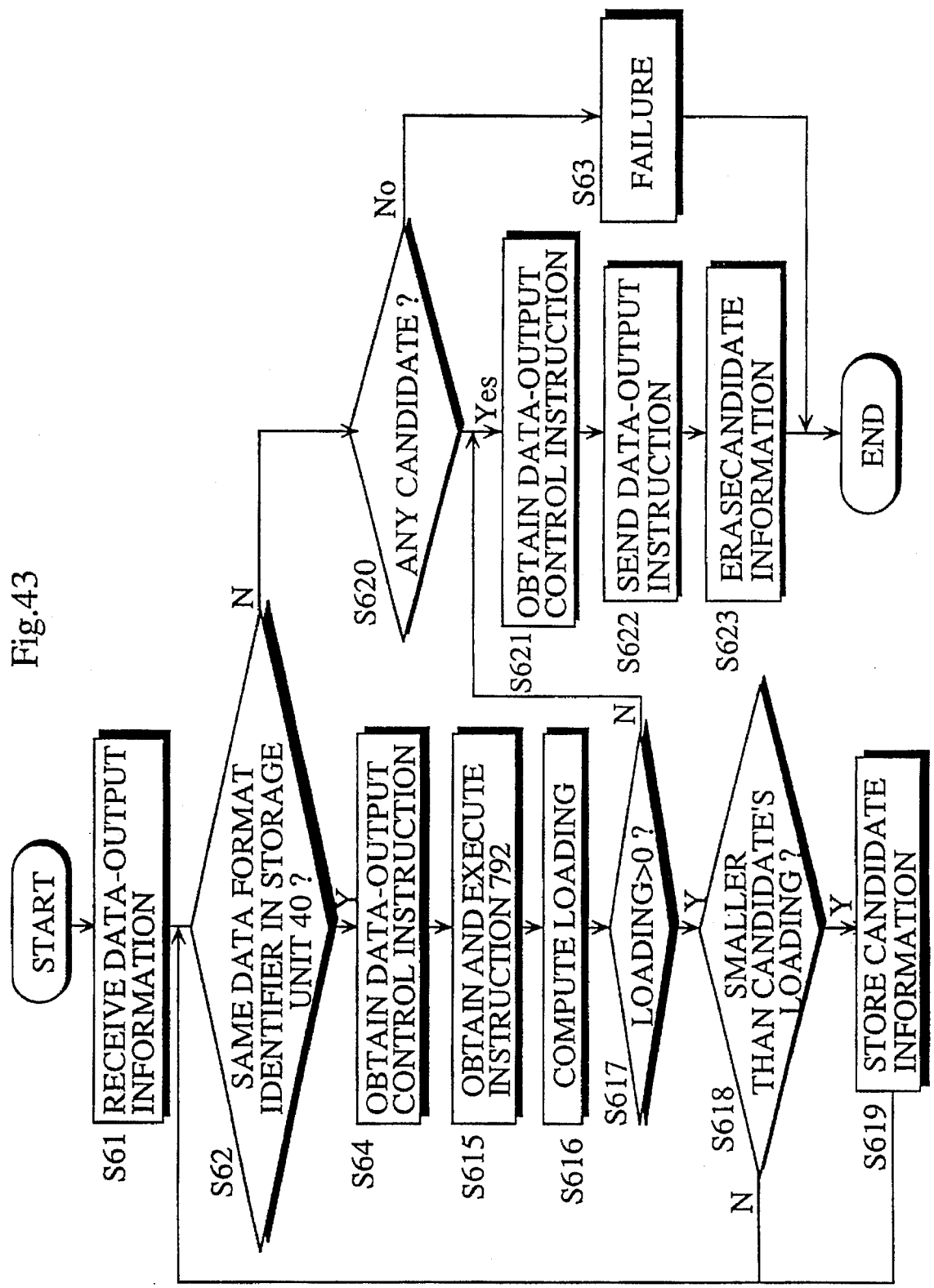
FIG. 43 is a flowchart detailing the operation of an output unit selecting unit in the tenth embodiment.

The operation of the server 49 constructed as above is detailed by the flowchart in FIG. 43, and the explanation thereof will be given in the following.

Like in the seventh embodiment, the job request processing unit 37 receives the output request 710 from the client (Step 61). Then, the output unit selecting unit 50 judges whether the storage unit 40 stores the corresponding data format identifier 712(Step 62). In case of NO, it proceeds to Step 620 which will be described later, and sends an output failure notice and ends the operation(Step 63). Otherwise, the output unit selecting unit 50 obtains the data-output control instruction 730 in the appropriate data format, for example, "lpr -PprA"(Step 64).

Then, the output loading managing unit 51 obtains the instruction 792 "lpq -PprA" by referring to the correspondence table 790 in the storage unit 52, and executes the instruction 792(Step 615). Accordingly the output loading managing unit 51 computes the output loading 794 upon the receipt of the output status information 793(Step 616). In practice, the output loading managing unit 51 computes the value of the output loading 794 as follows: 0 when the output status information 793 shows "no-entry"; 20546 (bytes) when "active usrl 125 usrl 20546 bytes"; and 1039 (bytes) when "active usrl 125 usrl 1039 bytes".

The output unit selecting unit 50 judges whether the output loading 94 is larger than 0 or not(Step 617). If the output loading 94 equals to 0, it judges that the output unit is ready for the job, and proceeds to Step 621 which will be described later.

If the output loading 94 is larger than 0, the output unit selecting unit 50 judges whether there is any other candidate for the output unit for the data-output request 710, or whether such a candidate has a larger output loading than the output loading 794 by referring to an unillustrated temporarily storage of candidate information(Step 618). If there is a candidate and it has a larger output loading, it stores the most recent output loading 794 with the output unit identifier 791 into the temporarily storage for the candidate(Step 619), and returns to Step 62.

On the other hand, when the output unit selecting unit 50 detects a candidate and it has a has smaller output loading than the output loading 794, it proceeds to Step 621.

More precisely, when the output unit specified by the output unit identifier 791 "prA" has an output loading of 20546 (bytes), then the temporarily storage unit stores "prA, 20546"; when the output unit identifier 791 "prB" has an output loading of 1039 (bytes), then the temporarily storage erases "prA, 20546" and stores "prB, 1039" as the latter has a smaller loading.

The output unit selecting unit 50 thereafter repeats the same procedure for each output unit identifier 791 corresponding to the data format identifier 712 held in the output information list 740.

Once the output unit selecting unit 50 goes through Step 62 to Step 619 for each output unit identifier 791, it further proceeds to Step 620 from Step 62 to judge whether there is any candidate for the output unit by referring to the temporarily storage. In case of NO, it sends the output failure notice to the client(Step 63) and ends the operation. Otherwise, it further proceeds to Step 621.

In Step 621, the output unit selecting unit 50 generates and sends the data-output request 715 from the data-output control request 730 and output data 711 to the data-output control unit 39. However, it obtains the data-output control instruction 730 in two ways depending from which steps the output unit selecting unit 50 has proceeded to Step 621: it obtains the output control instruction 730 that includes the output unit identifier 791 of the candidate when such a candidate exists(in the case it proceeded from Step 620); it obtains the output control instruction 730 that includes the output unit identifier 791 of the output unit having the 0 output loading(in the case it proceeded from Step 617).

Accordingly, the output control unit 39 executes the data-output control instruction 730, for example, "lpr -PprB", and outputs the data-output instruction 720 to the selected output unit or selected server(Step 622).

The output unit selecting unit 50 erases the data in the temporarily storage for a following output request 710(Step 623).

As has been described, by managing the output loading at the output loading managing unit 51, the server 49 can select an adequate output unit having the smallest output loading, enabling a load distribution to save the time for data-output operation.

The output loading 794 uses the number of bytes returned from the output unit; however, it may be calculated by the time required for the data-output with referring to the correspondence between output data and the output unit identifier 791. This method enables the load distribution according to the data-output rate.

In case the processed data is temporarily stored in a buffer until the data-output request arrives, the output status information 793 may not be accurate. To avoid this problem, a higher priority may be given to the output unit with a buffer having a smaller capacity by referring to information as to a correspondence between a buffer capacity and the output unit identifier 791.

The operation speed can be increased by detecting whether the output loading has 0 or not in Step 617. However, the output unit selecting unit 50 may go through Step 62 through Step 619 for each output unit identifier 791 corresponding to the data format identifier 712.

The output unit selecting unit 50 does not necessarily use the temporarily storage unit to detect the output unit having the smallest output loading. A list showing the outputs units in the order of the output loading may be formed in advance, so that the output unit selecting unit 50 can detect the availability of each output unit from the top.

It should be noted that this embodiment can be modified as follows:
1) The job request processing unit 37 may be replaced with a set of the job request processing unit 42, data judging unit 43, and storage unit 44 like in the eighth embodiment; the operator does not have to specify the data format identifier in this case.
2) The access authorization managing unit 47 and storage unit 48 may be added like in the ninth embodiment, so that the output unit selecting unit 50 executes Step 64 for the output unit acquiring the access authorization.
3) The first and second modifications can be combined and applied to this embodiment as well.

ELEVENTH EMBODIMENT

Figure 44:
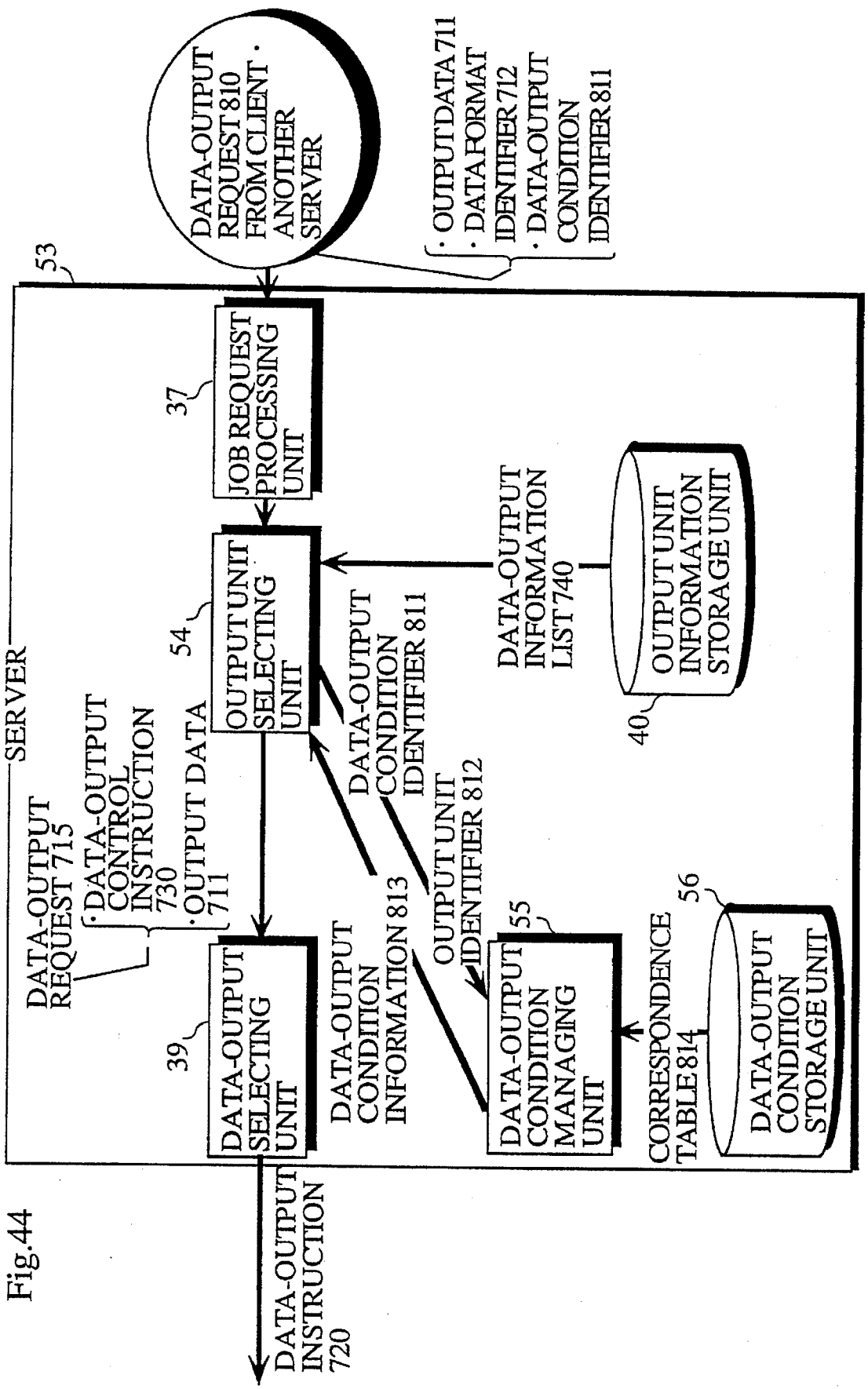
FIG. 44 is a view showing the construction of a server in accordance with the eleventh embodiment of the present invention.

A server in accordance with the eleventh embodiment is depicted in FIG. 44. Compared with the seventh embodiment, a server 53 of the eleventh embodiment replaces the output unit selecting unit 38 with an output unit selecting unit 54, and additionally includes a data-output condition managing unit 55 and a storage 56 for data-output condition. Hereinafter, like components are labeled with like reference numerals with respect to the seventh and tenth embodiments, and the description of these components is not repeated.

Figures 45A, 45B:
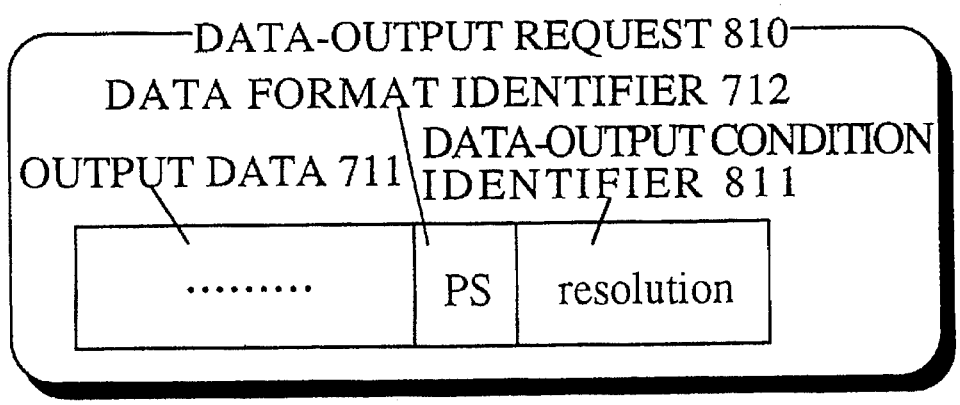
FIG. 45(a) is a view showing a data format of a data-output request inputted into a request processing unit.
FIG. 45(b) is a view showing the contents held in a correspondence table used in the eleventh embodiment.

The job request processing unit 37 receives an output request 810 from one of the clients and the other servers in the same way as the seventh embodiment. However, compared with the data-output request 710, the output request 810 additionally includes a data-output condition identifier 811 exhibiting "resolution" as is shown in FIG. 45(b). The output conditional identifier 811"resolution" specifies an output unit that has a higher resolution. The data-output condition identifier 811 may exhibit "output costs", "physical distance between the client and the output unit", or "output rate" instead of "resolution".

The output unit selecting unit 54 selects an available output unit for the output data 711, and outputs the data-output request 715 in the same way as the seventh embodiment. Note that a higher priority is given to an output unit having a higher resolution herein.

The output condition managing unit 55 outputs a data-output condition information 813. The data-output condition information 813 is the output condition specified by the output condition identifier 811 for the output unit specified by the output unit identifier 812 sent from the output unit selecting unit 54.

The storage unit 56 for data-output condition stores a correspondence table 814 shown in FIG. 45(b). The correspondence table 814 shows the correspondence between the output condition identifier 811, output unit identifier 812, and output condition information 813.

Figure 46:
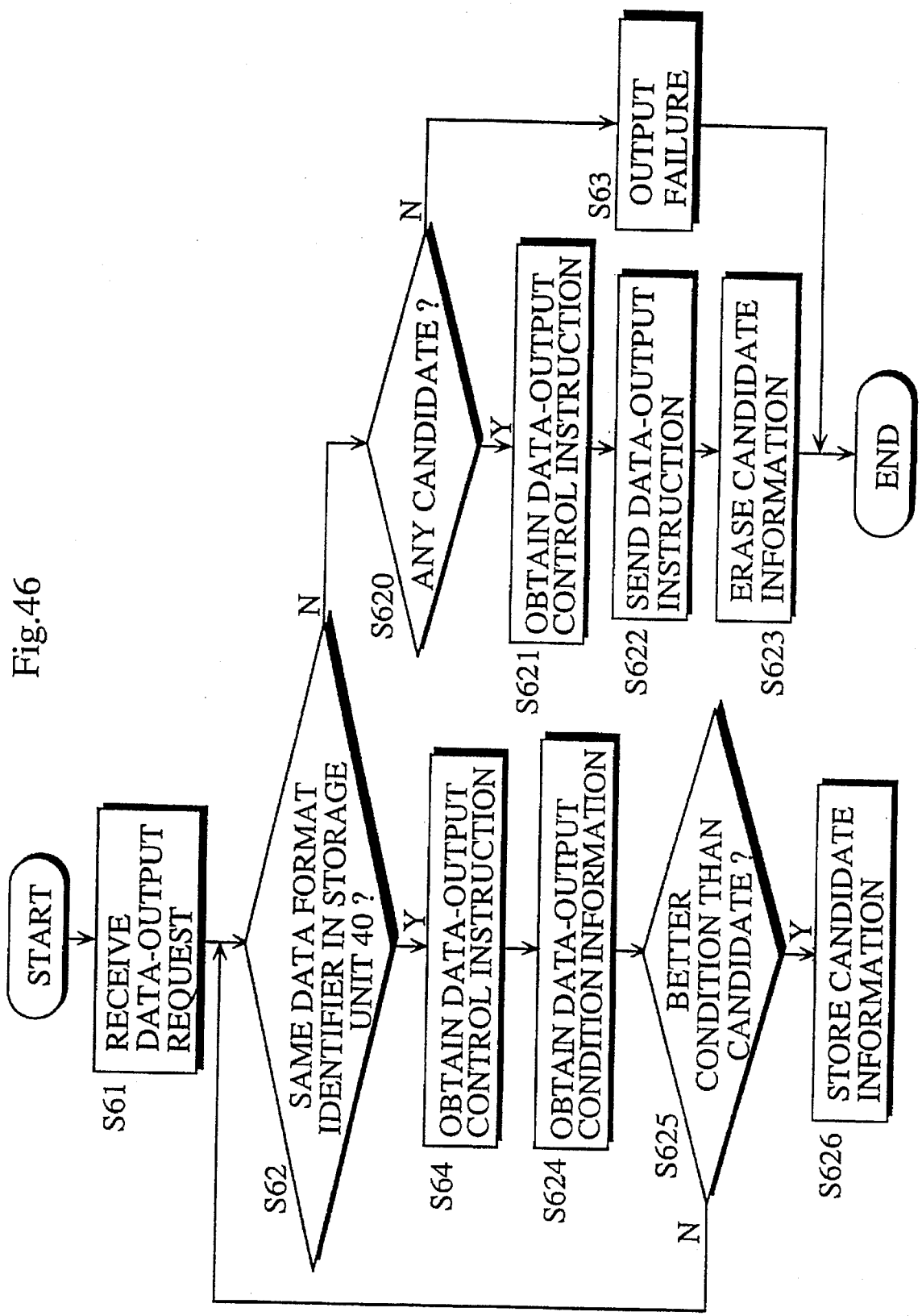
FIG. 46 is a flowchart detailing the operation of an output unit selecting unit in the eleventh embodiment.

The operation of the server 49 constructed as above is detailed by the flowchart in FIG. 46, and the explanation thereof will be given in the following.

Assuming that a client sends the data-output request 810 to the job request processing unit 37(Step 61), then the output unit selection unit 54 judges whether the storage 40 stores the data format identifier 712(Step 62) in the same way as the tenth embodiment. In case of NO, it sends an output failure notice to the client and ends the operation (Step 63). Otherwise, it obtains the output instruction 730 in appropriate data format, for example, "lpr -PprA"(Step 64). Then the job request processing unit 37 sends the output unit identifier 812 "prA" included in the output control instruction 730 and the output condition identifier 811"resolution" included in the data-output request 810 to the data-output condition managing unit 55.

The data-output condition managing unit 55 in turn sends the data-output condition information 813 "300" to the output unit selecting unit 54(Step 624). The output condition information 813 "300" specifies the resolution of the output unit as to be 300.

Then, the output unit selecting unit 54 judges whether there is any candidate for the output unit for the data-output request 810, or whether such a candidate has a higher resolution than the one obtained in Step 624 by referring to an unillustrated temporarily storage unit (Step 625). If there is a candidate and it has a higher resolution, the temporarily storage unit stores the most recent output condition information 813 with the output unit identifier 812 into the candidate information(Step 626), and returns to Step 62; when there is a candidate and it has a lower resolution, it immediately returns to Step 62.

In practice, when the output unit identifier 812 exhibits "prA" and the output condition information 813 "300", the temporarily storage unit stores "prA, 300"; when the former has "prB", and the latter has "600", then it erases "prA, 300" and stores "prB, 600", since "prB" has a higher resolution.

The output unit selecting unit 54 executes the same procedure for each output unit identifier 812 corresponding to the data format identifier 712 held in the output information list 740.

Once the output unit selecting unit 54 executes Step 62 through Step 626, it operates in the same way as the tenth embodiment as follows:

The output unit selecting unit 54 judges whether there is any candidate by referring to the temporarily storage unit (Step 620). In case of NO, it sends an output failure notice to the client(Step 63), and ends the operation. Otherwise, it obtains the output control instruction 730 including the output identifier 812 of the candidate(Step 621), and outputs the output request 715 including both the output data 711 and output control instruction 730 to the output control unit 39.

Accordingly, the output unit 39 executes the output control instruction 730 "lpr -PprB" and sends the output instruction 720 to the selected output unit or the selected server (Step 622).

The output unit selecting unit 38 erases all the data in the temporarily storage unit for a following data-output request 710(Step 623).

As has been described, by holding the correspondence between the output data and output data condition at the data-output condition managing unit 55, the server 53 can select an output unit that satisfies the data-output conditions without the prior knowledge of the available output units, their capabilities, and instruction data formats.

The eleventh embodiment may be modified as follows.

(First Modification)

The output condition identifier 811 may specify a plurality of output conditions in the order of priority.

In practice, in Step 625, when the output condition information 813 of the selected output unit stored in the temporarily storage unit coincides with the newly obtained output condition 813, the output unit selecting unit 54 compares their priorities, and stores the one having a higher priority into the temporarily storage unit.

The temporarily storage unit may store information of a plurality of candidates: with respect to the output condition having the top priority, when temporarily storage unit has already the output condition information 813 that coincides with the newly obtained output condition information 813, the temporarily storage unit does not erase the current information and simply adds the new candidate information in Step 625. By so doing, the temporarily storage unit stores information of more than one candidates satisfying the output condition having the top priority after a repetition of the Step 62 through Step 626.

Thus, when the output unit selecting unit 54 detects any candidate in Step 620, it further detects whether there is only one candidate or whether it performed Step 62 through Step 626 for each output condition. If there is only one candidate and the output unit selecting unit 54 has performed Step 62 through Step 626, the output unit selecting unit 54 proceeds to Step 621 and the following steps. On the other hand, if there are more than one candidates and it has not performed Step 62 through Step 626 for each output condition, it returns to Step 62 and repeats the same procedure for the output condition having a following priority. By so doing, the output unit selecting unit 54 can find the most appropriate candidate that satisfies a plurality of output conditions.

Selecting the output unit that satisfies the output conditions does not depend only on the temporarily storage unit. An output list showing the output condition information 813 of each output unit in the order of priority may be prepared in advance, so that the output unit selecting unit 54 checks the availability of each output unit from the top.

The output conditions may be set in the server 53 in advance. However, in this case, a higher priority will be automatically given to an output condition inputted by the operator.

Information as to the candidate may be collected at the request from the operator or automatically, so that the operator may confirm the information or select one of the candidates when a plurality of them exist.

When the output condition limits a distance between the client and the output unit, the distance to each output unit may be set in the server 53 in advance, or the client and the other servers may send information as to their locations to the server 53, so that the server can update the output condition information 813 by computing the distance.

The output condition is not limited to a relative condition such as "high resolution". Absolute values or a range of values also will do. In this case, the output unit selecting unit 53 refers to those absolute values or the range of values instead of the temporarily storage unit. Note that the output condition includes the specifying of the output unit in this case.

The job request processing unit 37 may be replaced with a set of the job request processing unit 42, data judging unit 43, and storage unit 44 like in the eighth embodiment; the operator does not have to specify the data format identifier in this case.

The access authorization managing unit 47 and storage unit 48 may be added like in the ninth embodiment; the output unit selecting unit executes Step 64 for the output units acquiring the access authorization.

Also, this embodiment can be combined with both the eight and ninth embodiment.

The output loading managing unit 51 and storage unit 52 of the tenth embodiment may be additionally included, so that the output unit selecting unit 54 selects the candidate having the smallest output loading when there exist a plurality of candidates that satisfy the data-output condition. Also, a list showing the output units in the order of output loading may be prepared: when the temporarily storage units stores the output condition information 813 that coincides with the new output condition information 813 obtained in Step 624, the output unit selecting unit 54 selects the output unit having a smaller output loading as the most appropriate candidate. This structure may be combined with the eighth and/or ninth embodiment as well.

In the first modification of this embodiment, the output unit selecting unit 54 selects the output unit satisfying a plurality of output conditions, but the output condition may include the output loading. More precisely, Step 624 may be replaced with Step 615 and Step 616 of the tenth embodiment, and Step 625 may be replaced with Step 618 of the tenth embodiment.

The operator may input the output loading as the output condition with a desired priority, or the storage unit 56 may store the output loading with the lowest priority.

(Second Modification)

The output time may be additionally specified to the above described embodiments by adding an output time managing unit. In this case, the job request processing unit in each embodiment receives the output request specifying the output time, and the job request processing unit outputs the data-output request to the output unit selecting unit in each embodiment at the specified time, for example(a half past ten o'clock, 10:30).

TWELFTH EMBODIMENT

Figure 47:
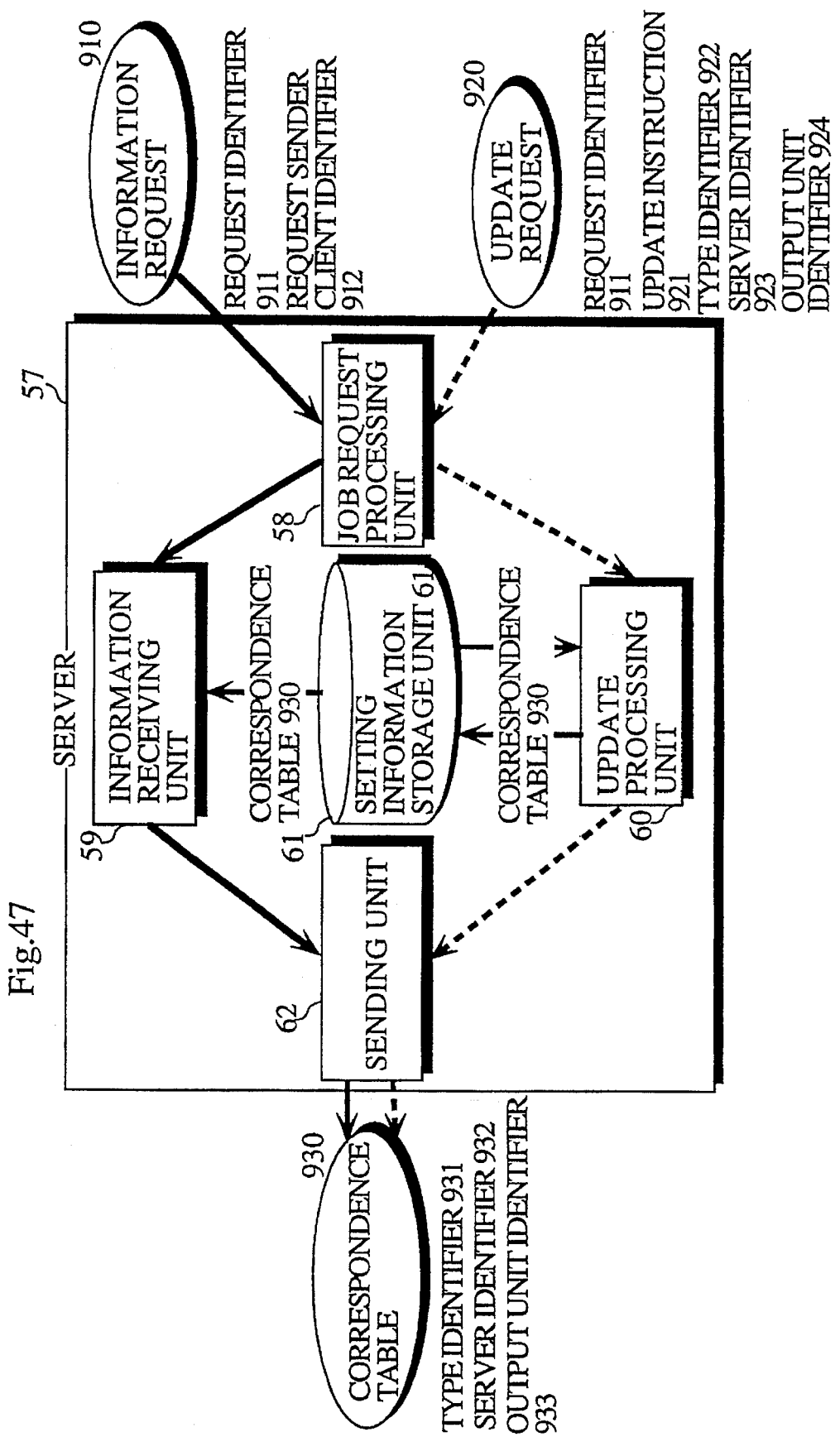
FIG. 47 is a view showing the construction of a server in accordance with a twelfth embodiment.

A server in accordance with the twelfth embodiment is depicted in FIG. 47.

A server 57 is connected to a group of clients connected to another server via network. Also, another server that manages the output units and their operations, which corresponds to a conventional printer server, is connected to the network. The clients holds information of each output unit.

The server 57 includes a job request processing unit 58, an information receiving unit 59, an update processing unit 60, a setting information storage unit 61, and a sending unit 62.

The job request processing unit 58 receives an information request 910 and an update request 920 from one of the group of the clients and the operator.

The information request 910 is formatted as is shown in FIG. 48(a), and it includes a request identifier 911 and a request sender client identifier 912.

The request identifier 911 specifies a kind of job requests (herein an information request), while the request sender identification 912 specifies a client that has sent the job request. The request sender identifier 912 may be an IP address, a name of machine; "host1" is used herein.

The update request 920 is formatted as is shown in FIG. 48(b), and it includes the request identifier 911, an update instruction 921, an output unit type identifier 922, a server identifier 923, and an output unit identifier 924.

The request identifier 911 specifies a kind of job requests (herein an update request), while the update instruction 921 specifies the particulars of update. The output unit type identifier 922 specifies a type of the output unit such as the printer and facsimile; "printer" is used herein. The server identifier 923 specifies a server that the specified output unit is connected to. The output unit identifier 924 specifies the specified output unit.

The job request processing unit 58 judges whether the job request is the information request 910 or update request 920 by referring to the request identifier 911. In case of the information request 910, the job request processing unit 58 forwards the information request 910 to the information receiving unit 59. Given that the information request 910 includes the request sender identification 912, the client that has sent the request is automatically identified. In case of the update request 920, the job request processing unit 58 forwards the update request 920 to the update processing unit 60.

The information receiving unit 59 extracts a setting information correspondence table 930 from the storage unit 61 when it receives the information request 910 from the job request processing unit 58, and sends the correspondence table 930 and information request 910 to the sending unit 62.

The storage unit 61 holds the correspondence table 930 shown in FIG. 49, and it shows a correspondence between an output unit type identifier 931, a server identifier 932, an output unit identifier 933. The server identifier 932 may be left blank, if the output unit can be specified by any other way.

On the other hand, when the update processing unit 60 receives the update request 920, it extracts the correspondence table 930 from the storage unit 61, and judges whether the particulars of the correspondence 930 is changeable or not in accordance with the update instruction 921 in the update request 920. In the case shown in FIG. 48(b), the update request 940 includes the output unit type identifier 922 "printer", the server identifier 923 "king", and the output unit identifier 924 "prA". Thus, the update processing unit 60 judges wither the correspondence table 930 holds an entry whose output unit type identifier 931, server identifier 932, and output unit identifier 933 respectively coincide with the output unit type identifier 922, server identifier 923, and output unit identifier 924 in the update request 920. In case of YES, the update processing unit 60 erases the entry from the correspondence table 930 since the update instruction 921 exhibits "DELETE", and stores the updated correspondence table 930 into the storage unit 61 while sending the updated correspondence table 930 to the sending unit 62. In case of NO, it sends an update failure notice to the operator.

Whereas in the case that when the update instruction 921 exhibits "ADD", the update processing unit 60 retrieves the correspondence table 930 from the storage unit 61 upon the receipt of the update request 920. It further detects whether there is any entry whose output unit type identifier 931, server identifier 932, and output unit identifier 933 coincide with the output unit type identifier 922, server identifier 923, and output unit identifier 924 in the update request 920. In case of YES, the update processing unit 60 sends an update failure notice to the operator, given that the correspondence table 930 has already held the corresponding entry. Otherwise, it adds a new entry consisting of the output unit type identifier 922, the server identifier 923, and output unit identifier 924 in the update request 920 into the correspondence table 930, and stores the updated correspondence table 930 in the storage unit 61 while sending the update correspondence table 930 to the sending unit 62.

The sending unit 62 sends the updated correspondence table 930 to the client specified by the request sender identifier 912 "host1" in the information request 910 when it receives the information request 910 and the updated correspondence table 930 from the information receiving unit 59. On the other hand, it broadcasts the updated correspondence table 930 to the group of the clients when it receives the update correspondence table 930 from the update processing unit 60 to the group of clients. Because the update request 920 does not include the request sender client 912, it broadcasts the correspondence table 930.

According to the above construction, each client can collect the output unit information by sending the information request 910. Moreover, when an output unit environment has changed and the operator inputs the update request 920, the group of the clients can collect the most recent output unit information.

The correspondence table 930 may be updated without any input from the operator by installing a device that automatically checks the connection with the output units by receiving a signal from the output units or the other servers each time the output unit environment changes.

Figure 50:
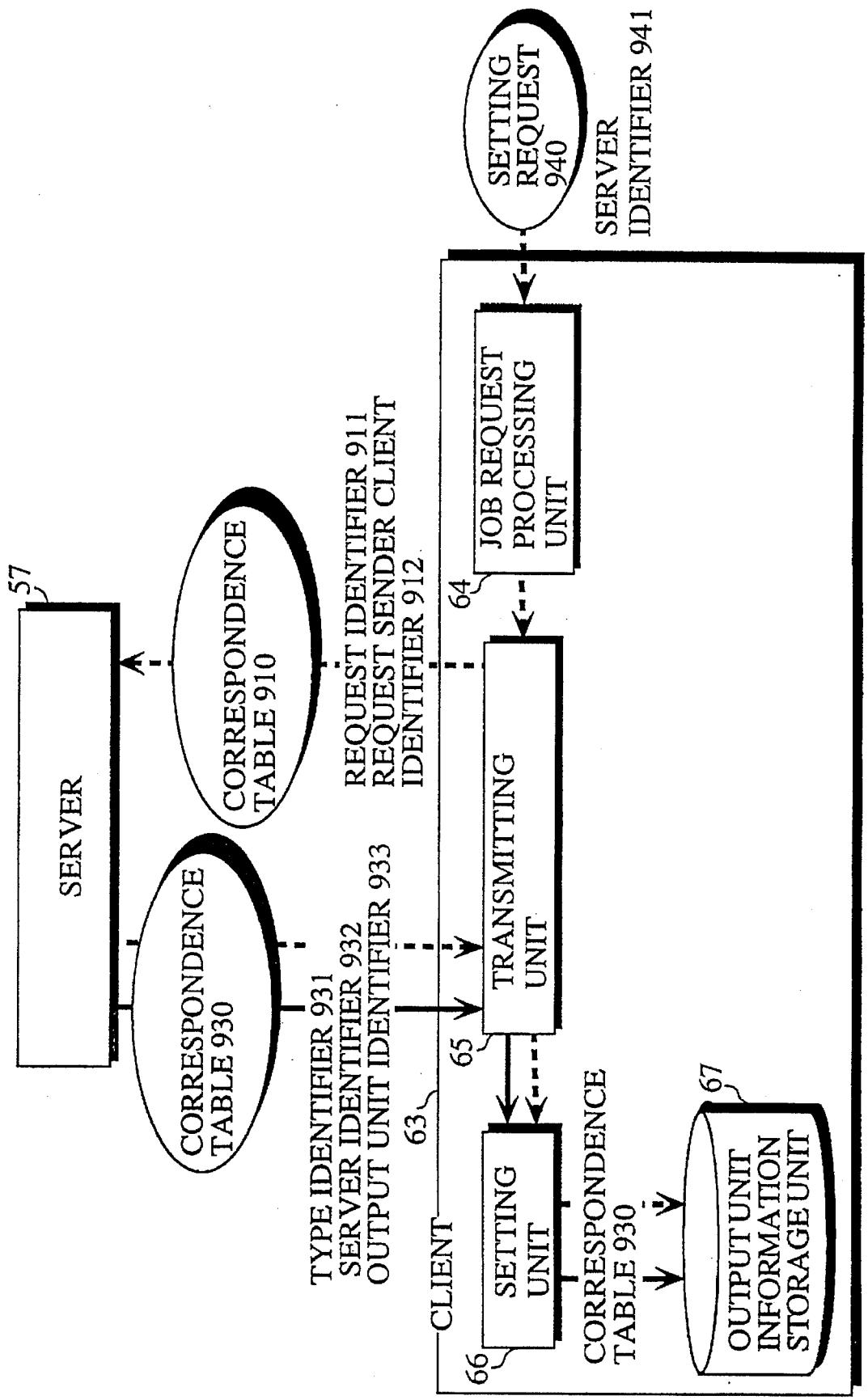
FIG. 50 is a view showing the construction of a client in the twelfth embodiment.

The construction of one of the group of the clients, client 63, is described in FIG. 50. The client 63 includes a job request processing unit 64, a transmitting unit 65, a setting unit 66, and a storage unit 67 for output unit information.

The job request processing unit 64 receives a setting request 940 from an operator of the client 63, and forwards the setting request 940 to the transmitting unit 65.

Figure 51:
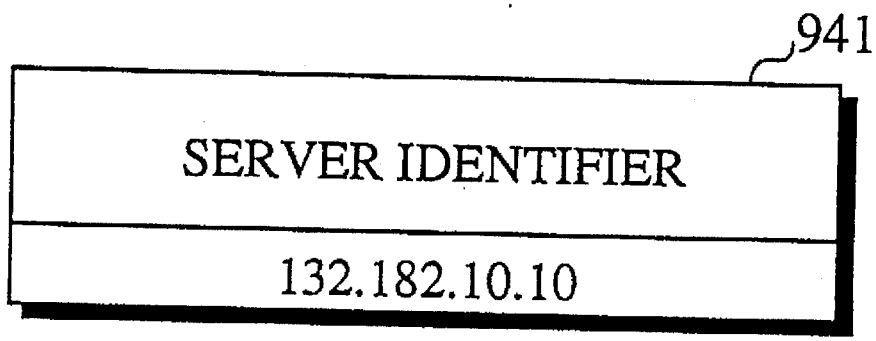
FIG. 51 is a data format of a setting request inputted into a request processing unit in the twelfth embodiment.

The setting request 940 is formatted as is shown in FIG. 51, and it includes a server identifier 941 such as an IP address or a name of machine.

The transmitting unit 65 transmits the information request 910 to the server 57(132,182,10.10) specified by the server identifier 941(132,182,10.10) in the setting request 940 upon the receipt thereof from the job request processing unit 64. The transmitting unit 65 sets a timer at the same time when it sends the information request 910, providing a sufficient time for the server 57 to send the updated correspondence table 930 as per information request 910. The transmitting unit 65 awaits for the updated correspondence table 930 from the server 57 until the timer is reset. When the transmitting unit 65 fails to receive the correspondence table 930 within the set time, it sends an update failure notice to the operator.

When transmitting unit 65 receives the updated correspondence table 930 as per the information request 910 from the server 57, or it receives the updated correspondence table 930 by broadcast with the group of the clients, the transmitting unit 65 forwards the updated correspondence table 930 further to the setting unit 66.

The setting unit 66 forwards the correspondence table 930 to the storage unit 67 upon the receipt thereof from the transmitting unit 65.

The storage unit 67 for output unit information holds output unit information necessary for the client 63 to use the output units.

In FIG. 47, the flow indicated by a solid line arrow is the procedure when the client sends the information request 910, while the flow indicated by a dotted line arrow is the procedure when the operator sends the update request 920. In FIG. 50, the flow indicated by a sold line arrow is the procedure when client receives the correspondence table 930 from the server 57, while the flow indicated by a dotted line arrow is the procedure when the client receives the set request 940 from the operator.

Although, other components should be included to activate the output unit, the explanation thereof is omitted; for they are not the gist of the present invention.

It should be understood that the client 63 refers to the correspondence table 930 held in the storage unit 67 to output the transmission data to the output unit. For example, when the client 63 sends the transmission data to a printer, it retrieves an entry whose output unit type identifier 931 has "printer" from the correspondence table 930, and outputs the transmission data to the server whose server identifier 932 and output unit identifier 933 respectively have "king" and "prA".

Figure 52:
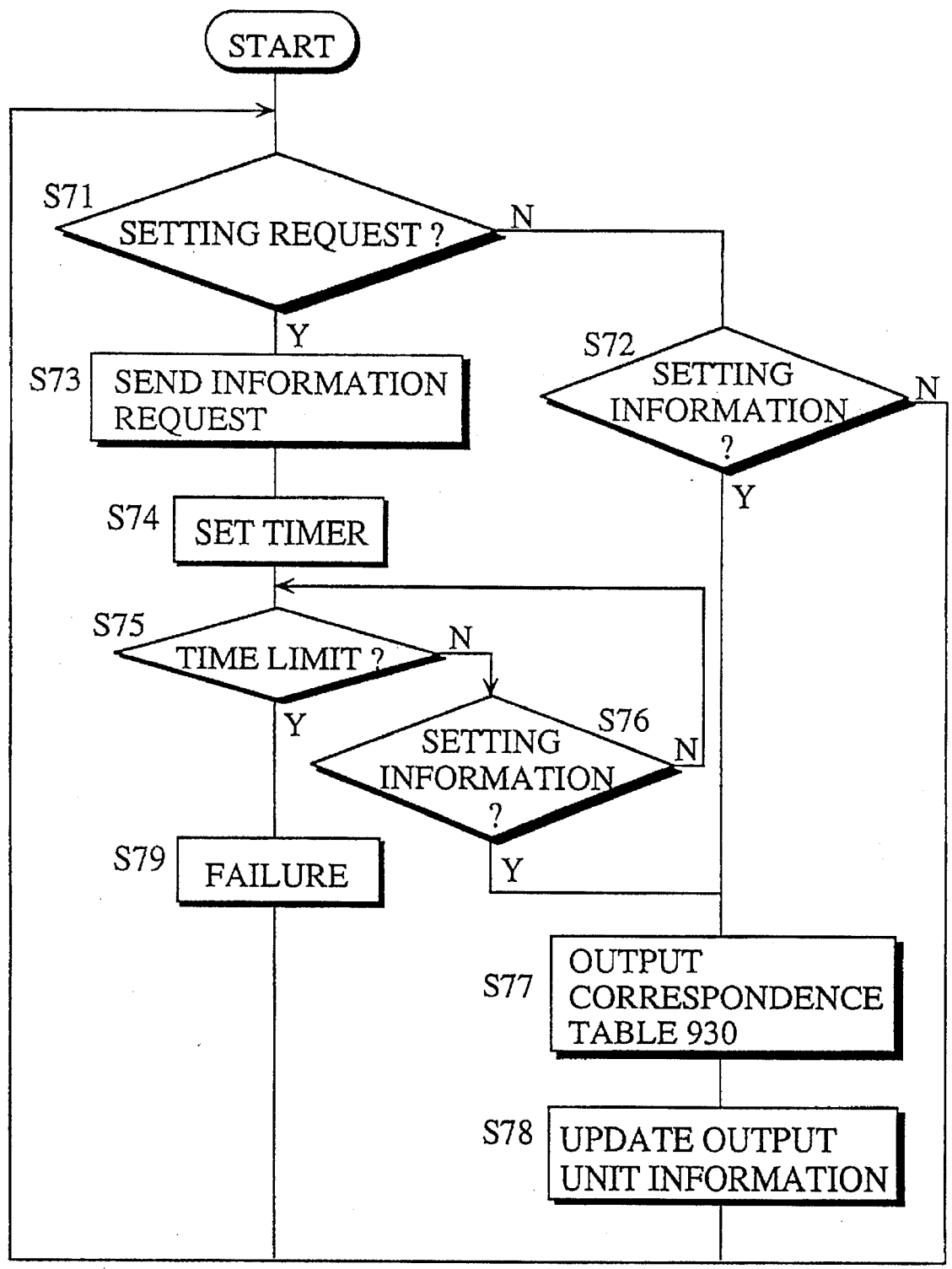
FIG. 52 is a flowchart detailing the operation of a transmitting unit in a server in the twelfth embodiment.
Figure 53:
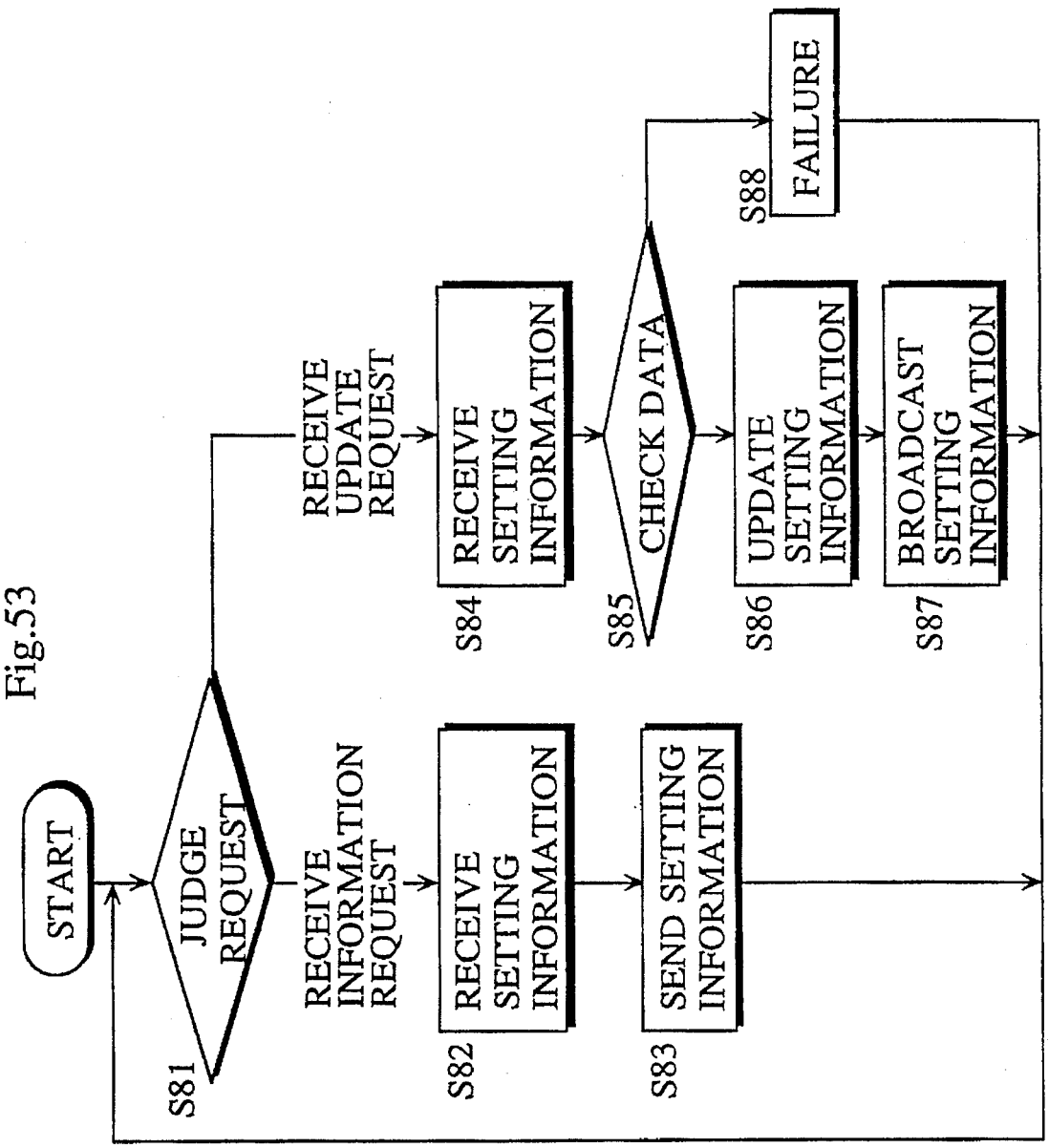
FIG. 53 is a flowchart detailing the operation of a server in the twelfth embodiment.

The operation of server 57 is detailed by the flowcharts in FIGS. 52, 53, and the explanation thereof will be given in the following.

First, a case that the client 63 sends the information request 910 shown in FIG. 48(a) will be explained. When the job request processing unit 64 receives the setting request 940 from the operator(Step 71), the transmitting unit in the client 63 sends the information request 910 to the server 57(Step 73), and sets a timer at the same time(Step 74). Accordingly the transmitting unit 65 awaits for the correspondence table 930 from the server until the timer is reset(Step 76).

On the other hand, the job request processing unit 58 in the server 57 requests the judgment upon the receipt the information request 910(Step 81), and outputs the information request 910 to the information receiving unit 59. Accordingly the receiving unit 59 retrieves and sends the correspondence table 930 from the storage unit 61 to the sending unit 62(Step 83).

The sending unit 62 sends the correspondence table 930 to the client 63 that has sent the information request 910 by referring to the request sender client identifier 912.

Upon the receipt of the correspondence table 930(Step 76), the transmitting unit 65 forwards the correspondence table 930 to the setting unit 66(Step 77), which accordingly stores the correspondence table 930 into the storage unit 67(Step 78).

When the transmitting unit 65 fails to receive the correspondence table 930 within the set time(Step 75), it sends a setting failure notice to the operator(Step 79), and returns to Step 71.

Next, a case where the server 57 receives the update request 920(FIG. 48(b)) from the operator will be explained. The job request processing unit 58 outputs the update request 920 to the update processing unit 60 upon the receipt thereof(Step 81). Then update processing unit 60 retrieves the correspondence table 930 from the storage unit 61(Step 84), and judges whether it can update the correspondence table 930 by referring to the update request 920(Step 85). In case of YES, the update processing unit 60 updates the correspondence table 930 and accordingly stores the updated correspondence table 930 into the storage unit 61(Step 86).

The sending unit 62 broadcasts the correspondence table 930 to the group of the clients(Step 87) and returns to Step 81.

When the transmitting unit 65 in the client 63 receives the updated correspondence table 930 from the sending unit 62 by broadcast(Step 73), it forwards the updated correspondence table 930 to the setting unit 66(Step 77). Then, the setting unit 66 stores the updated correspondence table 930 into the storage unit 67(Step 78).

When the update processing unit 61 judges that the correspondence table 930 can not be updated(Step 85), it sends an update failure notice to the operator(Step 88), and returns to Step 81.

As has been described, the server 57 can easily set and update the output unit information by sending the setting request 940.

In Step 73, a unit to hold the server identifier may be added; or the transmitting unit 65 may broadcast the information request 910 to a plurality of servers, so that the server 57 can update the output unit information of the client 63 without the prior knowledge of the server's IP address.

A device capable of detecting a change in the output unit environment by a change of network address of the client 63 may be included, so that the output unit information can be automatically updated without any input from the operator.

Also, when the transmitting unit 65 fails to receive the correspondence table 930 within the set time, the output unit selecting unit 53 may send the information request 910 to the server 57 for several times after the set time has passed instead of sending the setting failure notice and ending the operation instantly.

THIRTEENTH EMBODIMENT

A server in accordance with the thirteenth embodiment is depicted in FIG. 54. Compared with the twelfth embodiment, with a server 68 of the thirteenth embodiment, the setting information storage unit 61 is replaced with a setting information storage unit 69 of access control type and the sending unit 62 is replaced with a sending unit 70 of access control type. Hereinafter, like components are labeled with like reference numerals with respect to the twelfth embodiment, and the description of these components is not repeated.

The storage unit 69 holds a correspondence table 950 shown in FIG. 55(a), which shows a correspondence between the output unit type identifier 931, the server identifier 932, the output unit identifier 933, and permission information 951. The server identifier 932 in the correspondence table 950 may be left blank, if the server can be specified by any other way. The permission information identifier 951 specifies an permitted client for data-output to the output unit specified by the output unit type identifier 931, server identifier 932, and output unit identifier 933.

From FIG. 48(a), it is understood that for the client specified by the request sender identifier 912 "host1", the output is permitted to the output unit specified by the output unit type identifier 931 "printer", server identifier 932 "king", and output unit identifier 933 "prA".

The job request processing unit 58 receives a job request, and it judges whether the request is the information request 910 from the client 63, or an update request 960 from the operator, and outputs the former to the information receiving unit 59 and the latter to the update processing unit 60.

The update request is formatted as is shown in FIG. 55(b), and it includes the request identifier 911, update instruction 921, output unit type identifier 922, server identifier 923, output unit identifier 924, and permission information 961. Like the correspondence table 950, the server identifier 923 may be blank if the server can be specified in any other way.

The information receiving unit 59 forwards both the information request 910 from the job request processing unit 58 and the correspondence table 950 from the storage unit 69 to the sending unit 70.

The update processing unit 60 retrieves the correspondence table 950 from the storage unit 69 upon the receipt of the update request 960 from the job request processing unit 58, and judges whether it can update the correspondence table 950 or not by referring to the update request 960. It retrieves an entry whose type identifier 931, server identifier 932, and output unit identifier 933 respectively coincide with the type identifier 922, server identifier 923, and output unit identifier 924 in the update request 960. Like the case shown in FIG. 55(b) where the update instruction 921 exhibits "DELETE", it further detects whether the permission information 951 of the corresponding entry coincides with the permission information 961 in the update request 960. In case of YES, it erases the corresponding entry from the correspondence table 950 to add that entry to the updated correspondence table 950, and stores the updated correspondence table 950 into the storage unit 69, while sending both the updated correspondence table 950 and update request 960 to the sending unit 70. In case of NO, or the permission information 951 and 961 do not coincide, it sends an update failure notice to the operator.

In case that the update instruction 921 exhibits "ADD", it retrieves the correspondence table 950 from the storage unit 69 upon the receipt of the update request 960, and detects whether there is any entry whose type identifier 931, server identifier 932, output unit identifier 933 respectively coincide with the type identifier 922, server identifier 923, output unit identifier 924 in the update request 960. When it detect a corresponding entry, it sends an update failure notice to the operator. When it fails to detect any entry, it adds that entry composed of the type identifier 922, server identifier 923, output unit identifier 924 in the update request 960 to the correspondence table 950, and stores the updated correspondence table 950 into the storage unit 69. It further outputs both the updated correspondence table 950 and update request 960 to the sending unit 70.

Upon the receipt of the information request 910 and the updated correspondence table 950, the sending unit 70 retrieves corresponding entry from the corresponding table 950 when the permission information 951 coincides with the request sender identifier 912 "host1" in the information request 910, and extracts the output unit type identifier 931 "printer", server identifier 932 "king", and the output unit identifier 933 "prA"(FIG. 48(a)). The entry thus formed corresponds to the one in the correspondence table 930, hence hereinafter referred to as such. The sending unit 70 sends the correspondence table 930 thus generated to the request sender client specified by the request sender client identifier 912 "host1" in the information request 910. On the other hand, it sends a failure notice to the request sender client when the permission information 951 and request sender identifier 912 do not coincide.

On the other hand, upon the receipt of the correspondence table 950 and update request 960, the sending unit 70 judges that the request be sent to a plurality of clients by referring to the update request 960, and accordingly, it broadcast the correspondence table 930 generated by the sending unit 70 to all the clients "host1, host2, . . ." specified by the permission information 961 in the update request 960.

In FIG. 54, the flow indicated by a solid arrow is the procedure when the server 68 receives the information request 910 from the client, while the flow indicated by a dotted line arrow is the procedure when the server 68 receives the update request 960 from the operator.

The operation of the server 68 constructed as above is detailed by the flowchart in FIG. 56, and the explanation thereof will be given in the following.

Upon the receipt of a job request, the job request processing unit 58 judges whether the job request is the information request 910 from the client 63 or update request 960 from the operator(Step 91). In case of the former, it forwards the information request 910 to the information receiving unit 59, and in case of the latter, it sends the update request 960 to the update process unit 60 and proceeds to Step 96.

Upon the receipt of the information request 910, the information receiving unit 59 sends both the correspondence table 950 in the storage unit 69 and the information request 910 to the sending unit 70(Step 92).

The sending unit 70 accordingly extracts corresponding entry to the information request 910 by referring to the permission information 951(Step 93), and removes the permission information 951 from the corresponding entry to obtain and send the correspondence table 930 to the client 63(Step 95), and returns to Step 91. When the sending unit 70 fails to extract any entry, it notifies that no output unit is permitted for the client 63(Step 94) and returns to Step 91.

On the other hand, in case that the update processing unit 60 receives the update request 960, it retrieves the correspondence table 950 from the storage unit 69(Step 69), and judges whether it can update the correspondence table 950 by referring to the update request 960(Step 97). In case of YES, it updates the correspondence table 950 in accordance with the update request 960, and stores the updated correspondence table 950 into the storage unit 69(Step 98). Further it sends the updated correspondence table 950 and update request 960 to the sending unit 70. In case of NO, it notifies an update failure to the operator(Step 100), and returns to Step 91.

Accordingly, the sending unit 70 extracts the output unit information with the data-output permission by referring to the permission information 951 in the updated correspondence table 950 for each client specified by the permission information 961 in the update request 960, subsequently sends the correspondence table 930 to each specified client (Step 99), and returns to Step 91.

The setting information is not limited to "DELETE" and "ADD", and it may include an update instruction for the permission information to save the operator's labor and prevent an exceeding traffic.

The update request 960 includes the permission information herein. However, in case that the update request 960 has "DELETE", two components may be additionally included. One of them is used to receive the update request 960 with a blank permission information 961; and the other is used of identifying the permission information 951 of the entry whose type identifier 931, server identifier 932, and output unit identifier 933 respectively coincide with type identifier 922, server identifier 923, and output identifier 924 in the update request 960. By sending the update request 960 with the blank permission information 961, the labor of the operator can be saved.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A system for allocating a plurality of data output requests from a plurality of users to a plurality of connected output units of differing output formats, said system comprising:

means for sending said data output requests;

receiving means for receiving said data output requests;

sending means for sending said data output request from said receiving means to any of said plurality of connected output units;

first judging means for judging which of said plurality of connected output units said sending means will send said data output request to, said judging means judging the compatibility of said connected output units with the format of said data output request;

user means for inputting a priority characteristic to said data output request consisting of one of the following characteristics of a shortest wait time to process said data output request, a highest output resolution of said data output, a lowest cost to process said data output request, and a shortest distance from said user to said output unit; and second judging means for judging from among the plurality of connected output units judged by said first judging means to be compatible with said data output request which output unit said sending means will send said data output request to based on said user inputted priority characteristic.

* * * * *